US012654803B2

(12) United States Patent

Bayne

(10) Patent No.: US 12,654,803 B2

(45) Date of Patent: Jun. 16, 2026

---

(54) FOLDING E-TRIKE

(71) Applicant: ROTA Mobility Inc., Los Gatos, CA (US)

(72) Inventor: Christopher John Bayne, Los Gatos, CA (US)

(73) Assignee: ROTA Mobility Inc., Los Gatos, CA (US)

( * ) Notice: Subject to any disclaimer, the term of this patent is extended or adjusted under 35 U.S.C. 154(b) by 0 days.

(21) Appl. No.: 19/220,758

(22) Filed: May 28, 2025

(65) Prior Publication Data

US 2025/0368289 A1 Dec. 4, 2025

Related U.S. Application Data

(60) Provisional application No. 63/652,378, filed on May 28, 2024.

(51) Int. Cl.
*B62K 15/00* (2006.01)
*B62D 61/08* (2006.01)
(Continued)

(52) U.S. Cl.
CPC ............ *B62K 15/006* (2013.01); *B62D 61/08* (2013.01); *B62J 43/13* (2020.02); *B62K 5/027* (2013.01);
(Continued)

(58) Field of Classification Search
CPC ........ B62K 15/006; B62K 15/00; B62K 5/06; B62K 5/027; B62K 5/10; B62K 5/02; B62K 5/023; B62K 5/025; B62K 5/00;

B62K 2204/00; B62K 7/00; B62K 7/02; B62K 7/04; B62K 2005/001; B62K 2201/02; B62J 43/13; B62M 6/90; B62M 6/00;
(Continued)

(56) References Cited

U.S. PATENT DOCUMENTS

| 3,938,609 A | * | 2/1976 | Kensaku | ................... | B62K 5/10 |
| | | | | | 267/276 |
| 4,316,520 A | * | 2/1982 | Yamamoto | ............. | B62D 61/08 |
| | | | | | 180/215 |

(Continued)

FOREIGN PATENT DOCUMENTS

| BE | 824890 A | * | 5/1975 |
| CN | 87210138 U | * | 6/1988 |

(Continued)

*Primary Examiner* — Keith J Frisby
(74) *Attorney, Agent, or Firm* — David R. Stevens; Stevens Law Group

(57) ABSTRACT

A transportation device is disclosed. One aspect includes a rear assembly that further includes a rear frame, and a first rear wheel and a second rear wheel mounted to the rear frame. The rear assembly may also include a first electric motor and a second electric motor mechanically connected to the first rear wheel and the second rear wheel respectively, and an electrical power source comprising a battery, configured to power the first electric motor and the second electric motor. The transportation device may also include a front assembly that includes a saddle and a front wheel connected to the saddle via a wheel hub and a fork. An aspect includes an elastomeric torsional element connecting the front assembly and the rear assembly.

24 Claims, 50 Drawing Sheets

(51) Int. Cl.

| | |
|---|---|
| *B62J 43/13* | (2020.01) |
| *B62K 5/027* | (2013.01) |
| *B62K 5/06* | (2006.01) |
| *B62K 5/10* | (2013.01) |
| *B62M 1/36* | (2013.01) |
| *B62M 6/50* | (2010.01) |
| *B62M 6/60* | (2010.01) |
| *B62M 6/90* | (2010.01) |
| *B62M 7/12* | (2006.01) |
| *B62M 9/02* | (2006.01) |
| *F16F 1/54* | (2006.01) |
| *B62K 5/00* | (2013.01) |
| *B62K 7/04* | (2006.01) |

(52) U.S. Cl.

CPC .................. *B62K 5/06* (2013.01); *B62K 5/10* (2013.01); *B62M 1/36* (2013.01); *B62M 6/50* (2013.01); *B62M 6/60* (2013.01); *B62M 6/90* (2013.01); *B62M 7/12* (2013.01); *B62M 9/02* (2013.01); *F16F 1/545* (2013.01); *B60G 2300/122* (2013.01); *B60G 2300/45* (2013.01); *B60L 2200/24* (2013.01); *B60Y 2200/122* (2013.01); *B62K 2005/001* (2013.01); *B62K 2201/02* (2013.01); *B62K 2204/00* (2013.01)

(58) Field of Classification Search

CPC . B62M 6/40; B62M 6/45; B62M 6/50; B62M 6/60; B62M 6/65; B62M 6/70; B62M 6/75; B62M 6/80; B62M 9/02; B62M 1/36; B62M 1/38; B62M 1/00; B62M 7/12; B60G 2300/12; B60G 2300/122; B60G 2300/45; B60G 11/22; B60G 11/225; B60G 11/23; B60G 2202/142; B60G 2202/1422; B60G 2202/1424; B62D 61/06; B62D 61/08; B60Y 2200/12; B60Y 2200/122; B60L 2200/24

USPC .................... 180/210, 215, 216, 65.1, 65.51; 280/124.103, 62, 287, 261

See application file for complete search history.

(56) References Cited

U.S. PATENT DOCUMENTS

| | | | | |
|---|---|---|---|---|
| 4,487,282 | A | * | 12/1984 | Wakatsuki ............... B62H 5/14 |
| | | | | 280/282 |
| 4,560,026 | A | * | 12/1985 | Yanagisawa ............. B62H 5/06 |
| | | | | 180/287 |
| 4,666,018 | A | * | 5/1987 | Shibuya ............... B60G 11/225 |
| | | | | 180/213 |
| 5,240,267 | A | | 8/1993 | Owsen |
| 5,730,453 | A | | 3/1998 | Owsen |
| 5,941,548 | A | | 8/1999 | Owsen |
| 6,062,581 | A | | 5/2000 | Stites |
| 6,742,797 | B2 | * | 6/2004 | Lopez .................... B62K 3/005 |
| | | | | 280/282 |
| 7,073,806 | B2 | | 7/2006 | Bagnoli |
| 7,591,337 | B2 | | 9/2009 | Suhre |
| 9,452,804 | B2 | | 9/2016 | Neerman |
| 9,731,785 | B1 | | 8/2017 | Liu |
| 10,131,397 | B2 | | 11/2018 | Page |
| 11,198,482 | B2 | * | 12/2021 | Sugioka ................... B62J 45/40 |
| 11,338,879 | B2 | | 5/2022 | Tseng |
| 2002/0027030 | A1 | * | 3/2002 | Tagami .................... B62K 5/06 |
| | | | | 180/21 |
| 2006/0125205 | A1 | | 6/2006 | Lai |
| 2007/0152422 | A1 | * | 7/2007 | Lin .......................... B62K 5/10 |
| | | | | 280/275 |
| 2009/0289437 | A1 | | 11/2009 | Steinhilber |

FOREIGN PATENT DOCUMENTS

| | | | | | |
|---|---|---|---|---|---|
| CN | 2749768 | Y | * | 1/2006 | |
| CN | 102673699 | A | * | 9/2012 | ............ B60K 11/04 |
| DE | 102018010380 | B3 | * | 8/2020 | .............. B62H 1/06 |
| EP | 3205564 | A2 | * | 8/2017 | .............. B62M 6/60 |
| FR | 3020335 | A1 | * | 10/2015 | .............. B62K 7/04 |
| GB | 2493171 | A | | 1/2013 | |
| GB | 2560740 | A | | 9/2018 | |
| GB | 2595506 | A | | 12/2021 | |
| JP | H08142967 | A | * | 6/1996 | ............ B62M 6/40 |
| JP | H09156563 | A | * | 6/1997 | |

* cited by examiner

100

300

100

300

100

300

100

1000

2200

2204

2202

3200

3202

3204

3302

FOLDING E-TRIKE

BACKGROUND

This application claims the priority benefit of provisional patent application No. 63/652,378 titled "Folding E-Trike Combining Features Which Enhance Safety and Useability" filed on May 28, 2024, the disclosure of which is incorporated by reference herein in its entirety.

TECHNICAL FIELD

The present disclosure relates to a folding electrically-assisted tricycle (e-trike) that combines features which enhance safety and useability.

BACKGROUND ART

To address serious inner-city congestion and air pollution concerns, electrically-assisted transportation is growing in popularity, with both two-wheeled bicycles (bikes) and three-wheeled tricycles (trikes). Electrical assistance enables a user of the transportation vehicle to conserve personal energy, while being able to travel a longer distance. Despite their advantages, trikes (including electrically-assisted trikes) have several shortcomings that need to be addressed. A rear-drive trike has to transfer the power inputs from the rider to the rear wheels, and this results in a relatively complex powertrain that precludes adding any foldability features to the trike. Front wheel pedal propulsion overcomes this issue, but gives rise to a zig-zag motion, similar to a unicycle, due to user pedal inputs.

SUMMARY

Aspects of the invention are directed to an electrically-assisted trike (e-trike) that includes multiple mechanical features that help enhance rideability and stability.

In one aspect, an e-trike is a transportation device that includes a rear assembly and a front assembly. The rear assembly may further comprise a rear frame, and a first rear wheel and a second rear wheel mounted to the rear frame. A first and second electric motor mechanically connected to the first rear wheel and the second rear wheel respectively may be configured to provide electrical assistance to a user of the transportation device. The electric motors may be powered by an electrical power source comprising a battery.

In one aspect, the front assembly includes a saddle configured to support the user, and a front wheel connected to the saddle via a wheel hub and a fork. An elastomeric torsional element may be used to connect the front assembly and the rear assembly. The elastomeric torsional element can be configured to permit a range of motion of the front assembly relative to the rear assembly, about a longitudinal axis referenced to the transportation device. In an aspect, the range of motion is constrained by a combination of one or more mechanical stops at the end of the range of motion. An elastic force may be exerted by the elastomeric torsional element against the range of motion when the front assembly is moved away from a neutral position.

Another aspect includes the rear assembly mechanically connected to the front assembly. This front assembly may include a saddle configured to support the user, a front wheel connected to the saddle via a wheel hub and a fork, and a pedal assembly configured to transfer mechanical inputs from the user to the front wheel, to propel the transportation device. The pedal assembly may be offset to a rearward position referenced to the wheel hub.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
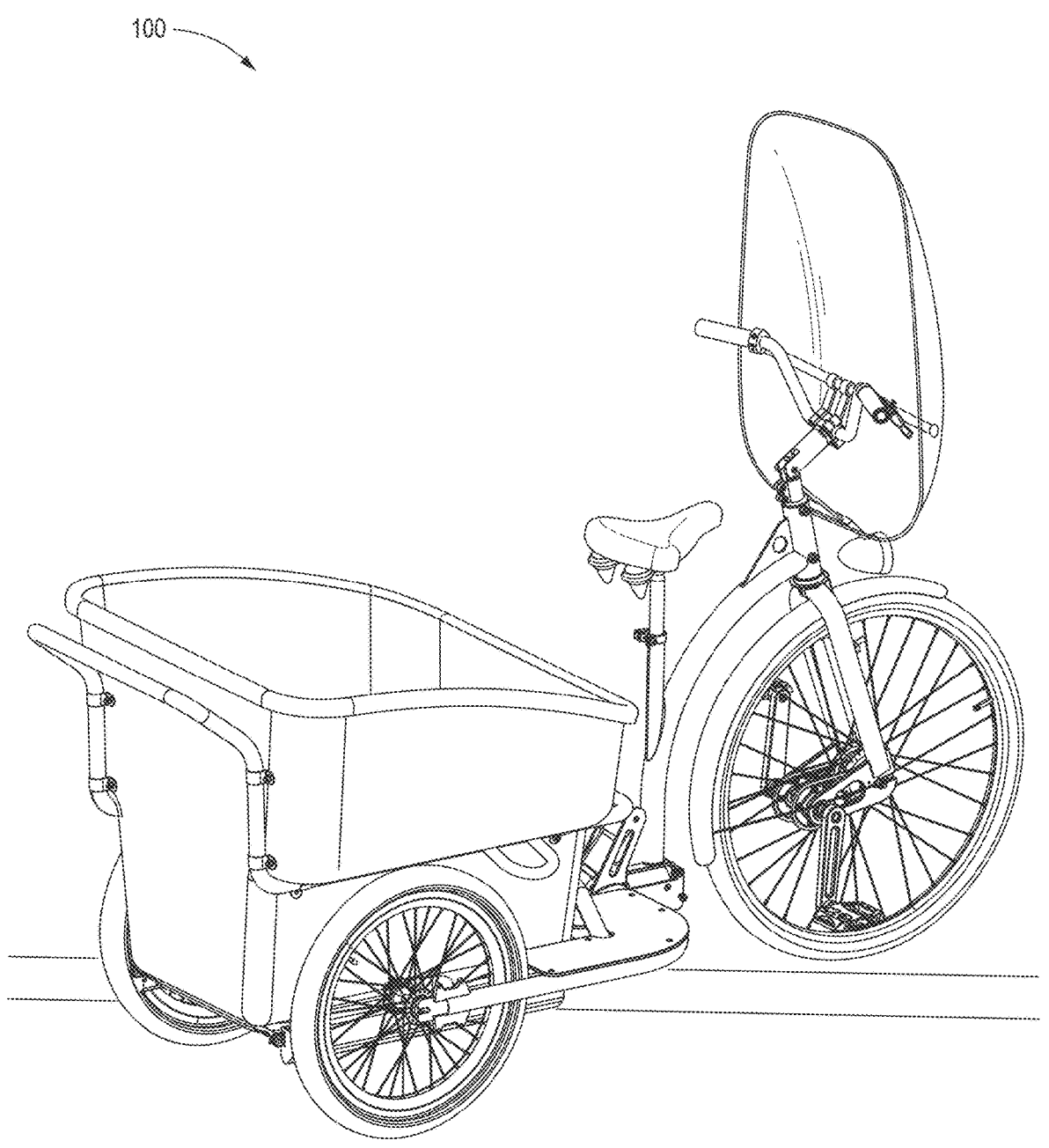
FIG. 1 is a rear three-quarter view of an e-trike

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the systems and methods described herein are related to an electrically-assisted trike that addresses the deficiencies of prior trike designs. A combination of features that includes at least one electric motor, an adjustable suspension component, a tilting and/or steering column, offset pedals, a demountable box-cart, and a folding capability provides several advantages to the end user.

Figure 2:
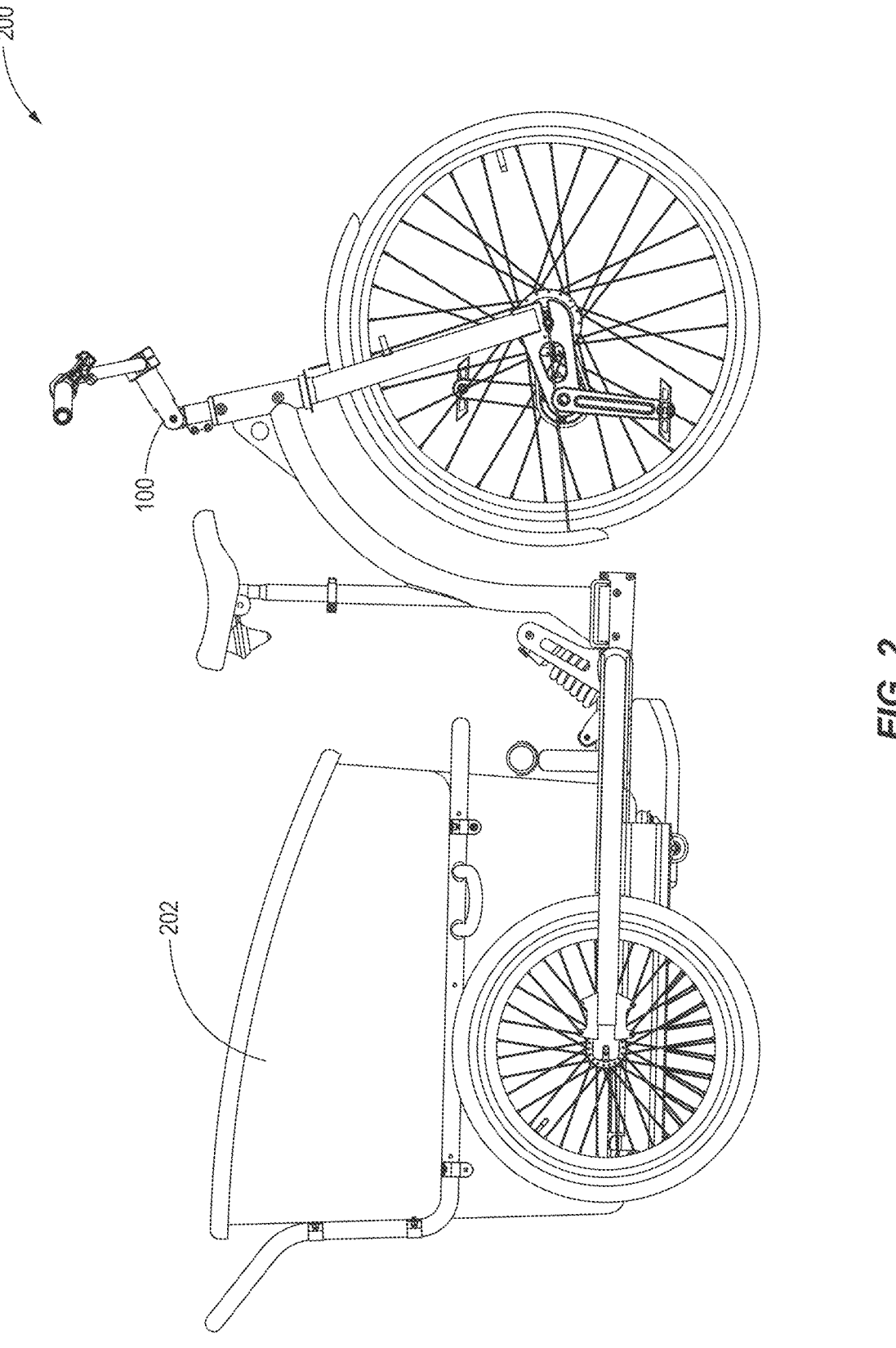
FIG. 2 is a side view of an e-trike.

FIG. 1 is a rear three-quarter view of an e-trike 100. FIG. 2 is a side view 200 of e-trike 100. As seen in FIGS. 1 and 2, e-trike 100 includes standard features such as a saddle for a user (rider), handlebars to steer the e-trike 100, and a pedal assembly (described subsequently) that drives a front wheel of e-trike 100 via user input. The rear end of the e-trike has two wheels that are supported by a frame. The frame may be made of metal, plastic, carbon fiber composite, or some other material that provides adequate support strength and stiffness. The frame also supports a removable/demountable cargo box 202. The cargo box 202 may have wheels of its own, so that the cargo box may be transported off of the e-trike 100 when demounted. When attached, secure fastening mechanisms may be used to secure the cargo box 202 to the frame of the e-trike 100. The cargo box 202 may be used to transport one or more items, pets, or even children.

Some features of an embodiment of (folding) e-trike 100 are presented in table 1.

TABLE 1

Features of folding e-trike 100

| Features | Benefit |
| --- | --- |
| Tilting, folding, ultra-compact (bakfiets) trike | Low C-of-G, Safer cornering, easier transportation |
| Standard bicycle ride height | Excellent ride, safer to "see and be seen" |
| High-capacity demountable Cargo "Box-Cart" 280 liters (75 gallons US) | Ideal for:-deliveries, shopping, transportation |
| In use length-220 cm (86") | Natural ride dynamic |
| In Use Width-83 cm (33") PIC | Ease of access/storage/transportation |
| Folded Length-100 cm (40") | Upright, can be transported into |
| Folded width 78 cm-(31") | and out of double-door elevators |
| Lightweight, aircraft aluminum 6061-T6 frame | Total weight 30 Kg (65 lbs) excluding battery/ accessories. |
| Coil-over shock, mid-suspension | Smooth ride, adjustable to suit rider |
| Step thru, free standing design | Easy mount/dismount, no kickstand, safer Load/Unload |
| Compact, high torque geared motor (two electric motors, one driving each rear wheel of the e-trike) | Automatic Bluetooth control, low noise, long range with 36 V, 250 W, 35 NM torque, 20 Ah Battery |
| Single lever, dual disc brakes to each rear wheel | Excellent stopping power |
| Minimalistic design | Stylish, easier/lower maintenance |
| Ships fully assembled | Saves cost and "Ready to Go" |
| High Quality | Reliable, easy maintenance and long lasting |

Figure 3A:
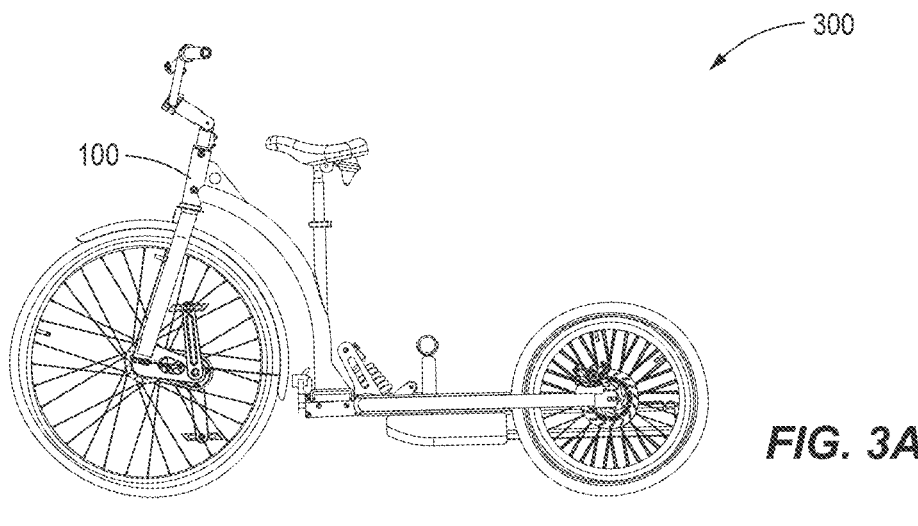
FIGS. 3A-3C are schematic drawings showing a folding sequence of an e-trike.
Figure 3B:
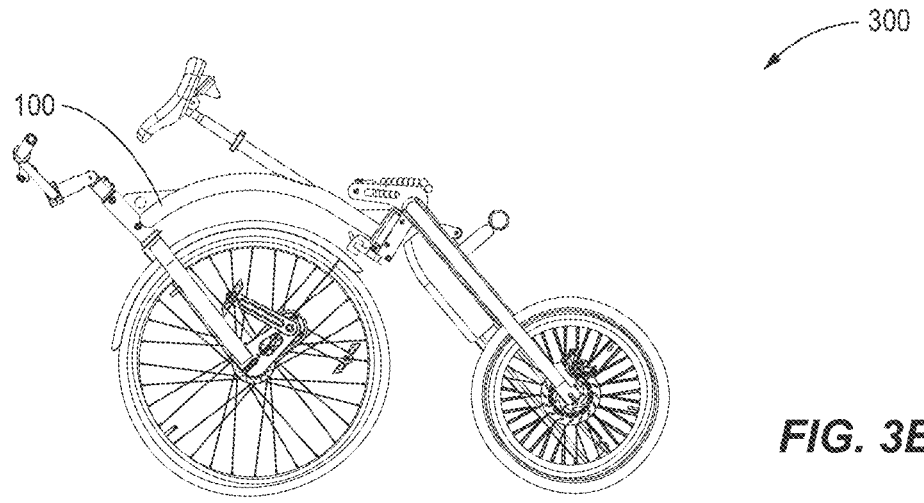
Figure 3C:
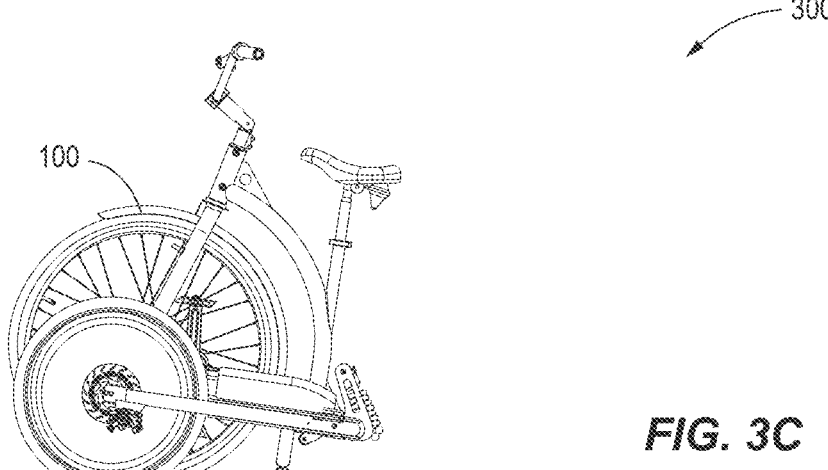

FIGS. 3A-3C are schematic drawings showing a folding sequence 300 of e-trike 100. In an aspect, a front-drive configuration of the folding e-trike 100 for rider inputs enables the e-trike 100 to be folded or collapsed for storage or transport. Sequence 300 shows an unfolded e-trike (FIG. 3A), a partially-folded e-trike (FIG. 3B), and a fully-folded e-trike (FIG. 3C). In one aspect, the cargo box 202 needs to be removed before the e-trike is folded.

Figure 4:
FIG. 4 is a schematic depicting a folded e-trike packaged with a detachable cargo box in a shipping box.

FIG. 4 is a schematic 400 depicting a folded e-trike 100 packaged with detachable cargo box 202 in a shipping box 402. An e-trike may be shipped fully-assembled by the manufacturer, in a single box similar to the packaging and with dimensions as depicted in FIG. 4.

Advantages of a trike-based platform used as a basis to design e-trike 100 are:
 Trikes inherently more stable and with a "tilting" front end (described subsequently), they ride like a bike for safer cornering.
 Free-standing for safer load/unloading
  No kickstand required
 Safer for carrying larger loads and a wider range of uses:
  Transportation, shopping, tradesman, last mile deliveries, etc.

Figure 5:
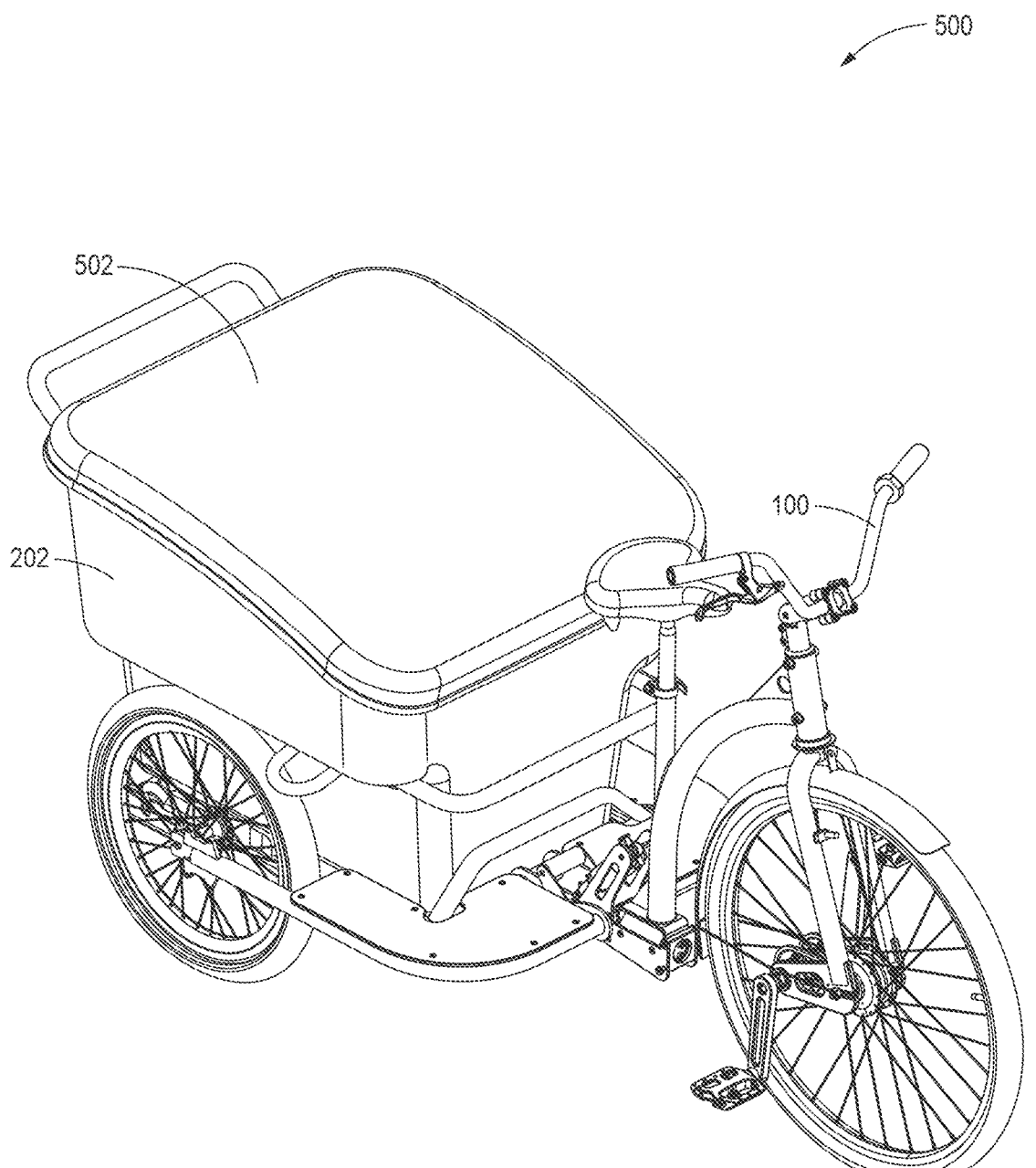
FIG. 5 is a view of an e-trike.

FIG. 5 is a view 500 of e-trike 100. View 500 depicts cargo box 202 attached to e-trike 100. In one aspect, the cargo box 202 is a demountable component of the e-trike 100. The cargo box 202 (also referred to as a "box cart" or a "cargo boxcart") may be demountable from the e-trike 100 chassis by using a foot latch. The cargo box 202 may be supported on supports such as wheels, runners or casters when resting on the ground while being detached/demounted from the e-trike 100. These supports allow the cargo box 202 to be moved along the ground by pushing or pulling. The cargo box 202 may be used to carry cargo (e.g., groceries), or occupants such as children or pets.

The cargo box 202 may include one or more accessories. For example, a fiberglass lockable cover 502 may be used to cover goods or items such as groceries, stored in the cargo box.

Figure 6:
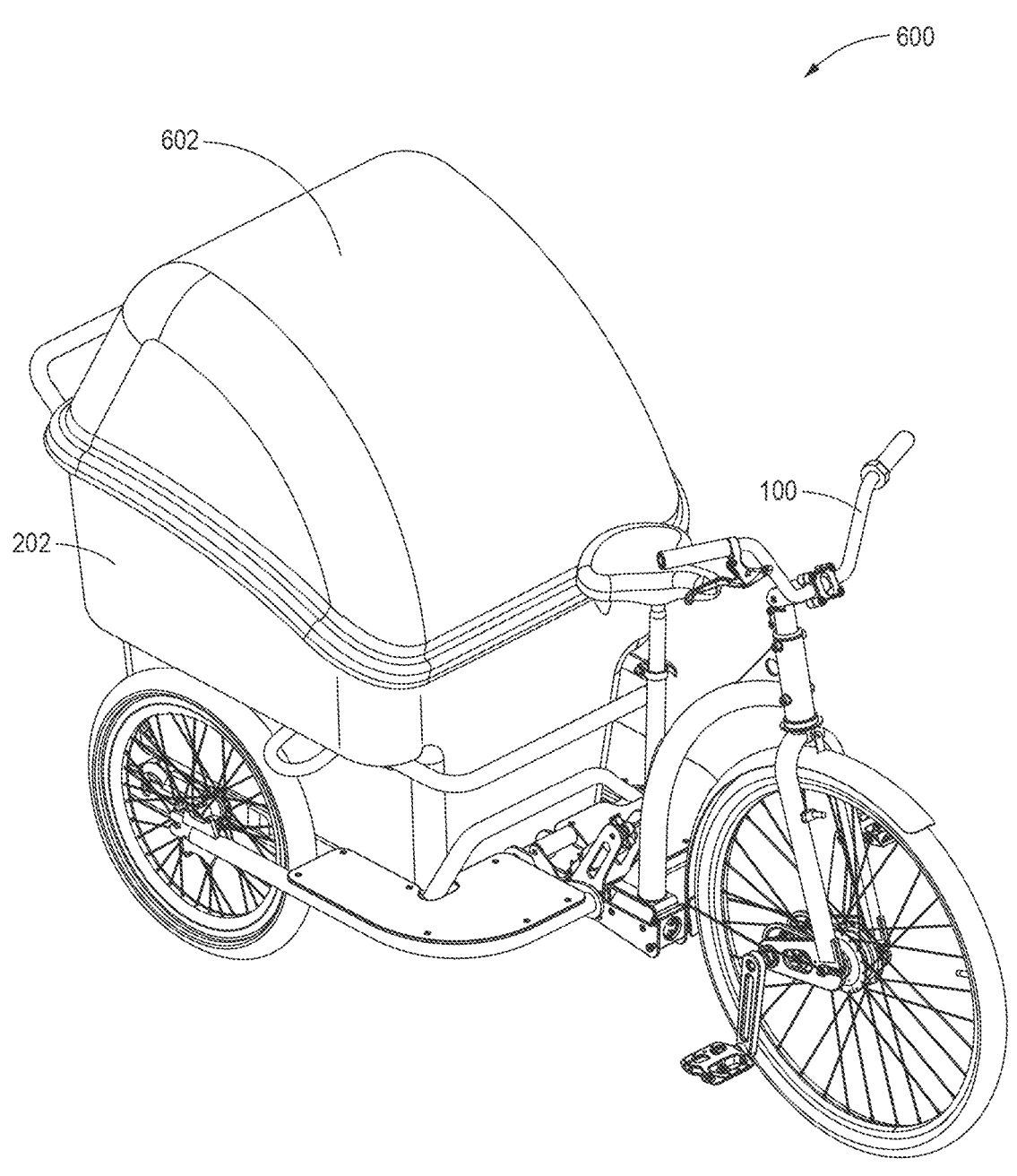
FIG. 6 is a view of an e-trike.

FIG. 6 is a view 600 of e-trike 100. View 600 depicts cargo box 202 attached to e-trike 100. FIG. 6 also depicts cargo box 202 covered with a Lexan™ ventilated cover 602. The Lexan™ ventilated cover 602 may be used to protect pets or animals during transportation, while the ventilation feature allows the pets to breathe comfortably.

Figure 7:
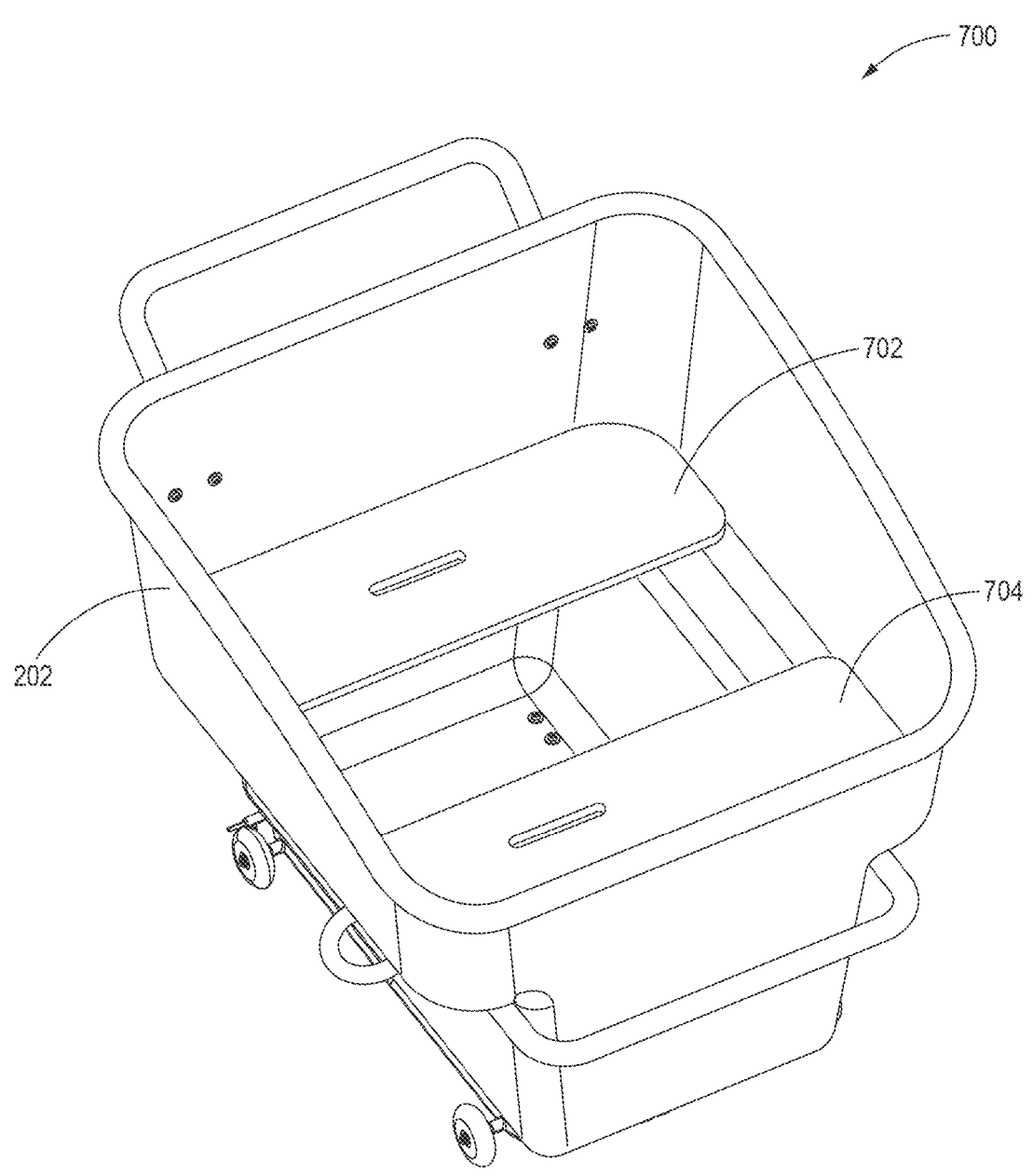
FIG. 7 is a view of a demountable cargo box.

FIG. 7 is a view 700 of demountable cargo box 202. In one aspect, an inner volume associated with the cargo box 202 may be separated into multiple compartments (e.g., upper and lower compartments), by using one or more box boards 702 and 704. These box boards 702 and 704 may be attachable to and detachable from cargo box 202, to increase cargo volume versatility and flexibility. For example, box boards 702 and 704 may be used to form shelves or seats within the volume enclosed by the cargo box 202. In one embodiment, box boards 702 and 704 may be sold as accessories for the e-trike 100, with a pack of three such box boards being sold as a set.

Figure 8:
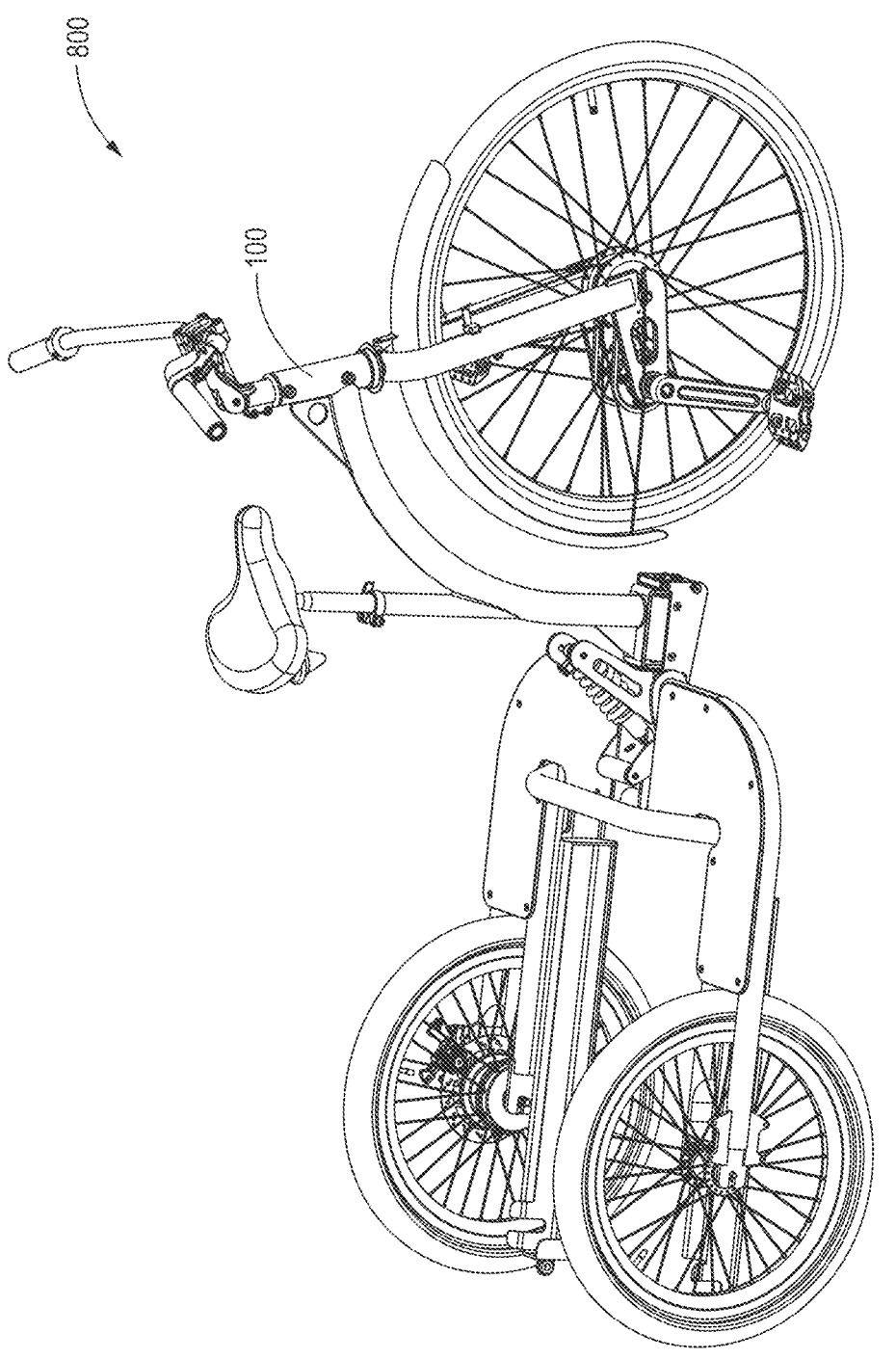
FIG. 8 is a view of an e-trike with a cargo box removed.

FIG. 8 is a view 800 of an e-trike 100 with cargo box 202 removed.

Figure 9:
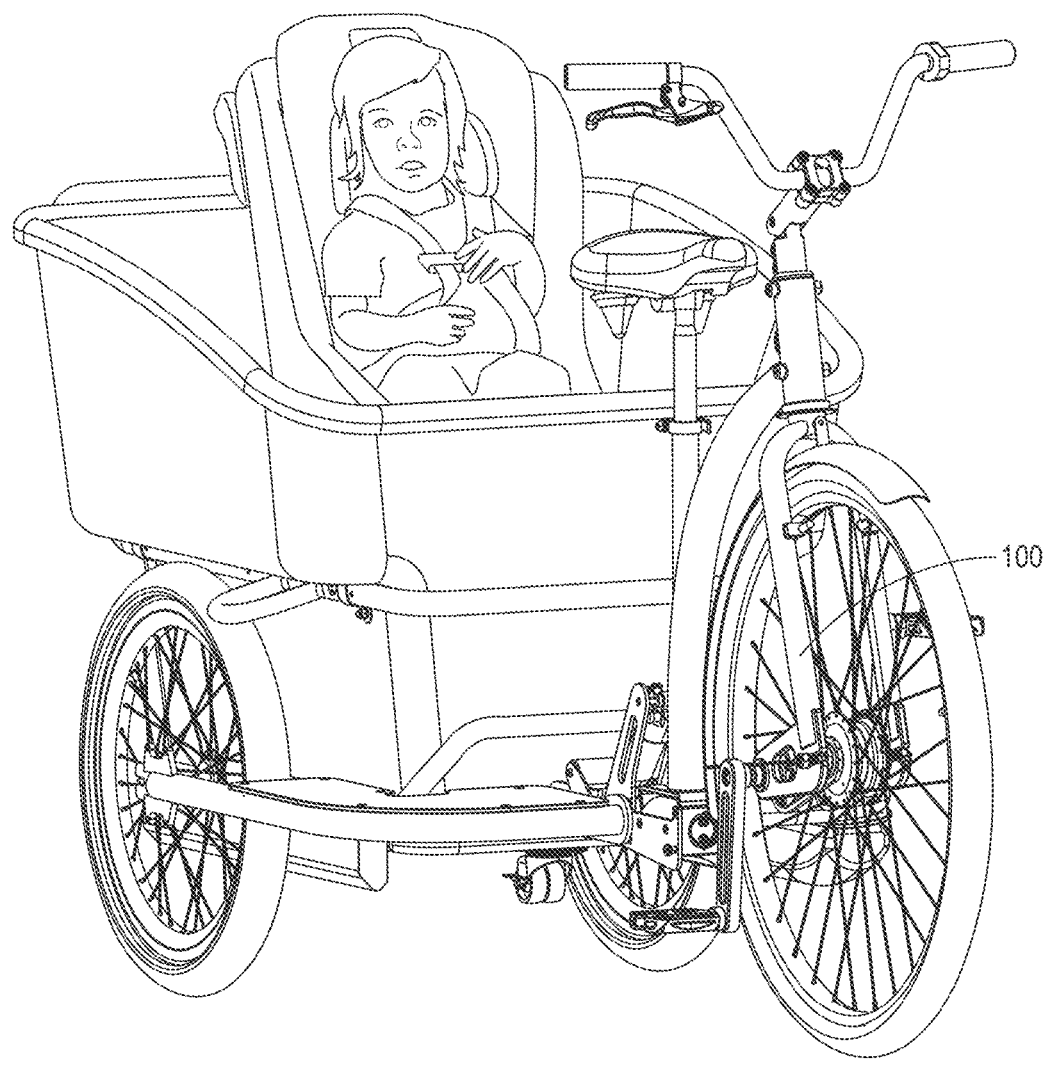
FIG. 9 is view of an e-trike with a cargo box configured to transport a child.

FIG. 9 is view 900 of e-trike 100 with a cargo box (similar to cargo box 202) configured to transport a child. In some embodiments, cargo box 202 may include tethers or latches that can enable the installation of child safety restraints (e.g., child car seats). In this configuration, e-trike 100 with the cargo box 202 installed may be used to transport a child, as depicted in FIG. 9.

Figure 10:
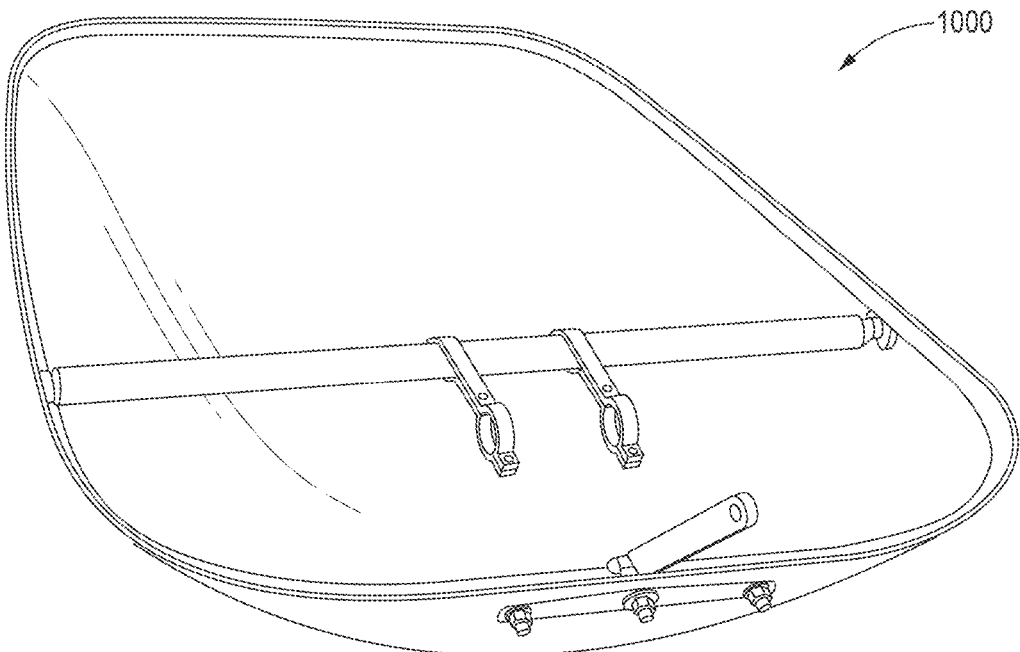
FIG. 10 is a view of a detachable windshield for an e-trike.

FIG. 10 is a view of a detachable windshield 1000 for e-trike 100. Embodiments of e-trike 100 may include one or more accessories, such as detachable windshield 1000. For example, detachable windshield 1000 may be installable on the e-trike 100. In one aspect, detachable windshield 1000 is made of transparent Lexan™. Detachable windshield 1000 may reduce wind resistance to forward motion and provides some comfort for a rider of e-trike 100 in inclement weather conditions.

Figure 11:
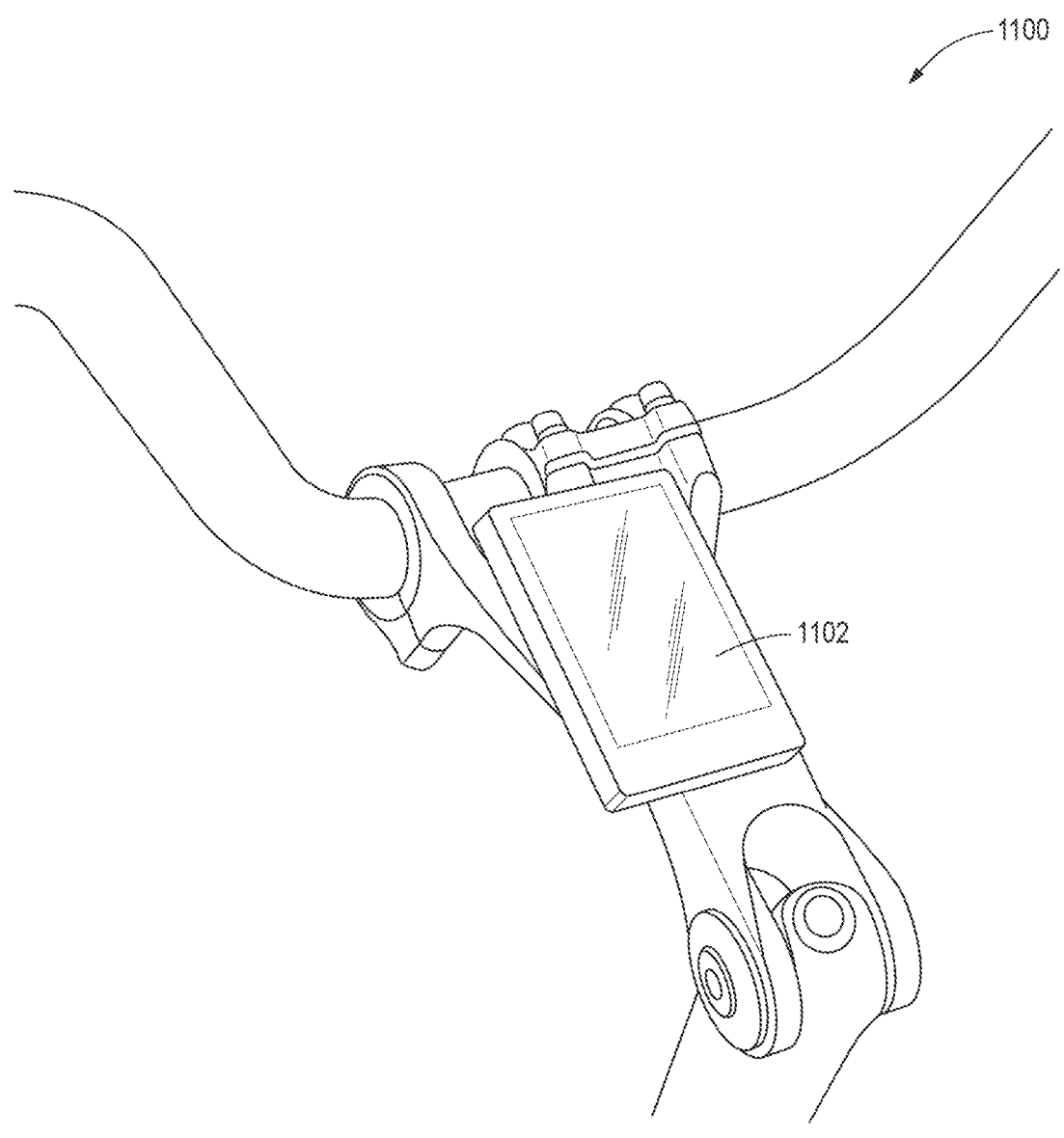
FIG. 11 is a view of a color multifunction display attached to an e-trike handlebar.

FIG. 11 is a view 1100 of a color multifunction display 1102 attached to a handlebar associated with e-trike 100. Another accessory that may be attached to the e-trike is a color multifunction display, such as color multifunction display 1102. Color multifunction display 1102 may be any of an LCD or an OLED display of a suitable size, attached to the e-trike 100 at a position where it is visible to the rider/user. For example, color multifunction display 1102 may be attached to the handlebars of e-trike 100 for appropriate user visibility. FIG. 11 depicts color multifunction display 1102 in an "OFF" state attached to handlebars of e-trike 100.

Figure 12:
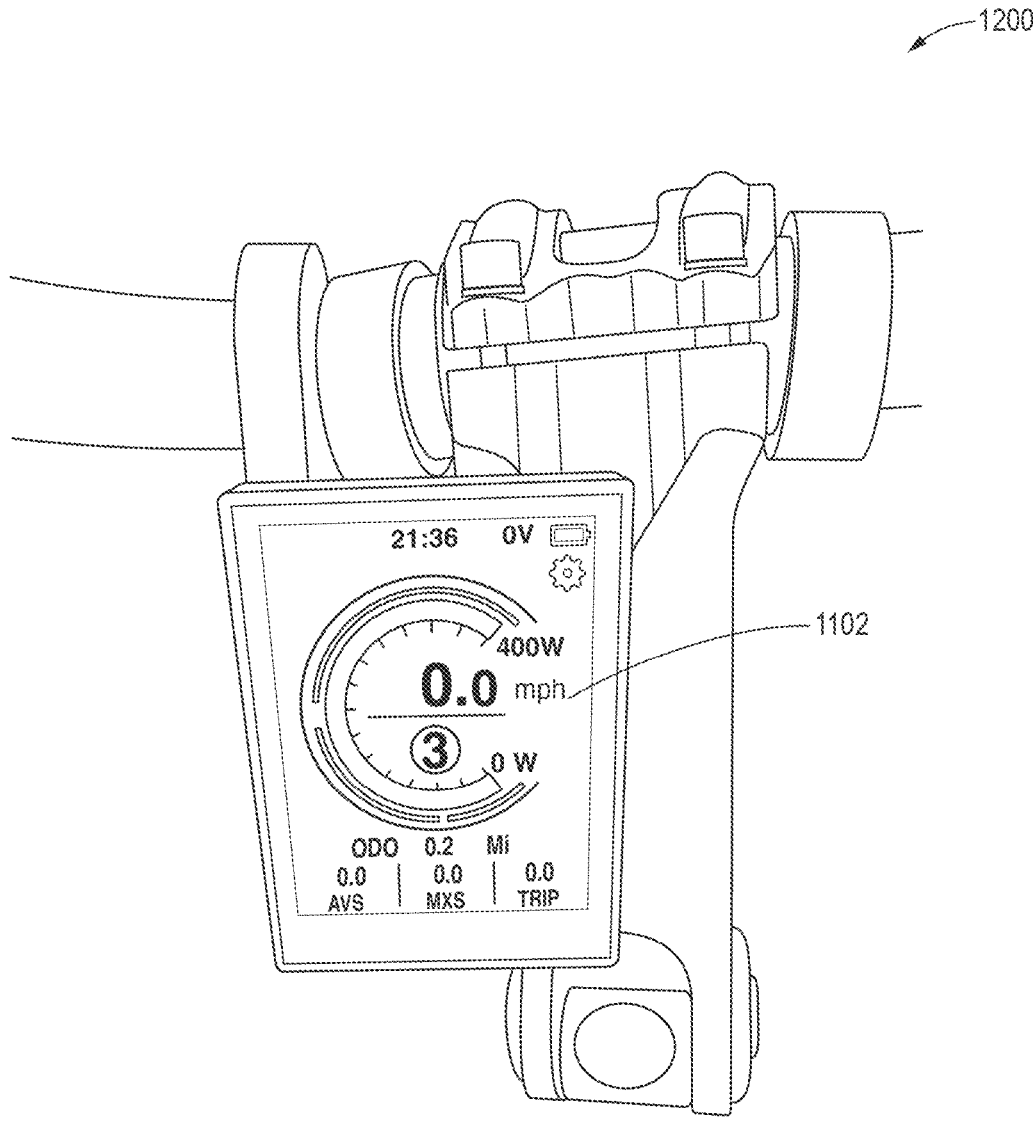
FIG. 12 is a close-up view of a color multifunction display attached to an e-trike handlebar.

FIG. 12 is a close-up view 1200 of color multifunction display 1102 attached to a handlebar of e-trike 100. In FIG.

12, color multifunction display is shown in an "ON" state, displaying various operational parameters of e-trike 100.

In one aspect, color multifunction display 1102 is powered by the one or more batteries that also power e-trike 100 (e.g., the electric motors that drive the rear wheels of e-trike 100). Color multifunction display 1102 may be configured to display various operating parameters associated with the e-trike, such as:

Battery charge

Battery power consumption (instantaneous and average)

Miles traveled (odometer)

Current speed (speedometer)

Average speed

Trip computer

Figure 13:
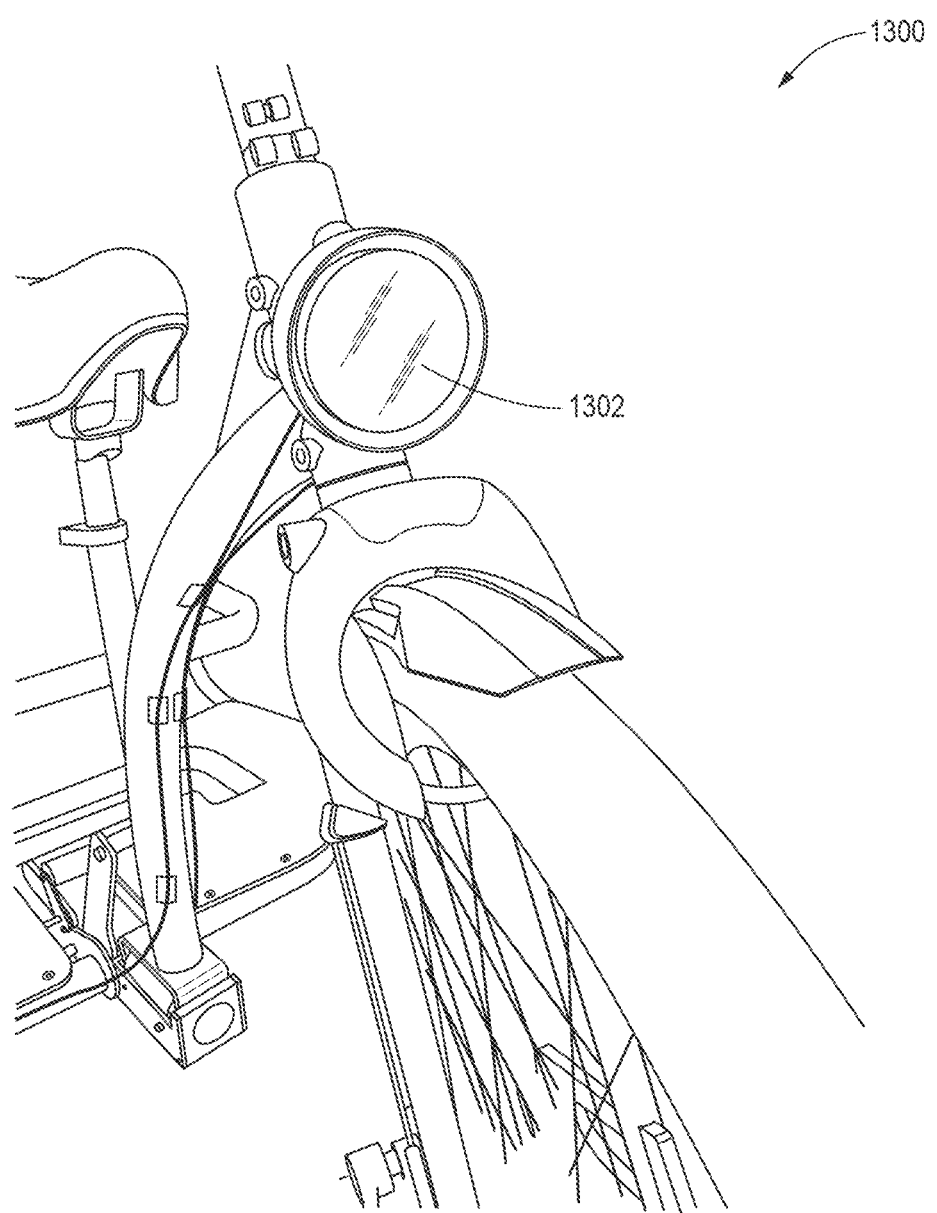
FIG. 13 is a view of an LED headlamp attached to an e-trike.

Metrics displaying instantaneous charge/discharge state of battery based on user inputs FIG. 13 is a view 1300 of an LED headlamp 1302 attached to e-trike 100. Other accessories that may be attached to the e-trike 100 include a headlamp (e.g., LED headlamp 1302) tail lamps, a security lock, one or more reflectors, etc. The lamps such as LED headlamp 1302 may be powered by the one or more batteries that power e-trike 100.

Figure 14:
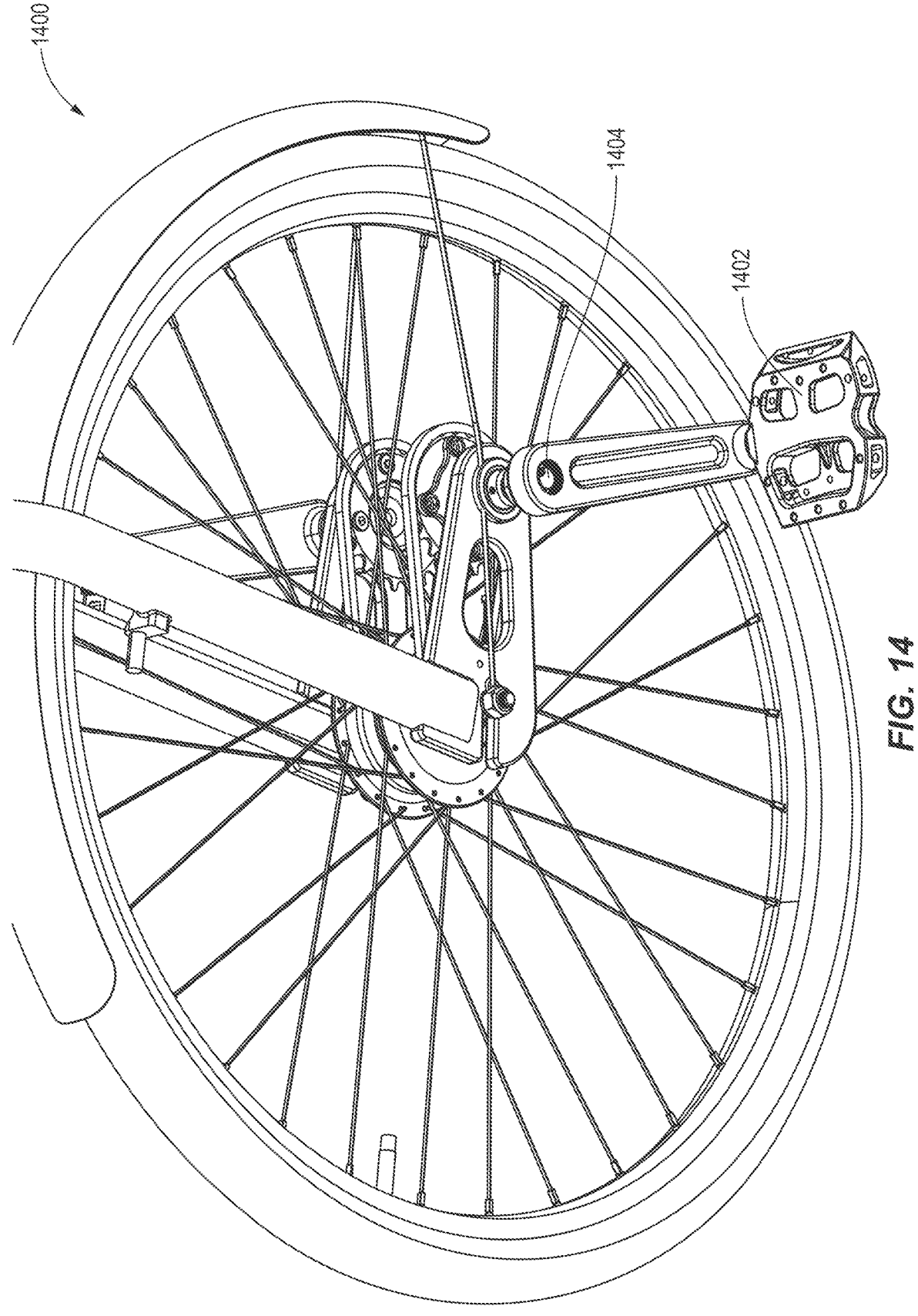
FIG. 14 is a view of an offset crank and pedal assembly associated with an e-trike.

FIG. 14 is a view 1400 of an offset crank and pedal assembly 1402 associated with e-trike 100. An embodiment of e-trike 100 is designed to be a front-drive platform for rider inputs, where the rider's pedal inputs are transmitted to the front wheel of the e-trike 100, and the e-trike 100 is driven via the front wheel. A disadvantage of directly coupling rider inputs to the front wheel of a pedal-driven vehicle is observed on vehicles such as monocycles. When a monocycle is pedaled and is in motion, the system dynamics result in a zigzag motion relative to an intended path of travel. A similar behavior can be observed in a trike with a front-drive configuration.

To mitigate the yaw/zigzag effects of direct pedal inputs to the front wheel of the e-trike 100, the crank associated with the pedal is offset towards the rear of the front wheel, as depicted in view 1400 (i.e., pedal assembly 1402). Other than pedal assembly 1402, e-trike 100 may also be with an option of a dynamic, lever operated band clamp to completely eliminate a zigzag motion on start-up and until momentum renders this unnecessary. FIG. 14 also depicts a cadence sensor 1404 included in pedal assembly 1402. Cadence sensor 1404 may be configured to sense a pedaling cadence associated with user inputs via a pair of pedals included in pedal assembly 1402 (as described subsequently).

Figure 15A:
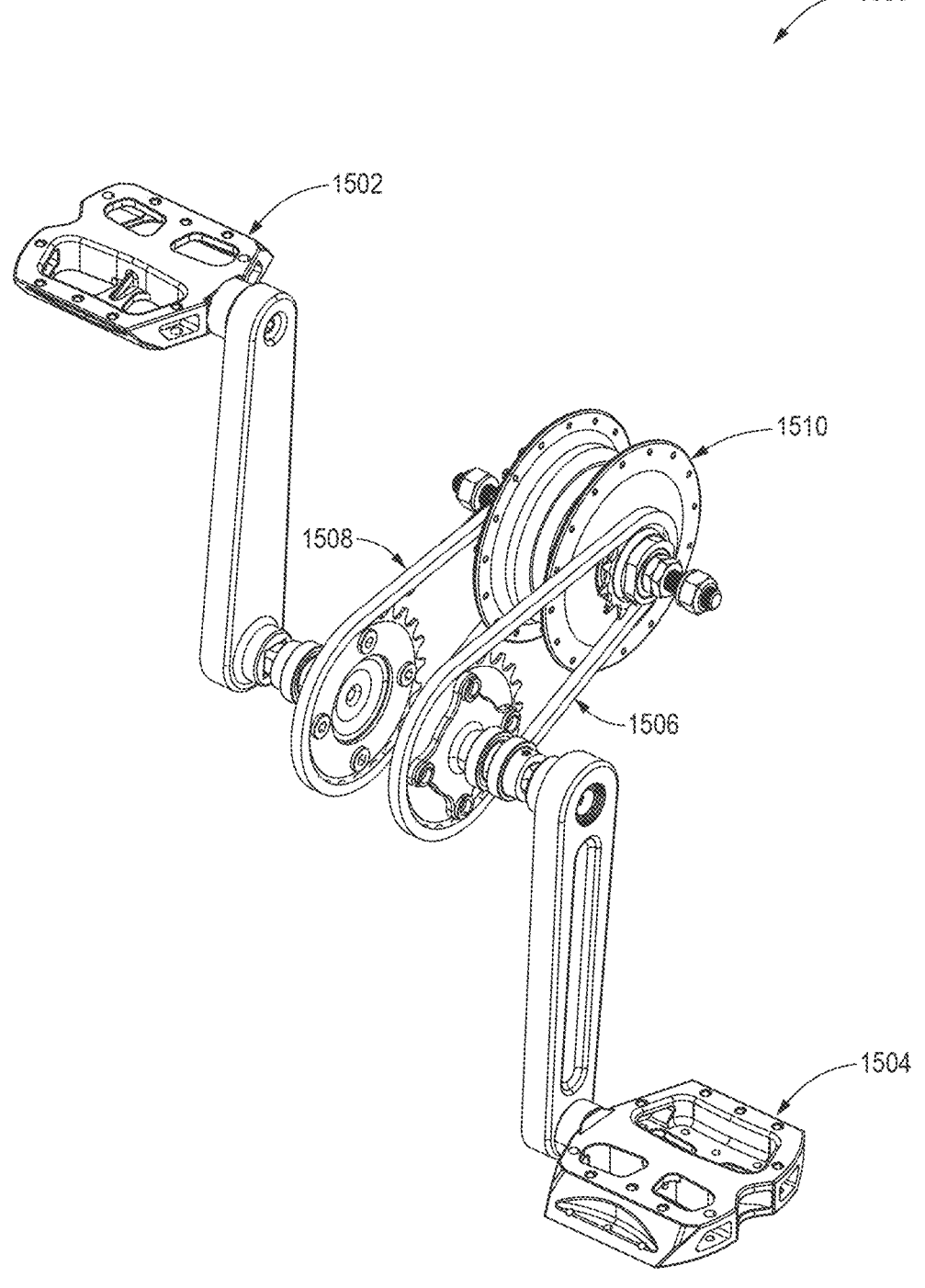
FIG. 15A is an isometric view of a pedal assembly.

FIG. 15A is an isometric view of pedal assembly 1500 (similar to pedal assembly 1402). As depicted, pedal assembly 1500 includes pedals 1502 and 1504, where the pedals 1502 and 1504 are configured to receive pedaling inputs for propulsion from a user/rider of e-trike 100. The pedal inputs are transmitted to wheel hub 1510 via chains 1506 and 1508. These transmitted inputs to wheel hub 1510 rotate and drive the front wheel of e-trike 100. This is a unique aspect to synchronize pedals 1502 and 1504. In one aspect, the front wheel hub 1510 is a part of a front wheel hub assembly that comprises an inner non-rotating axle attached to the drop-outs of the fork, around which, mounted on independent bearings, includes an intermediate rotating cylinder with identical sprockets fixed to each end. This intermediate cylinder ensures opposing pedals 1502 and 1504 remain synchronized at 180 degrees to one another. The rotation of the intermediate cylinder transmits the input torque driven by the pedals, via a "sprag clutch" (freewheel) to the hub shell to which the spokes are attached. An example embodiment of such a front wheel hub assembly is depicted in FIG. 15C. Such a front-wheel drive mechanism acts as a solid axle, while advantageously providing a turns ratio increase for the mechanical system associated with e-trike 100.

Figure 15B:
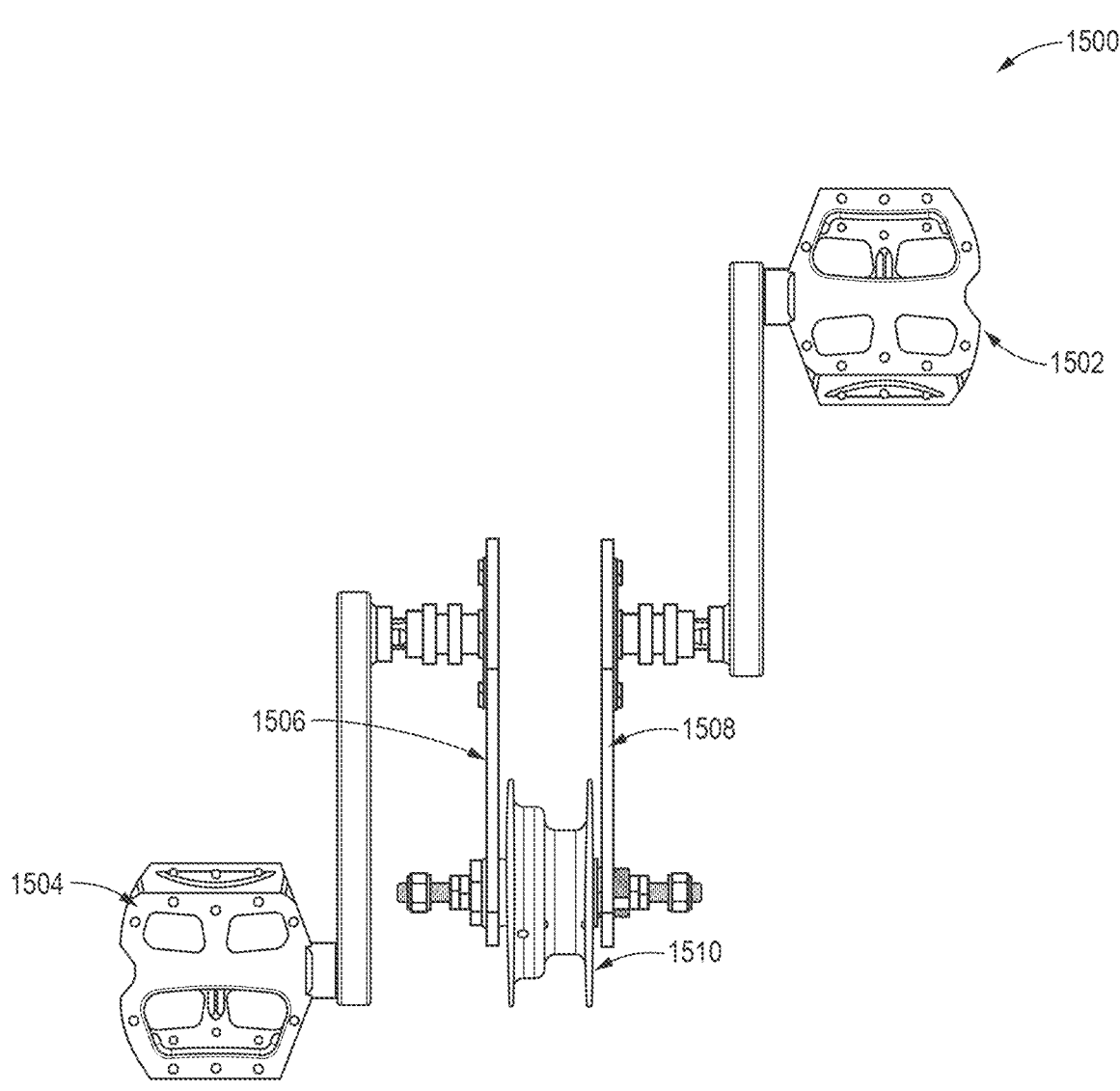
FIG. 15B is a rear view of a pedal assembly.
Figure 15C:
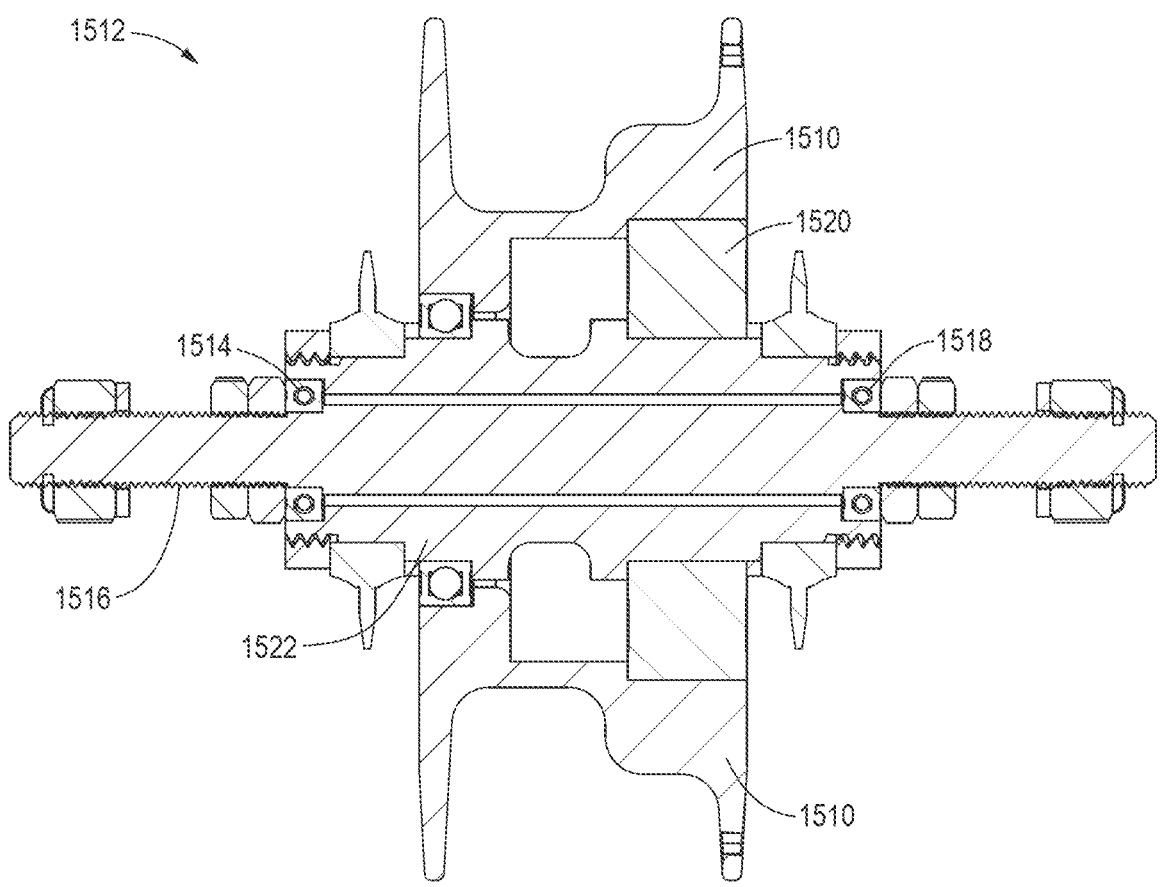
FIG. 15C is a cross-sectional view of a front wheel hub assembly.

FIG. 15B is a rear view of pedal assembly 1500 (also referred to as a "fork assembly"). The offset pedal system associated with pedal assembly 1500 facilitates a reduction in yaw. Different embodiments can be constructed with a choice of different sockets and different turn ratios offered as an ordering option for e-trike 100. One possible option is a turns ratio of 1.4:1, wherein one complete rotation of a pedal crank included in pedal assembly 1500 results in 1.4 rotations of the front wheel of e-trike 100, having a diameter of, for example, 29" (74 cm) at a typical 1 second cadence, (rotation of the pedals) yielding a speed of 15 mph (24 km/hr).

FIG. 15C is a cross-sectional view of front wheel hub assembly 1512. As depicted, front wheel hub assembly 1512 includes wheel hub 1510, independent bearings 1514 and 1518, inner non-rotating axle 1516, sprag clutch 1520, and intermediate cylinder 1522. As described above, front wheel hub assembly 1512 includes inner non-rotating axle 1516 attached to the drop-outs of the fork, around which, mounted on independent bearings 1514 and 1518, includes an intermediate rotating cylinder 1522 with identical sprockets fixed to each end. This intermediate cylinder 1522 ensures opposing pedals 1502 and 1504 remain synchronized at 180 degrees to one another. The rotation of the intermediate cylinder 1522 transmits the input torque driven by the pedals 1502 and 1504, via a sprag clutch 1520 (freewheel) to the hub shell to which the spokes are attached.

Some aspects of the e-trike 100 include a cadence sensor (e.g., cadence sensor 1404), configured to sense a pedaling cadence associated with user inputs, where the user inputs are received via pedals 1502 and 1504. The cadence sensor may be connected to pedal assembly 1500 to measure rider pedal cadence inputs. If the cadence sensor detects that the user has stopped pedaling (i.e., zero pedal inputs), the power inputs to the electric motors mechanically coupled to the rear wheels of e-trike 100 are correspondingly terminated, as a processing system connected to the electronic circuitry of the e-trike 100 determines that no power input is needed. Such situations arise, for example, when a user is riding downhill, or is coasting.

In an embodiment, the cadence sensor is connected to the electric motors (e.g., via motor and battery control electronics) via a wireless connectivity protocol such as Bluetooth. Using wireless connectivity allows the e-trike to be designed without needing electrical cables that connect the cadence sensor to the batteries and electric motors.

Some aspects of the e-trike 100 may include a speed controller mounted on the handlebar. The speed controller enables the user/rider of e-trike 100 to select a battery power output depending on their need. For example, when ascending a hill, the user may request higher battery assist (i.e., higher battery power). When descending a hill, the user may request lower (or zero) battery assist. In an aspect, the speed controller may be connected to motor and battery control electronics via a wireless connectivity protocol such as Bluetooth. Using a wireless connectivity protocol enables the e-trike 100 to be designed without the need to run electrical cables between the speed controller and the motor and battery control electronics (that may be mounted towards the rear of the e-trike).

Figure 16:
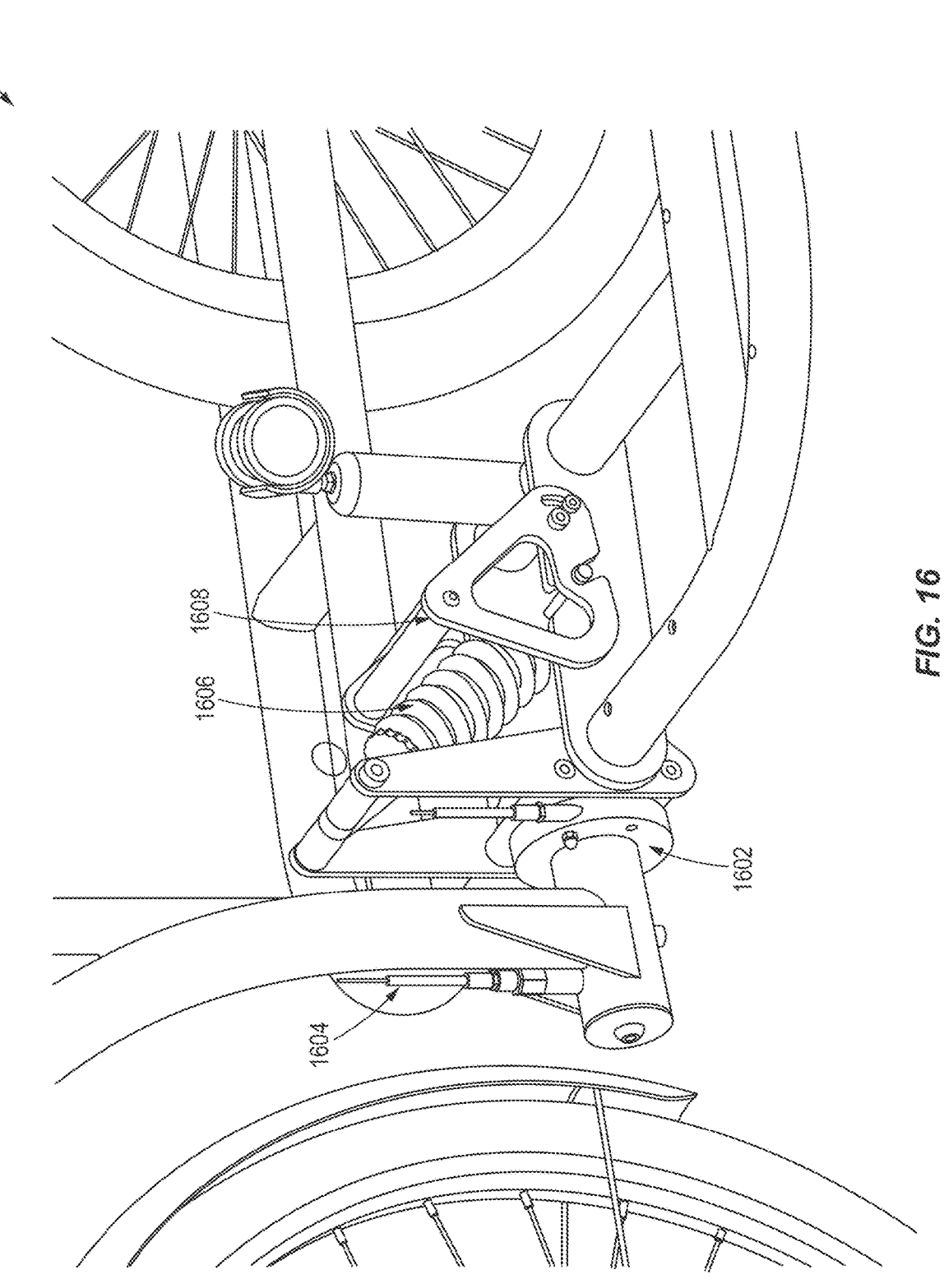
FIG. 16 is a view of a portion of an e-trike showing an elastomeric torsional element.

FIG. 16 is a view 1600 of a portion of an e-trike 100 showing an elastomeric torsional element 1602. View 1600 also depicts tilt lock lever 1604, full mid suspension 1606, and self-latching fold lock 1608.

Due to wheel configurations, bicycles and tricycles (trikes) inherently have different motion dynamics. While riding a bicycle, a rider's weight can shift to the left or to the right, due to available degrees of freedom available in the associated lateral directions. This allows the bicycle rider to lean into a turn and safely negotiate the turn. This feature is not available on a trike, due to which a trike can potentially become unstable in a turn, causing the trike to possibly tip over.

Some embodiments of the e-trike 100 incorporate aspects of the dynamics of bicycles, via adjustable elastomeric torsional element 1602 disposed at the front end of the rear frame, where the rear frame connects with the saddle assembly of e-trike 100. In one aspect, elastomeric torsional element 1602 is also referred to as a "dynamic tilt control". The elastomeric torsional element 1602 allows the handlebar, front wheel and pedal assembly of e-trike 100 to tilt relative to the rear frame, against elastic/spring tension exerted by the elastomeric torsional element 1602, about a longitudinal axis associated with the e-trike 100. In another embodiment, the handlebar, the front wheel and pedal assembly, and the saddle of e-trike 100 are allowed to tilt, against elastic/spring tension exerted by the elastomeric torsional element 1602, about a longitudinal axis associated with the e-trike 100.

When turning, a rider of e-trike 100 can lean into the turn against elastic/spring tension exerted by the elastomeric torsional element 1602, in a manner similar to how a bicyclist leans into the turn. Leaning into a turn enables a rider to shift their center of gravity to compensate for a centrifugal force effect generated due to the turning motion and facilitates counter steering, which is fundamental to bicycle ride dynamics. The elastomeric torsional element 1602 simulates an additional degree of freedom of motion to the rider of the e-trike 100 that is normally not available on a regular trike. This precessional effect of compensating for centrifugal force due to a turn by the rider of the e-trike 100 leaning into the turn provides an additional safety feature to the e-trike 100. This aspect where the longitudinal axis of the trike includes a suspension component (i.e., the elastomeric torsional element 1602) also allows for tighter turns to be made, thereby improving a maneuverability of the e-trike 100. The elastomeric torsional element 1602 allows a lowering of the effective center of gravity of the e-trike 100, where components comprising a front portion of the e-trike 100 (i.e., a front assembly including the front wheel and pedal assembly (e.g., pedal assembly 1500), the handlebars, and the saddle) tilt, but a rear portion (a rear assembly including at least a rear frame and the two rear wheels with the associated electric drive motors) of the e-trike 100 does not. Essentially, the e-trike 100 combines the most advantageous features of a bicycle and a trike, providing the stability of a trike due to the three-wheel configuration, while providing the safer dynamics and ride quality of a bicycle in turns.

In an aspect, tilt lock lever 1604 may be used to lock or unlock elastomeric torsional element 1602 via a tilt lock. When tilt lock lever 1604 is locked, elastomeric torsional element 1602 is locked and is not free to move about the longitudinal axis. In this case, the e-trike 100 behaves like a regular trike. This lock feature may be activated by a user, using tilt lock lever 1604, at low speeds or when the e-trike 100 is stationary. Activating the tilt lock may be used to stabilize the e-trike 100, preventing the e-trike 100 from tipping over when stationary and when the rider is off the e-trike 100, or when the rider is embarking on/disembarking from the e-trike 100. For example, a parent taking their child to school may engage the tilt lock lever 1604 when they are off the e-trike 100. The tilt lock engaged by tilt lock lever 1604 may also be used (i.e., be engaged) at low speeds, when there is a lesser risk of the e-trike 100 tipping over during a turn.

In an aspect, full mid suspension 1606 provides a cushioning/spring suspension effect, smoothing out road imperfections while providing a comfortable ride for the rider, and for passengers or cargo. The self-latching fold lock 1608 allows the e-trike to be securely and rigidly locked in place when unfolded. This is a safety feature that reduces any chances of motion along the folding axes while the e-trike is in use. Details of the self-latching fold lock 1608 are presented subsequently.

Figure 17:
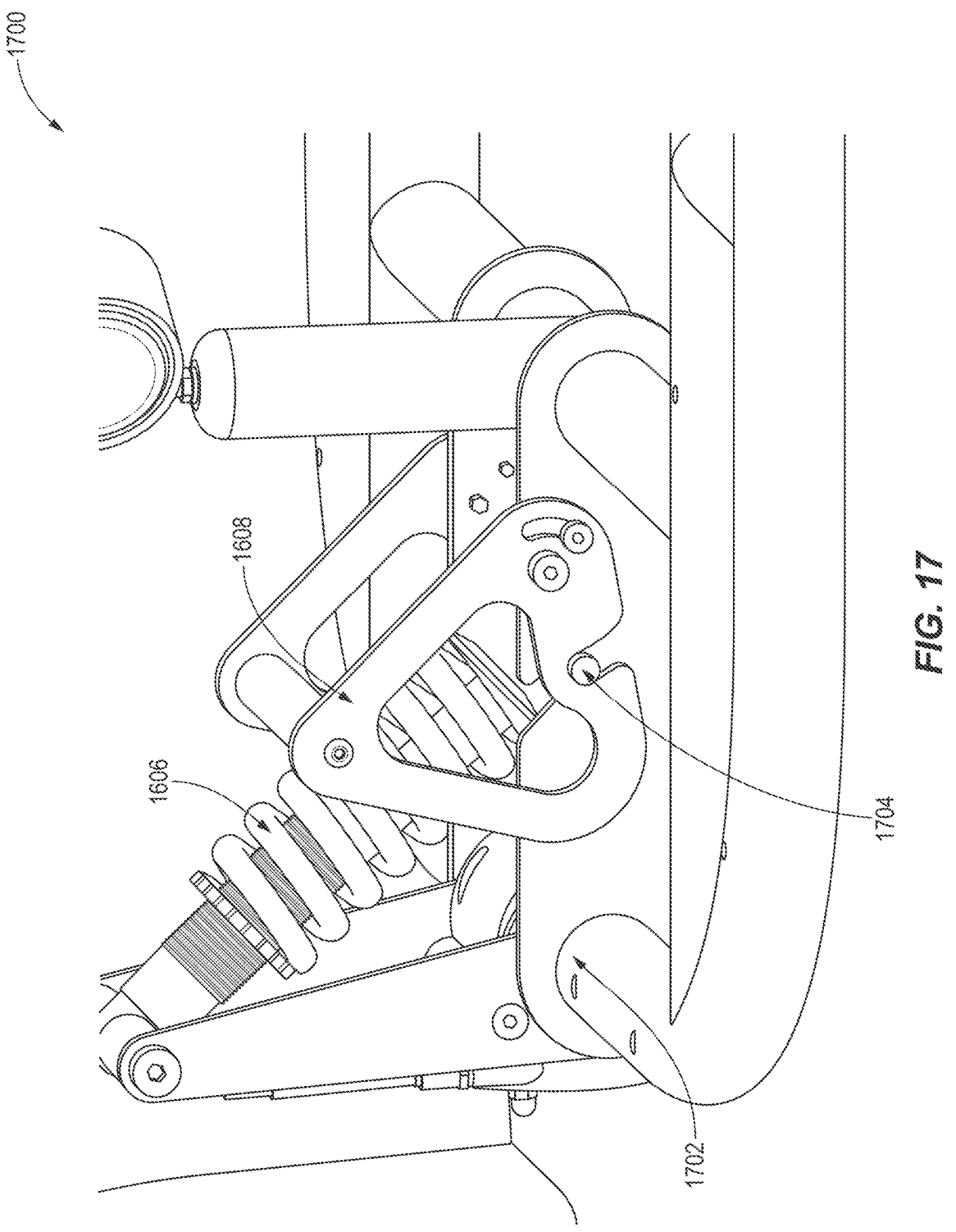
FIG. 17 is a close-up view of a self-latching fold lock in an engaged position.

FIG. 17 is a close-up view 1700 of a self-latching fold lock 1608 in an engaged position. In one aspect, self-latching fold lock 1608 engages with lock pin 1704 when the e-trike 100 is unfolded and locked. A second lock pin analogous to lock pin 1704 disposed on the other side (not visible in view 1700) also engages with self-latching fold lock 1608 when the e-trike 100 is unfolded and locked. In an aspect, the e-trike 100 folds and unfolds about axis 1702. When the e-trike 100 is unfolded and locked via self-latching fold lock engaging with lock pin 1704 and the other lock pin, any motion about axis 1702 is substantially prevented by the engaging, thereby stably locking the e-trike 100 into the unfolded position. This locking feature prevents any undesired motion about axis 1702 at any time, when the e-trike 100 is in motion or at rest. FIG. 17 also depicts full mid suspension 1606.

Figure 18:
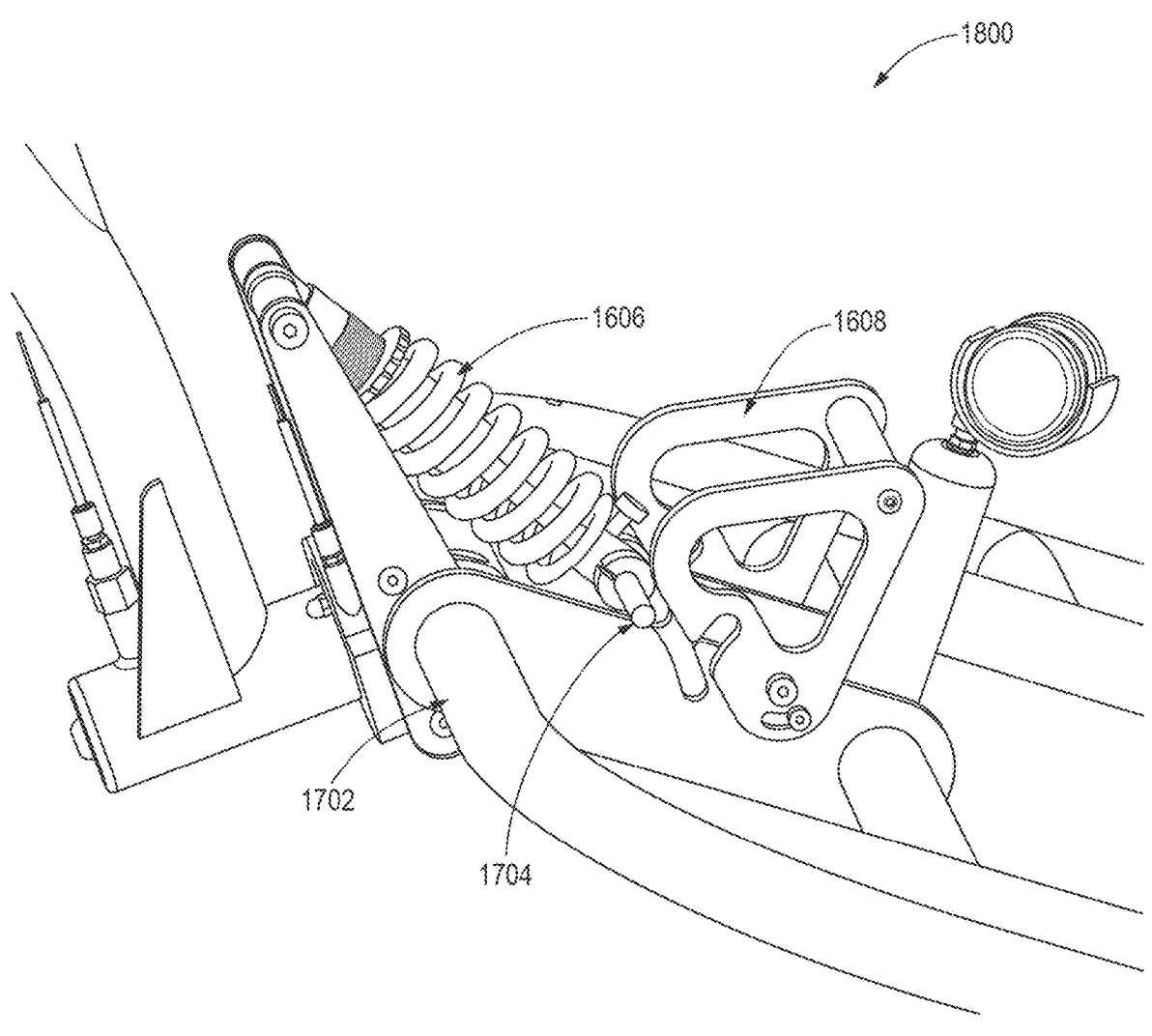
FIG. 18 is a close-up view of a self-latching fold lock in a disengaged position.

FIG. 18 is a close-up view 1800 of a self-latching fold lock 1608 in a disengaged position. As depicted in view 1800, the self-latching fold lock 1608 is disengaged from lock pin 1704 and the second lock pin. In this configuration, the rear frame and the front assembly (including the front wheel and pedal assembly, handlebars and saddle) of the e-trike 100 can now rotate about axis 1702 for folding, as depicted in the sequence of FIGS. 3A-3C. FIG. 18 also depicts full mid suspension 1606.

In one aspect, during an unfolding process, a user unfolds the e-trike 100 from its fully folded position to a fully unfolded position about axis 1702, where self-latching fold lock 1608 engages with lock pin 1704 and the second lock pin to lock the e-trike 100 in the fully-unlocked position. On the other hand, to fold the e-trike from its fully unfolded position, a user depresses a lever to unlatch self-latching lock 1608 such that self-latching lock 1608 disengages from each of lock pin 1704 and the second lock pin. The e-trike can now be rotated about axis 1702, to a fully-folded position.

Figure 19:
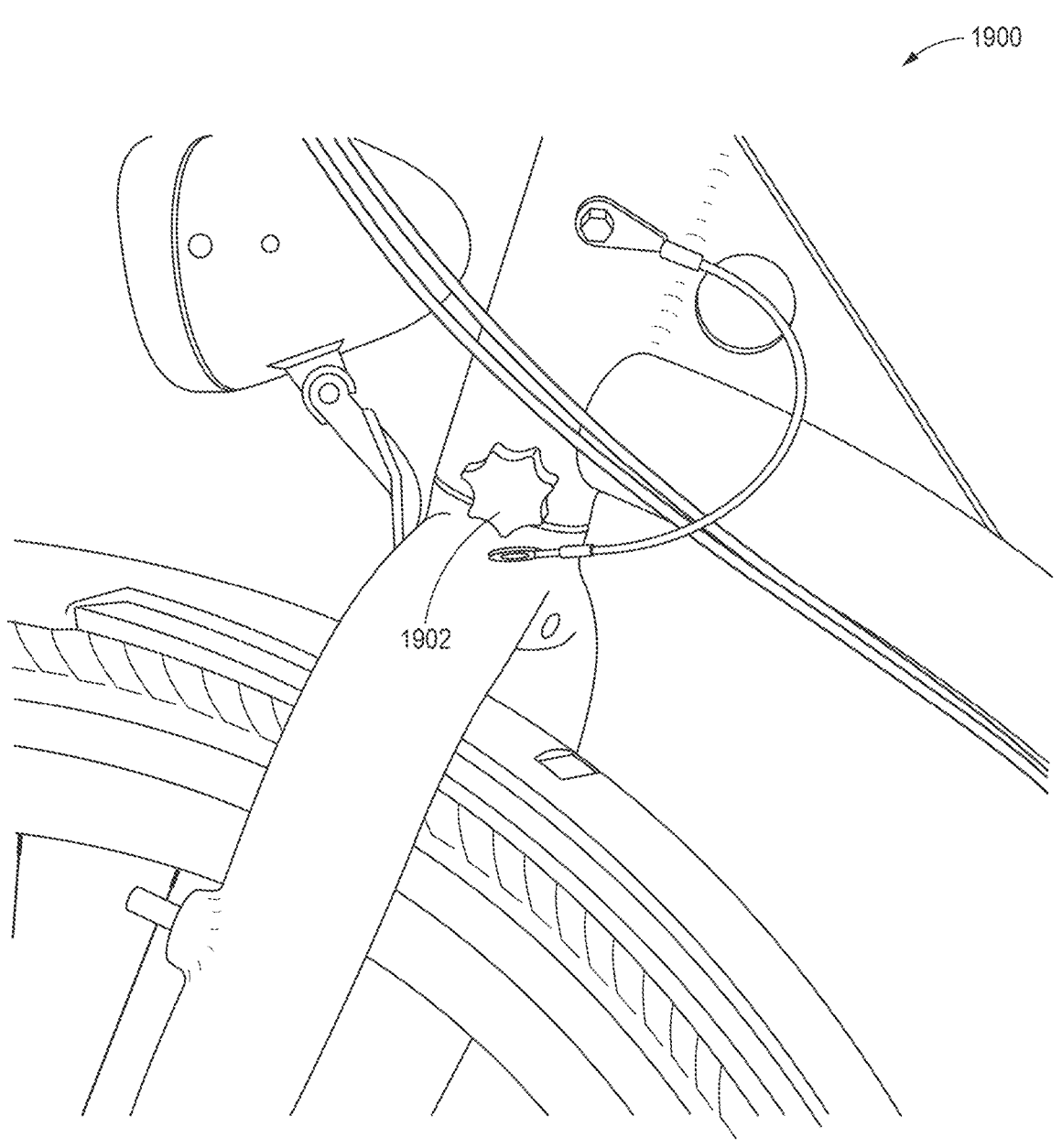
FIG. 19 is a view depicting a steering lock for an e-trike.

FIG. 19 is a view 1900 depicting a steering lock 1902 for e-trike 100. In one aspect, steering lock 1902 is implemented as a latch (not depicted in FIG. 19) is used to prevent a zigzag motion on start-up or when putting the tricycle in the folding mode. In one aspect, the steering lock 1902 is a screw-in knob to lock steering when folding. A user may operate a screw associated with steering lock 1902 to lock the handlebar of the e-trike 100 in place, as depicted in FIG. 19. In the locked position, the handlebar remains locked in a central position, and is unable to be rotated in either a left or a right direction. From an operational standpoint, the user can engage the steering lock 1902 prior to folding the e-trike 100. When the e-trike 100 is unfolded and is in use, the user unlocks the steering lock 1902 to allow a full range of motion of the handlebars. This facilitates regular steering for the e-trike 100.

Figure 20:
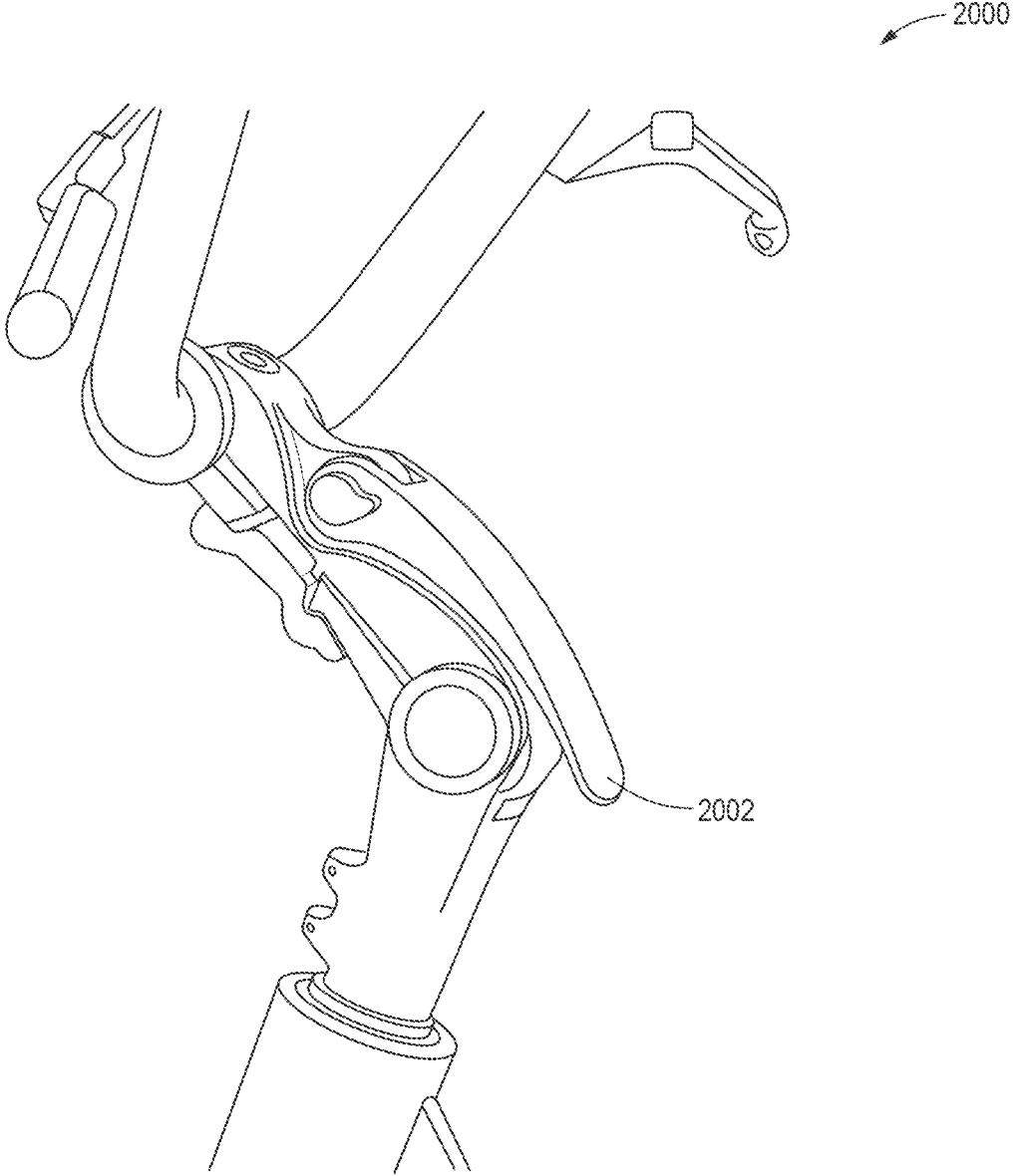
FIG. 20 is view depicting a lever used to adjust a handlebar angle for an e-trike.

FIG. 20 is view 2000 depicting a lever 2002 used to adjust a handlebar angle for e-trike 100.

Figure 21:
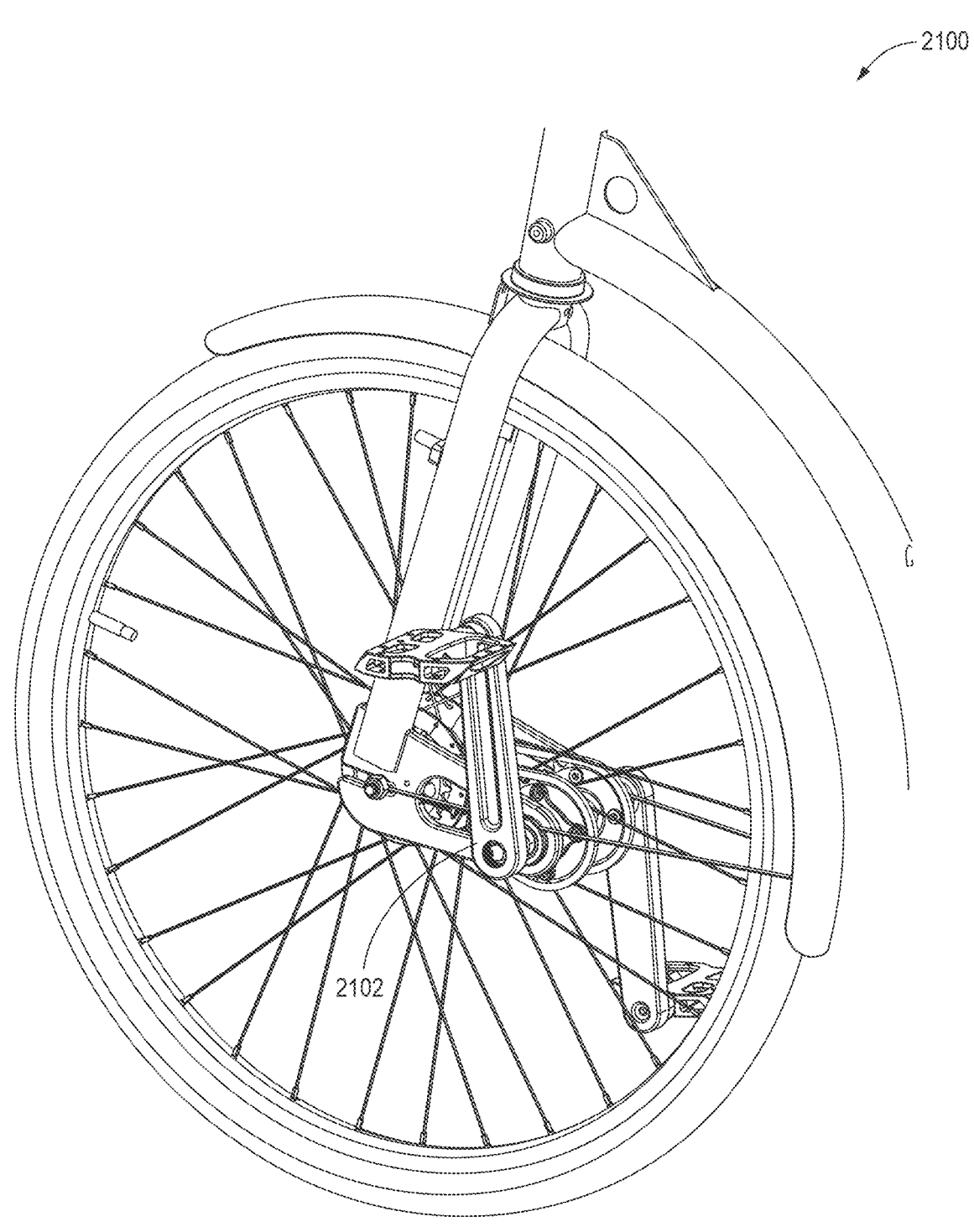
FIG. 21 is a view depicting an offset crank pedal of an e-trike.

FIG. 21 is a view 2100 depicting an offset crank pedal 2102 of e-trike 100. In an aspect, crank pedal 2102 is similar to any of pedals 1502 or 1504, and is connected to pedal assembly 1500. In one embodiment, the e-trike 100 includes a 29-inch, 700*c* front wheel that provides a lower rolling resistance as compared to smaller front wheels. The relatively larger wheel size also helps to smooth out the ride for a rider.

In one aspect, pedal assembly 1500 receives front-drive user inputs for the e-trike 100, which has an all-wheel drive (AWD) drivetrain. As depicted in FIGS. 15A, 15B and FIG. 21, the crank is offset to the rear to give comfortable access to a leg length of a rider based on a position of the saddle, and also to minimize the zigzagging effect that is observed on a tricycle.

Figure 22:
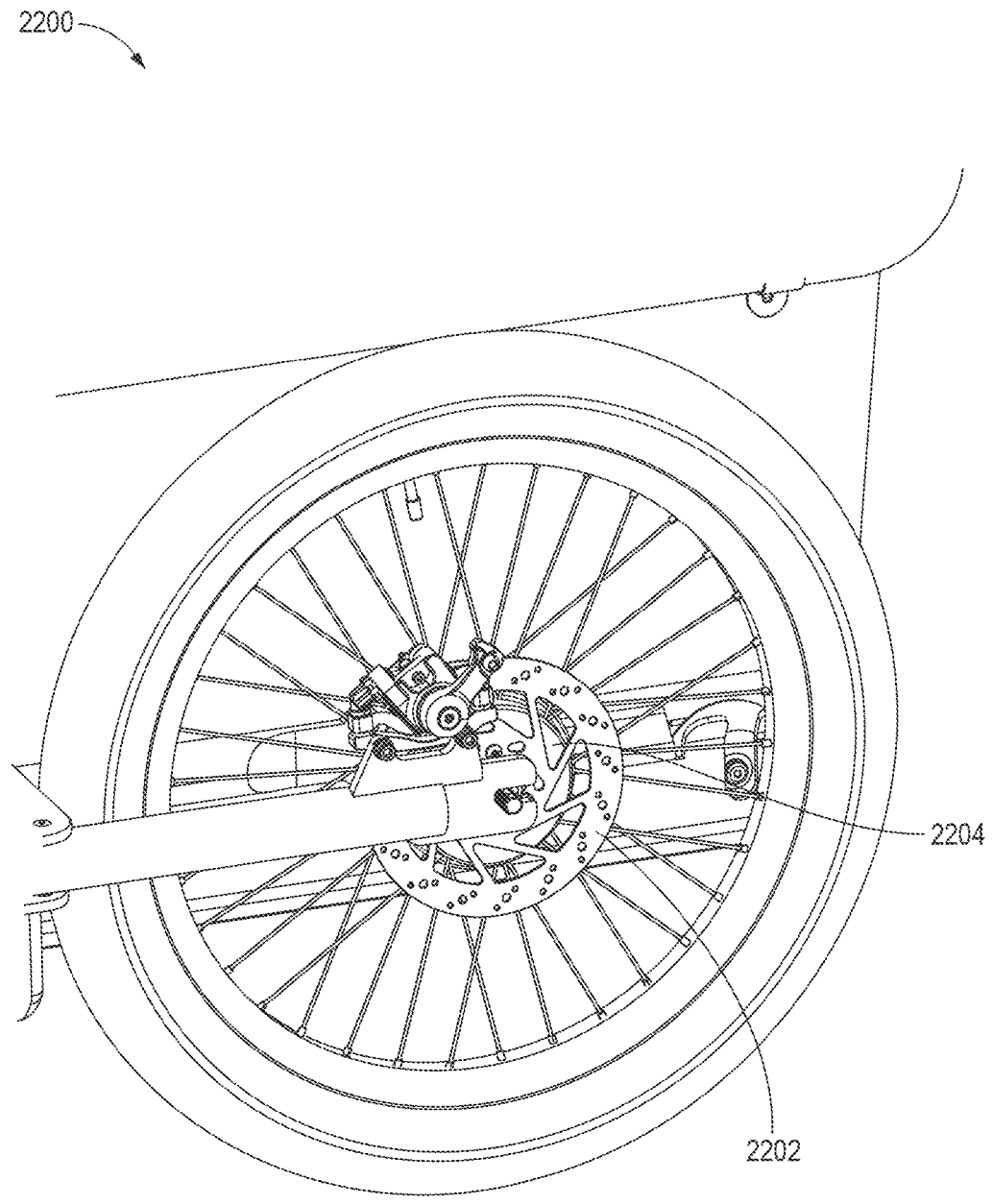
FIG. 22 is a view depicting a disk brake on a rear wheel of an e-trike.

FIG. 22 is a view 2200 depicting a disk brake 2202 on a rear wheel of e-trike 100. Specifically, view 2200 depicts a rear left wheel of e-trike 100. Some embodiments of the e-trike 100 include a dual braking system, which comprises one lever actuating two rear disk brakes, with one disk brake being associated with each of the two rear wheels. An example embodiment of a disk brake on an e-trike 100 is disk brake 2202. View 2200 also depicts an electric motor 2204 connected to the rear left wheel, or incorporated within the rear left wheel structure. Electric motor 2204 may be battery-powered, and configured as a hub motor connected to a hub of the rear left wheel. A similar electric motor is separately connected to a hub of the rear right wheel (not depicted in view 2200, but understood to be in a configuration that is symmetrical to the connection of electric motor 2204 to the left rear wheel in view 2200).

In one aspect, each of the rear wheels of e-trike 100 is powered by an electric motor (e.g., electric motor 2204 powering the rear left wheel as shown in view 2200, and the other electric motor connected to the rear right wheel and not depicted in view 2200). Each electric motor may be controlled by a motor control system that is monitored by multifunction display panel 1102. A motor control system of e-trike 100 may be configured to communicate via Bluetooth connectivity with each of the two electric motors. In one embodiment, the electric motors produce a total of 40 (×2 with dual motors) Nm of torque. Each motor may be powered by a rechargeable electric battery of capacity 40 Ah, 48 W. The two batteries may be mounted underneath the rear frame of the e-trike 100 for a lower center of gravity.

Figure 23:
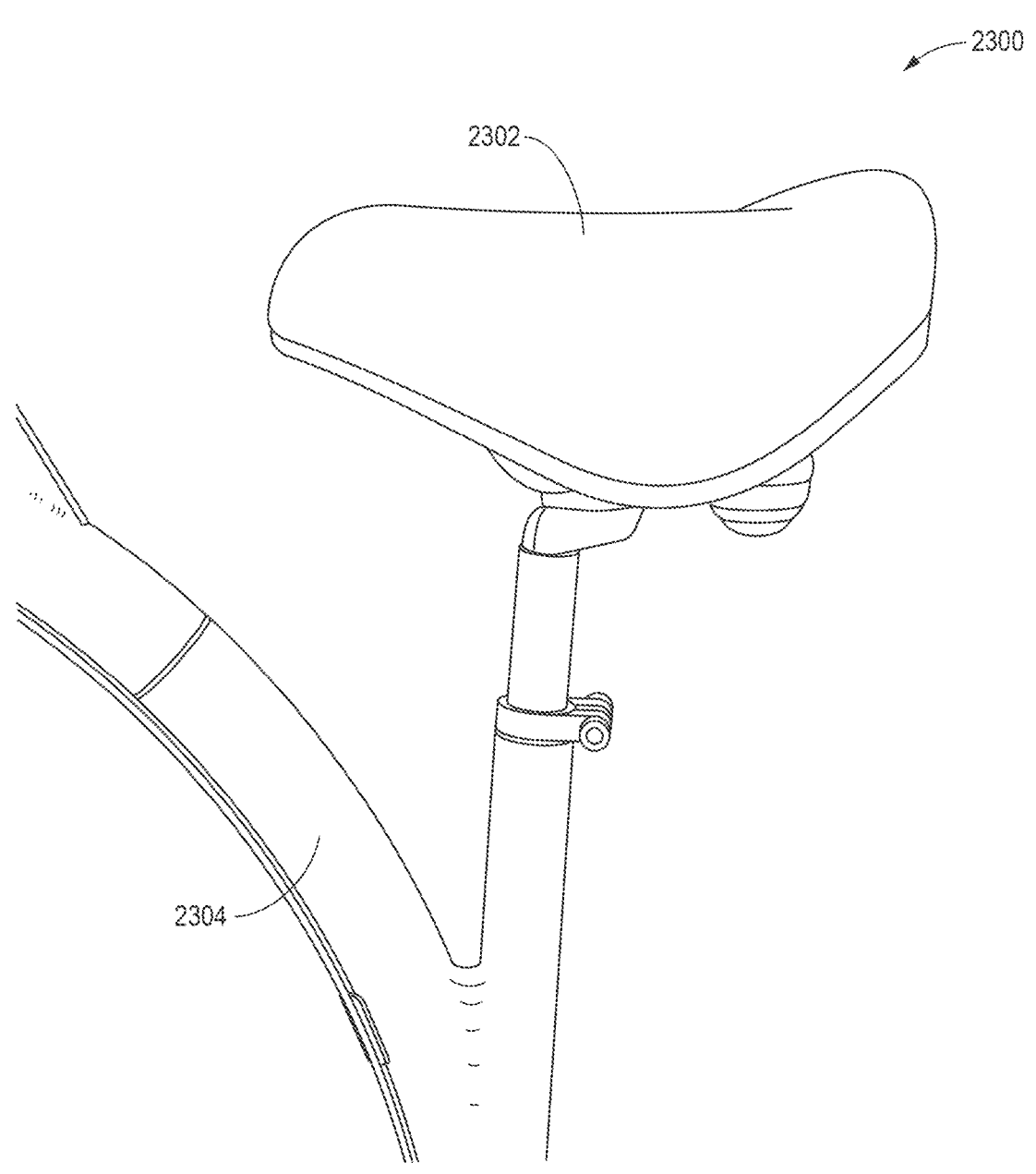
FIG. 23 is a view depicting a saddle of an e-trike mounted to a front wheel arch.

FIG. 23 is a view 2300 depicting a saddle 2302 of e-trike 100 mounted to a front wheel arch of e-trike 100 (i.e., mounted as a part of the front assembly). Saddle 2302 may be a configurable (e.g., height-adjustable) saddle. In an alternate embodiment, saddle 2302 is mounted to the rear assembly of e-trike 100.

Figure 24:
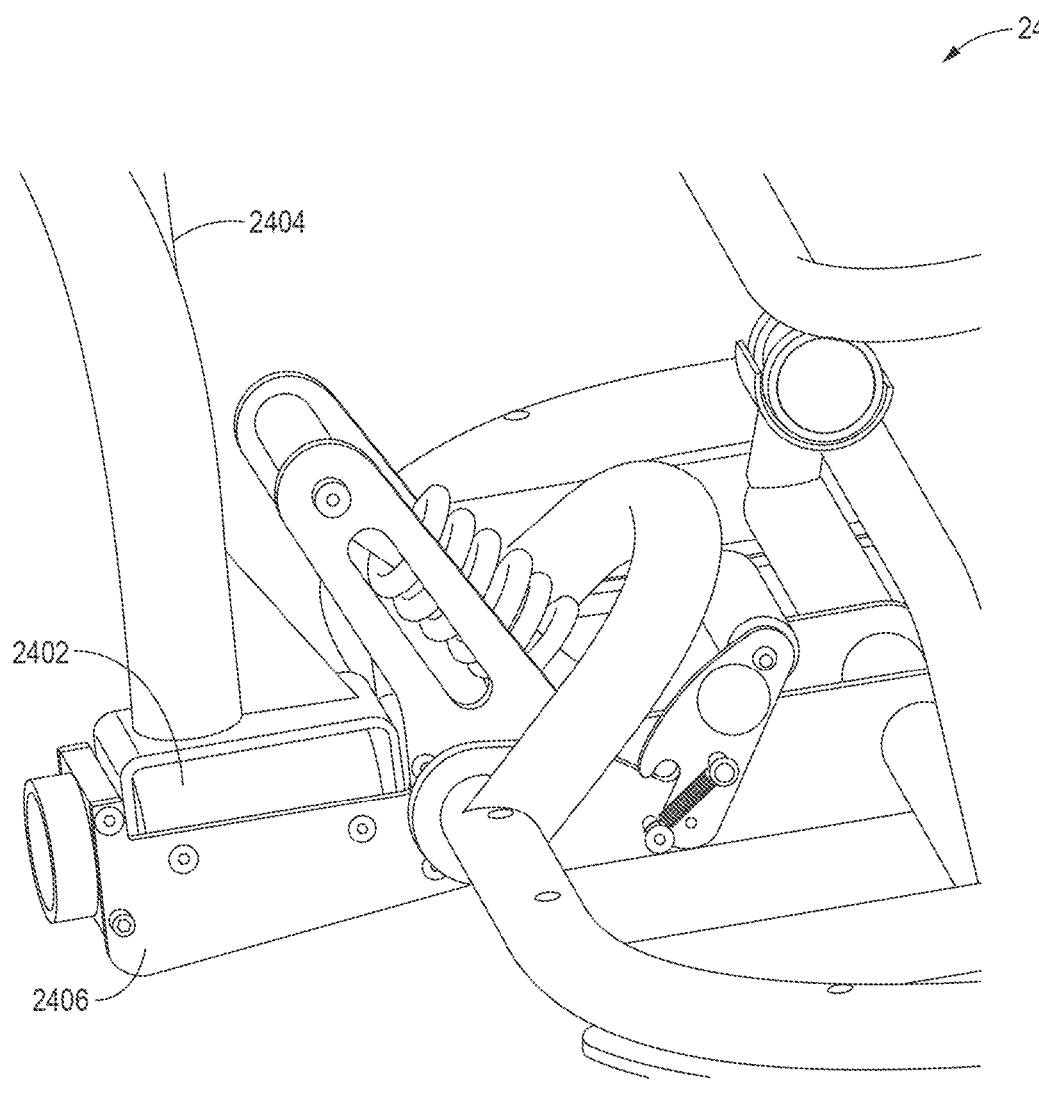
FIG. 24 is a view of a saddle and front wheel arch of e-trike 100 connected directly to an elastomeric torsional element.

FIG. 24 is a view 2400 of a saddle and front wheel arch 2404 of e-trike 100 connected directly to elastomeric torsional element 2402. Elastomeric torsional element 2402 may be similar to elastomeric torsional element 1602. In one aspect, the elastomeric torsional element (e.g., elastomeric torsional element 1602/2402) controls an amount of tilt necessary for the e-trike 100. A tricycle configuration such as that used for the e-trike 100 is inherently stable, having three wheels, rather than a bicycle that has two wheels. At the same time, the tilt feature provided by the elastomeric torsional element 1602/2402 enables a rider to lean into the corners so although the e-trike 100 has the three-wheel stability of a trike, it rides like a bicycle in the corners. This feature is important for safety when traveling at speed. View 2400 also depicts a mechanical stop 2406. Mechanical stop 2406 is configured to limit a range of motion provided by the elastomeric torsional element 2402 (e.g., when the rider is leaning while negotiating a turn). While elastomeric torsional element 2406 provides an elastic/spring tension resistance to a degree of tilt, mechanical stop 2406 provides a hard stop that prevents any further tilting motion of the forward assembly of e-trike 100. A similar mechanical stop as mechanical stop 2406 may be provided on an opposite side of elastomeric torsional element 2402 (not depicted in view 2404, being hidden by elastomeric torsional element 2402 and other components in view 2400). This other mechanical stop may be configured to constrain the rider's tilt in an opposite direction to the tilt direction associated with mechanical stop 2406.

In one aspect, the saddle of the e-trike may 100 be mounted such that the saddle is connected to the elastomeric torsional element. In this case, the saddle is directly connected to the front wheel arch, and can tilt in unison with the front wheel assembly. This allows the rider to lean their body into a turn while turning. Element 2404 in view 2400 depicts such a saddle construction directly connected to elastomeric torsional element 2402.

Figure 25:
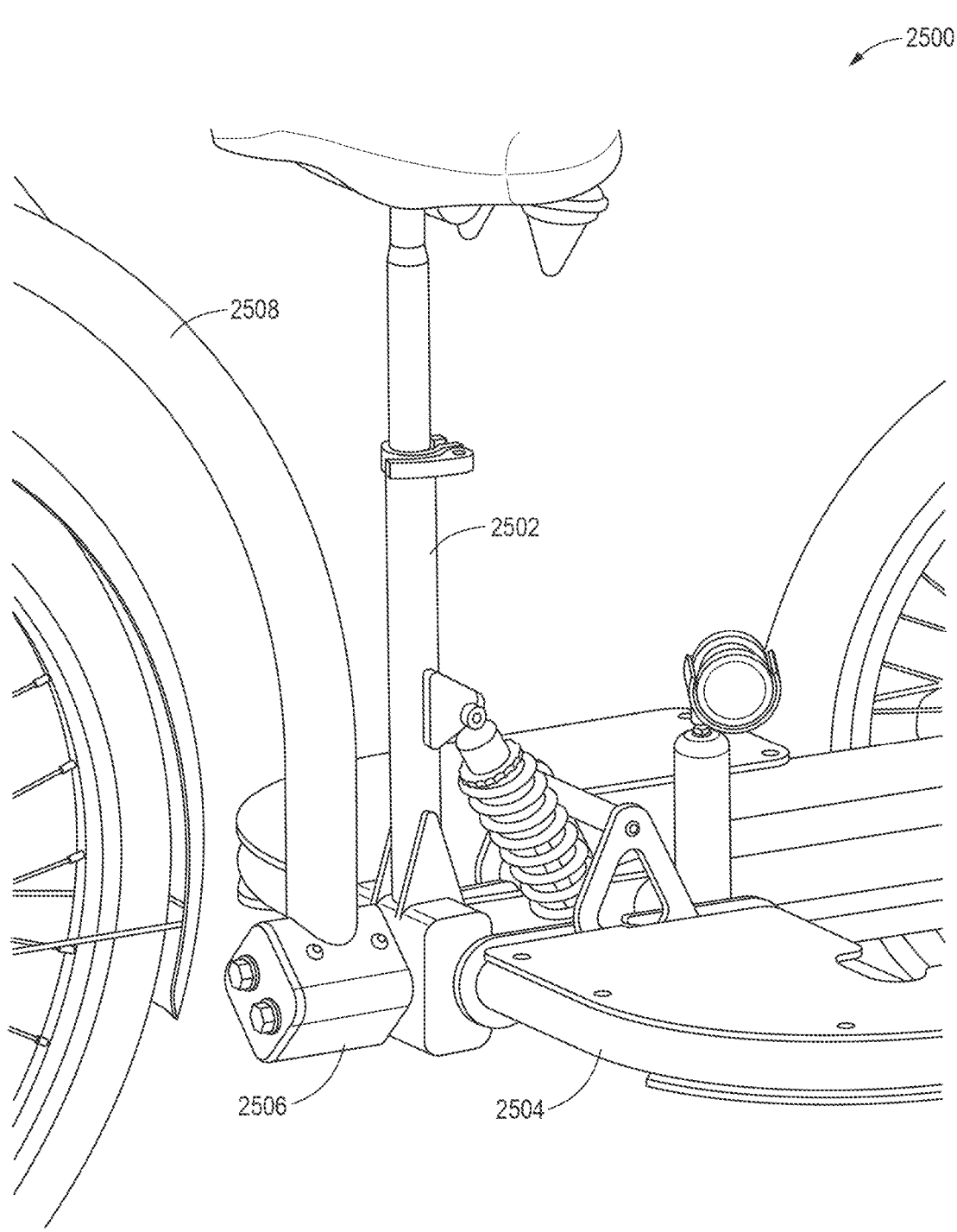
FIG. 25 is a view of a saddle rigidly attached to a rear assembly of an e-trike.

FIG. 25 is a view 2500 of a saddle 2502 rigidly attached to a rear assembly 2504 of e-trike 100. In this embodiment, only the front wheel assembly and the handlebars (collectively referred to as the "front frame" or "front assembly") 2508 are connected to the elastomeric torsional element 2506 (similar to elastomeric torsional element 1602), and are enabled to tilt. The saddle 2502, on the other hand, is cannot tilt, since the saddle is rigidly attached to the rear assembly 2504.

In an aspect, the saddle itself 2502 is adjustable, and can be raised or lowered depending on a leg length of the rider. In one aspect, the elastomeric torsion element 2506 is selected or designed such that an elastic torque exerted by the elastomeric torsion element 2506 ensures that the steering column (a part of front frame 2508) returns to vertical when stationary or not under an external force exerted by the rider. At the same time, this elastic torque is not too high to prevent requisite tilt to for tangential impingement of the front wheel to the road surface while turning.

When the saddle 2502 is affixed to the non-tilting rear frame 2504 and the elastomeric torsional element 2506 is attached to the front frame 2508, this arrangement allows the steering column to tilt adequately and for the rider to shift their weight to counteract the centrifugal force for the dynamic/variable conditions depending upon turn radius and velocity.

In one embodiment, the front frame suspension and pedal assembly (e.g., pedal assembly 1500) of e-trike 100 allows rider to backpedal, coast or freewheel just like a regular bicycle. Both pedals (i.e., pedals 1502 and 1504) are fully synchronized due to the use of a two-chain system (i.e., chains 1506 and 1508), each driving the wheel hub 1510 in a forward direction. Inside the wheel hub 1510 is a triple-axle system with a rolling clutch. This results in silent operation when backpedaling, instead of the clicking sound that is a characteristic commonly seen in bicycles. In this regard, the e-trike 100 is smooth and quiet.

In an aspect, the each of the front and rear assembly of e-trike 100 may be comprised of an aluminum frame that can be made much lighter in weight as compared to a regular tricycle, whose frame has to be very strong and rigidly welded together. These front and rear assemblies may be connected by a combination of the elastomeric torsional element 1602 and the mid suspension 1606. Mid suspension 1606 is configured to provide a smooth ride for both the rider and for occupants or cargo in the cargo box 202. In an aspect, mid suspension 1606 is implemented using a coil over shock (or damper) mechanism that absorbs a large portion of an impact when the e-trike 100 travels over bumps.

In general, a tricycle frame needs to be made structurally rigid to provide the requisite structural strength to the frame. The downside of this construction is that the corresponding ride over bumps and rough terrain can be very uncomfortable and jarring for the rider, as the bumps are transmitted substantially unattenuated to the rider. In an aspect, the frame connecting the front and rear wheels for the e-trike 100 does not need to be made strong and rigid when the midframe suspension component (i.e., mid suspension 1606) is used. In the e-trike 100, the weight is distributed throughout the structure, and the dynamic load is absorbed by the shock (e.g., a mid-frame suspension component, or mid suspension 1606).

In one aspect, a center of gravity of the e-trike 100 is designed to be as low as possible. The rider's center of gravity is important so that the centrifugal force when steering around corners can be counteracted. As far as the load carried by the e-trike 100 (e.g., in the cargo box 202) is concerned, it is desirable that the load itself remain flat and parallel to the ground and contribute as little as possible to the centrifugal force on cornering. To further lower the center of gravity of the rear frame, the batteries are mounted under the rear frame, and the cargo box 202 is designed so that the main mass carried in the cargo box 202 is as low as possible. In one aspect, the mass carried in the cargo box 202 is at the center of the rear wheels. In a particular aspect the rear wheels are 20 inches in diameter. The rear wheels each have the same cross section as the front wheel, of 2.25 inch. This provides further shock absorbing properties for a smoother ride.

In an aspect, the cargo box 202 is a demountable box cart. In this sense, the cargo box 202 is also referred to as a "cargo boxcart". The cargo box 202 can be released and demounted from the e-trike 100, and moved around on wheels. Once the lock for the cargo box 202 is released, the cargo box 202 can be lifted up and demounted, and wheeled around like a cart. In an aspect, the cargo box 202 can be used as a shopping cart. A rider transporting children can demount the cargo box 202 and transport the children through a supermarket while using the cargo box 202 on wheels as a shopping cart. In this way, the rider can bring their children or valuables with them, and does not need to leave their children or valuables outside with the e-trike 100. After the rider is done with their shopping trip, they can attach the cargo box 202 back on the e-trike 100 and ride away.

Another feature of having the box cart demountable 202 is that the e-trike 100 can be folded when the cargo box 202 is demounted. The steps for folding the e-trike are as follows:

Lock the steering column of e-trike 100 (e.g., by using the steering lock 1902).

Use the quick release (e.g., self-latching fold lock 1608) to unlock the midsection lock of the e-trike 100.

The e-trike 100 can now be folded and rested on its two rear wheels and a jockey wheel. The e-trike is maneuverable in the folded state, and can be rolled into a building.

No tools are required to fold or unfold the e-trike 100.

The folded e-trike 100 can fit into an elevator, and be wheeled into an apartment. In this way, an owner of the e-trike 100 does not need to store the e-trike outdoors (e.g., in the street). The folded e-trike 100 is relatively compact, and this feature addresses issue of storing a large cargo trike with an attached cargo box. It is important to note that the cargo box 202 needs to be removed before the e-trike 100 can be folded (or unfolded).

To unfold the e-trike 100, a reverse sequence of operations can be performed:

Unfold the e-trike 100 so that self-latching fold lock 1608 engages

Unlock the steering lock 1902 to allow a full range of motion for the steering.

The relative simplicity of folding and unfolding the e-trike 100 is advantageous to an owner/rider, especially for owners living in an apartment. The demountable cargo box 202 advantageously has versatility, as it can be used not only for transport while mounted on the e-trike 100, but also as a wheeled cart to carry and transport children and/or cargo when demounted from the e-trike.

In summary, the features of the e-trike 100 include:

The tilting e-trike 100 is inherently safer than a cargo bike, since the three-wheel configuration is inherently stable as compared to a cargo bike. A rider of the e-trike 100 does not have to worry about balancing the vehicle on two wheels, particularly when starting and stopping. In addition, the tilting feature of the e-trike 100 addresses the associated instability of a three-wheeled platform (i.e., a tricycle) when negotiating turns. In the e-trike 100, the tilting aspect (i.e., dynamic tilt control) is achieved by the elastomeric torsion element 1602, as described previously.

The folding feature of the e-trike 100 (with the cargo box 202 demounted) allows an owner to transport and store the e-trike 100 in relatively compact spaces. For example, the folded e-trike 100 can be wheeled into a building, into an elevator, and then into an apartment. This allows an owner of the e-trike 100 to store the e-trike indoors. In part, the folding capability is achieved by the front-drive capability of the e-trike 100 for rider inputs, where rider inputs are directly transmitted to the front wheel via, for example, pedal assembly 1500. This front-drive configuration prevents the need for mechanical linkage to transmit power to the rear wheels (as would be required for a rear-drive configuration similar to a bicycle). Not having such a mechanical linkage further facilitates folding.

The full mid suspension 1606 helps improve ride comfort by eliminating the need for a solid tricycle frame assembly. Mid suspension 1606 is configured to absorb dynamic impacts due to bumps and uneven terrain. This aspect reduces stress on the e-trike 100 assembly, as well as improves ride comfort.

The e-trike 100 is configured as an all-wheel drive vehicle via a direct rider inputs to the front wheel, and an electric motor at each of the rear wheels. This all-wheel drive configuration is advantageous, as the rear motors provide rider assist to reduce an amount of effort exerted by the rider when pedaling. At the same time, the all-wheel drive configuration can be designed to provide better traction and ride stability as compared to front-only or rear-only drive configurations. This provides a greater margin of safety for the rider, making the e-trike 100 a safer vehicle than its front-drive or rear-drive counterparts.

In an aspect, the cargo box 202 may be configured to be used as a hot/cold vending storage system. Specifically, the cargo box 202 may be modified with insulating properties and/or heating or cooling features that may be used to keep hot items hot, and cold items cold. This allows the e-trike 100 to be used as a hot food vending system, or a cold food (e.g., ice cream or desserts) vending system.

Figure 26:
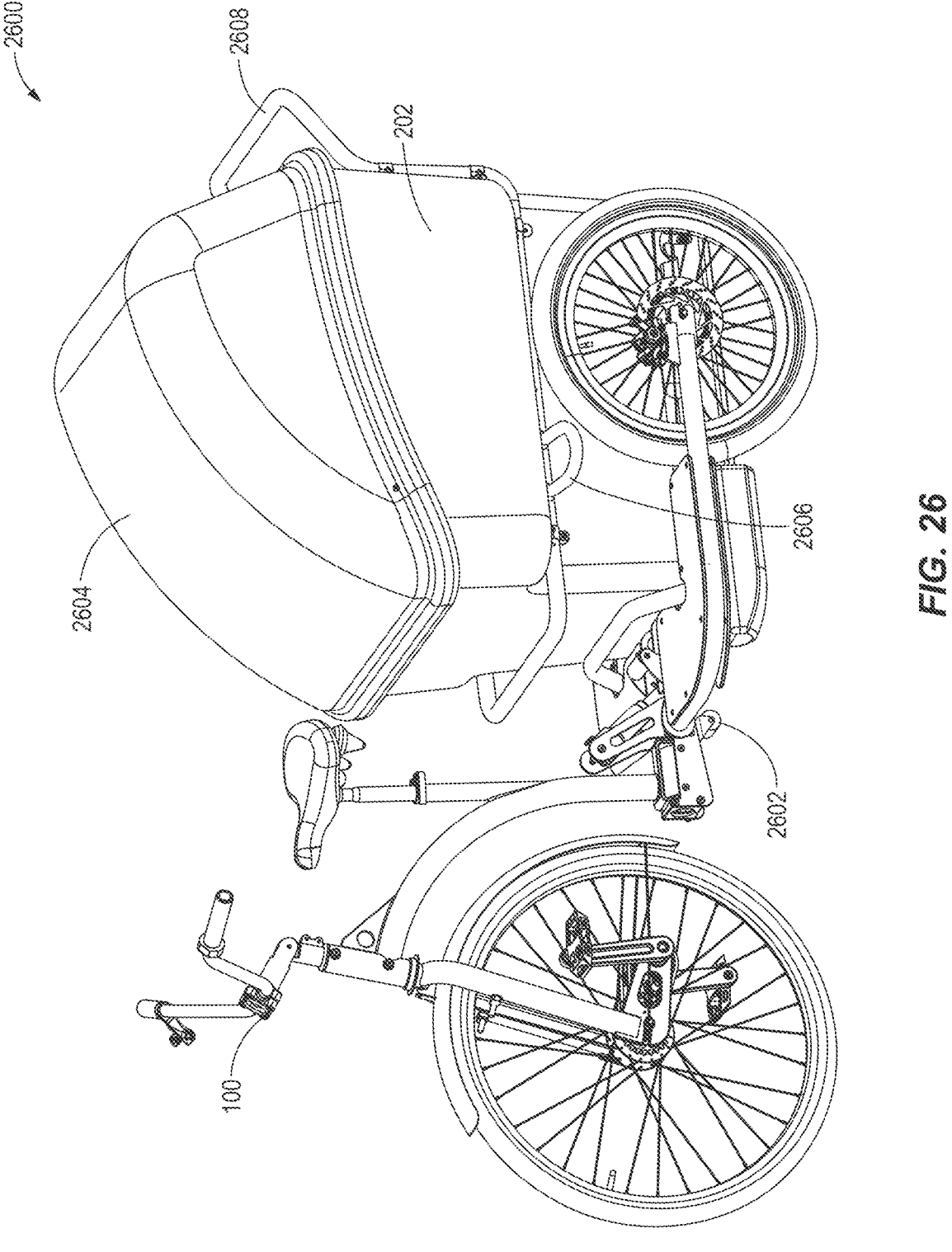
FIG. 26 is a view of an e-trike.
Figure 27:
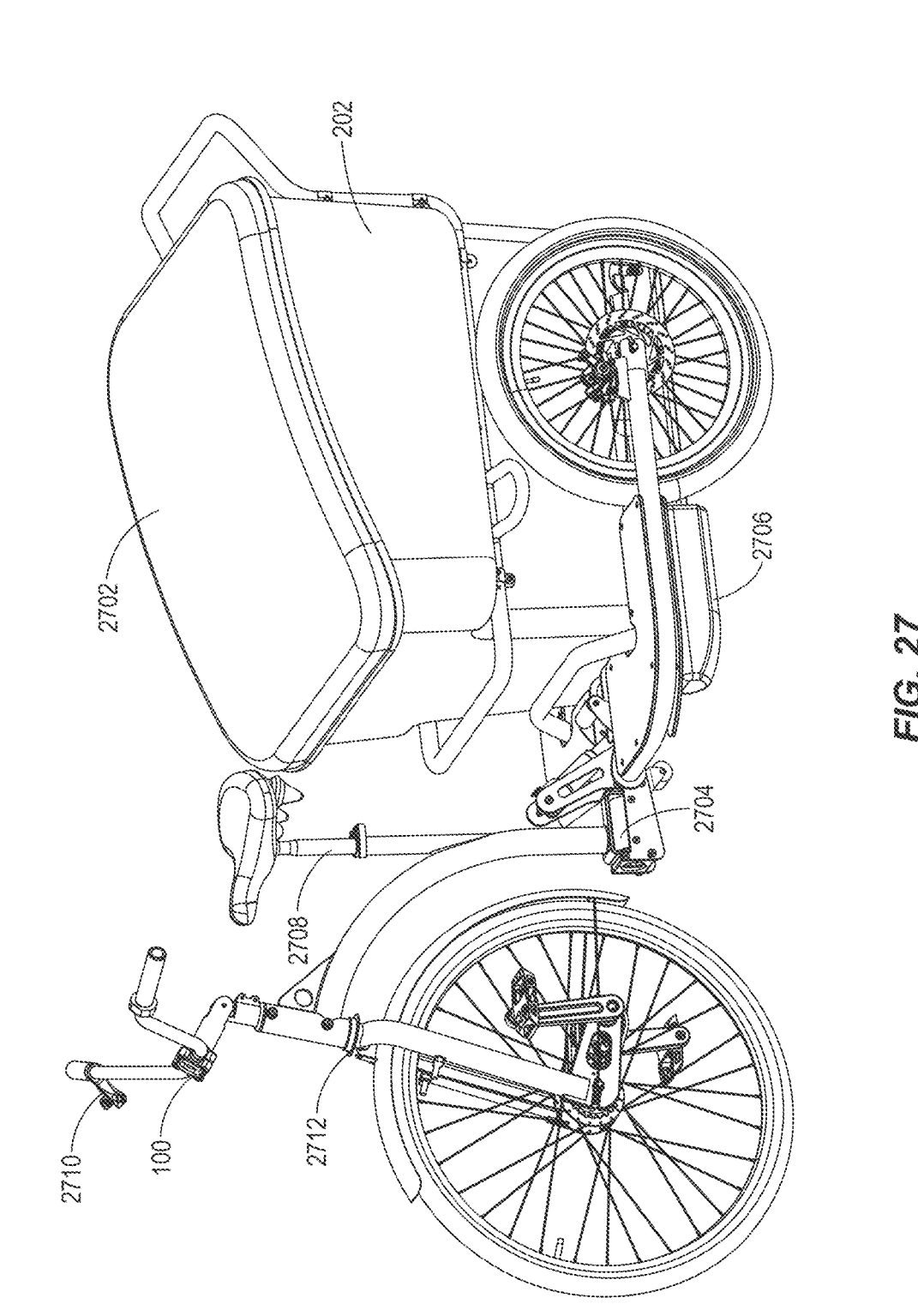
FIG. 27 is a view of an e-trike.
Figure 28:
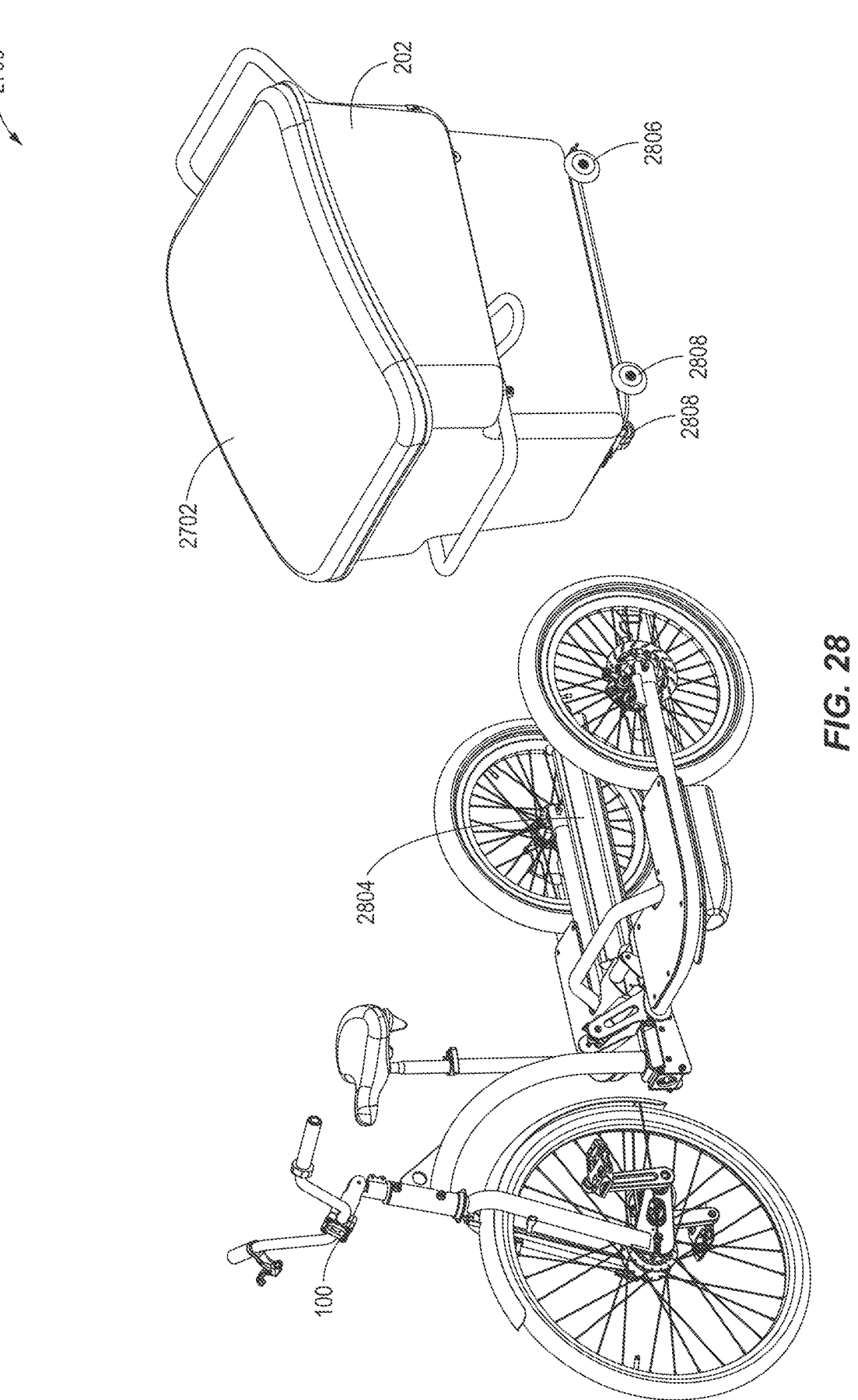
FIG. 28 is a view of an e-trike.

FIGS. 26-28 show some of many different possible configurations for e-trike 100.

FIG. 26 is a view 2600 of an e-trike 100. As depicted, view 2600 shows the following features of e-trike 100:

A Lexan™ passenger rain cover 2604 for the cargo box 202. This rain cover is transparent for passenger comfort. An embodiment also includes a rear hinge for the passenger rain cover 2604, that also includes a locking feature.

A safety frame 2608 that encircles and holds the cargo box 202 in place while also providing a level of crash resistance.

Lift handles and child step 2606 to allow the safety frame to be lifted, and to facilitate children getting in and out of the cargo box 202, respectively.

Caster wheel(s) 2602 that enhance maneuverability of the e-trike when folded. The e-trike is shown to be resting on such a caster in FIG. 3C. Caster wheel(s) 2602 may be used to wheel e-trike 100 when folded, in conjunction with the rear wheels of e-trike 100.

FIG. 27 is a view 2700 of e-trike 100. As depicted, FIG. 27 shows the following features of e-trike 100:

Steering lock lever 2712 to lock steering wheel/handlebar assembly prior to folding the e-trike.

Brake levers such as brake lever 2710 mounted on the handlebar, that actuate dual rear-mounted disc brakes.

Elastomeric torsional element 2704 that allows the front assembly comprising the handlebar, front wheel and pedal assembly to tilt as described above.

Seat post/saddle 2708 mounted rigidly on the rear frame.

Hard shell lockable cover 2702 for the cargo box 202 as an alternative to the Lexan™ passenger rain cover 2604.

Dual battery and/or dual motor options 2706 for electric assist features. The batteries are mounted below the rear frame to lower the center of gravity of the e-trike 100.

FIG. 28 is a view 2800 of an e-trike 100. As depicted, view 2800 includes:

Demountable box cart/cargo box 202 demounted from the e-trike 100. Cargo box 202 is shown to have cover 2702 attached.

A pair of guide rails 2804 that allow the cargo box 202 to be rolled on or off the e-trike 100 when mounting or demounting the cargo box 202.

Load/unload wheels 2806 on the cargo box 202 that slide/roll on the guide rails 2804 when mounting or demounting the cargo box 202.

Double casters 2808, similar to the front wheels of a shopping cart, on cargo box 202. In an aspect, a swiveling capability of the double casters 2808 allow the cargo box 202 to be maneuvered in a manner similar to a shopping cart. This feature can be helpful in places such as malls or supermarkets.

Figure 29:
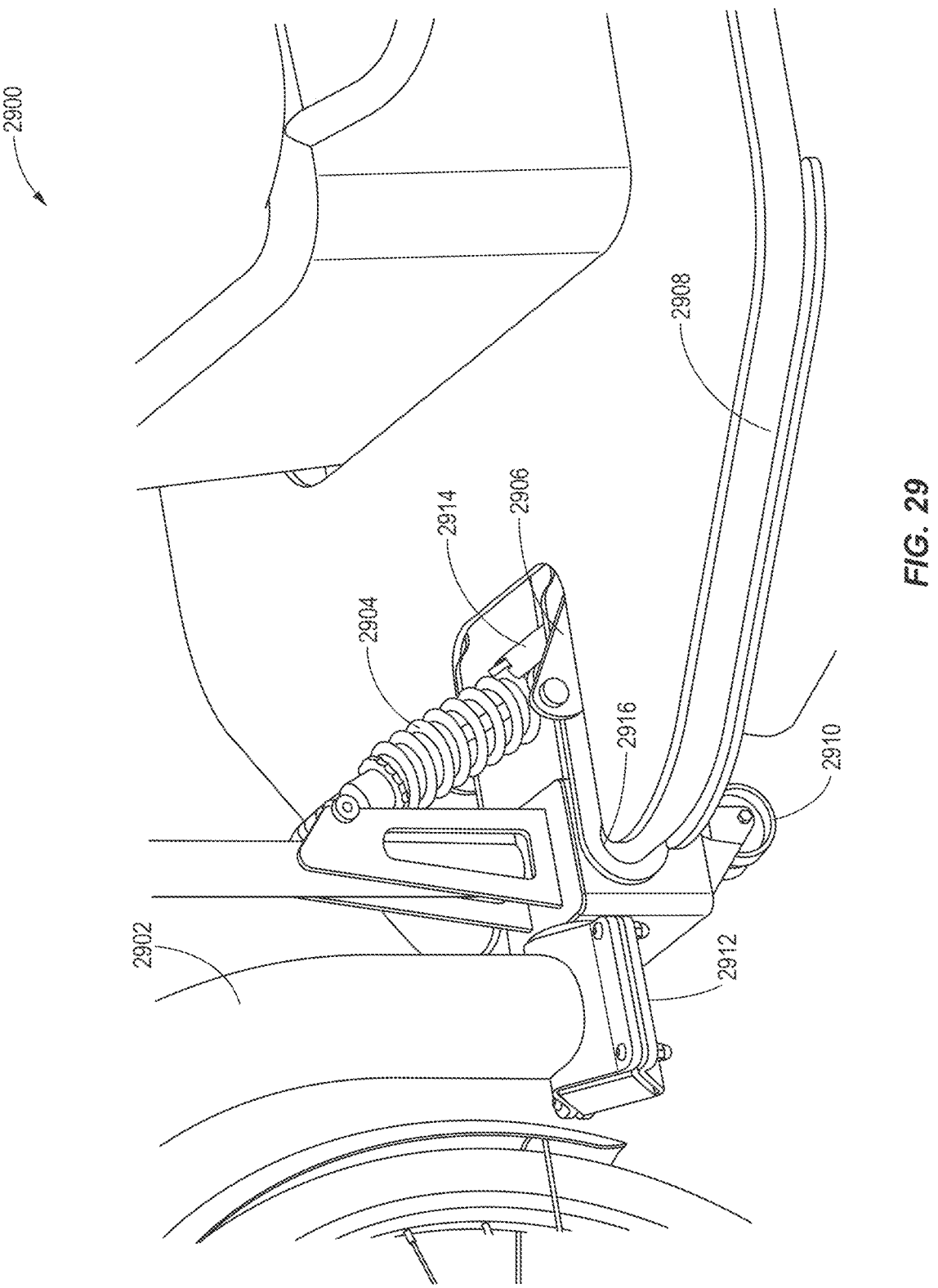
FIG. 29 is a close-up view of a folding and tilting mechanism of an e-trike.

FIG. 29 is a close-up view 2900 of a folding and tilting mechanism of e-trike 100. As depicted, view 29 includes:

Front frame 2902 attached to the elastomeric torsional 2912 element to control steering tilt. Elastomeric torsional element 2912 is rigidly attached to rear frame 2908.

Caster 2910 that allows the folded e-trike 100 to be rolled around (for example, into an elevator).

Teflon bushings 2916 that enable folding while also functioning as suspension bearings.

One of two self-latching fold locks 2906 that hold open the e-trike 100 rigidly in the unfolded state.

A spring coil-over shock absorber 2904, as described previously.

A reaction damping adjustment 2914 to adjust the response of the shock absorber to uneven terrain and bumps.

Figure 30A:
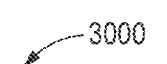
FIG. 30A is a view of a rickshaw attachment mounted on an e-trike.
Figure 30A:
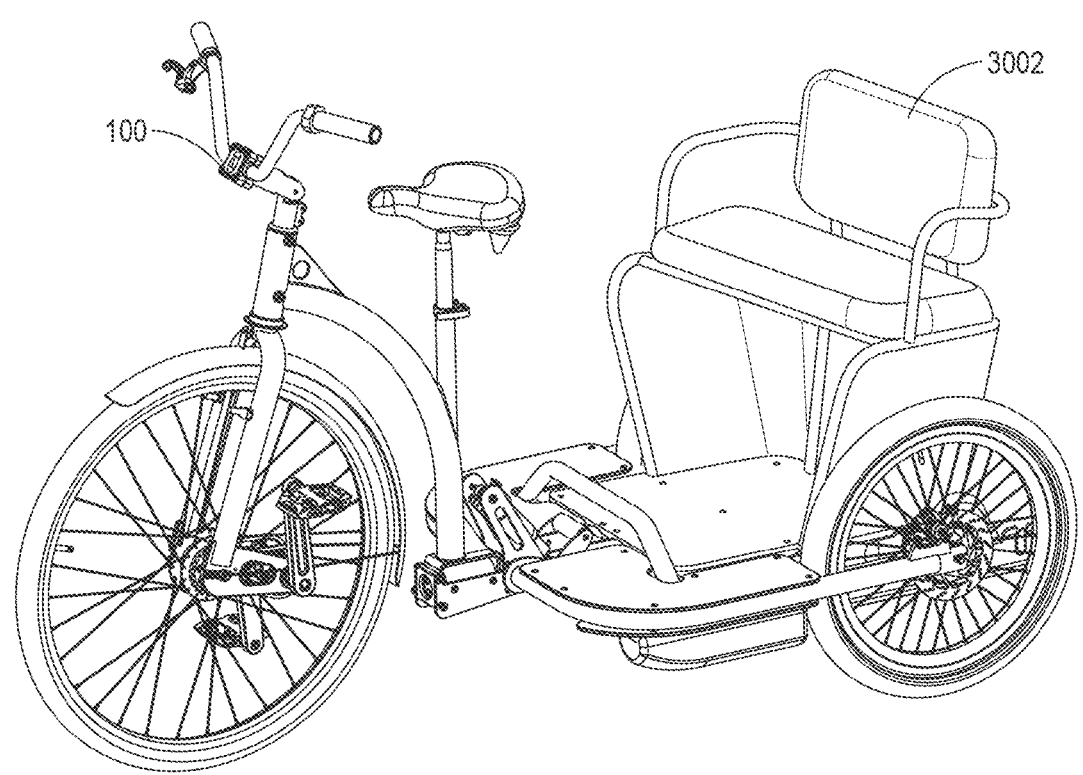

FIG. 30A is a view 3000 of a rickshaw attachment 3002 mounted on e-trike 100. The rickshaw attachment 3002 may allow the e-trike 100 to be configured as a rickshaw to transport passengers. The rickshaw attachment 3002 may have a similar base structure as the cargo box 202 (including, for example, the base frame, attachment points, etc., that enable the rickshaw attachment 3002 to be mounted to the rear frame of the e-trike 100, and wheeled casters for transport when demounted from the e-trike 100).

Figure 30B:
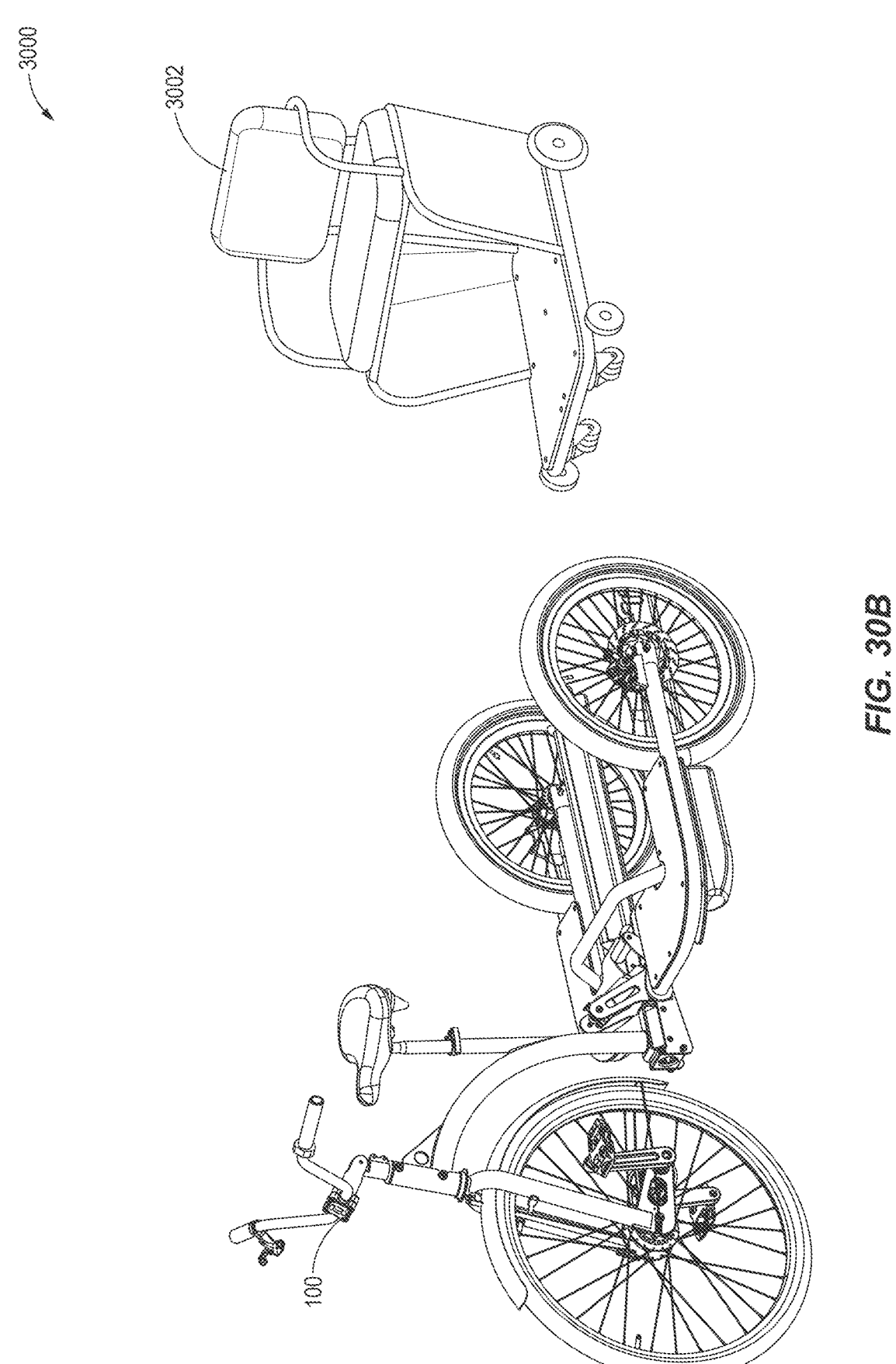
FIG. 30B is a view of a rickshaw attachment demounted from an e-trike.

FIG. 30B is a view 3001 of rickshaw attachment 3002 demounted from e-trike 100. As seen in FIGS. 30A and 30B, the rickshaw attachment 3002 may include a seat with side handles that may accommodate one or two passengers. FIG. 30B shows the rickshaw attachment 3002 resting on casters when demounted from the e-trike 100. The casters allow the rickshaw attachment 3002 to be easily transported (e.g., wheeled or rolled).

Figure 31A:
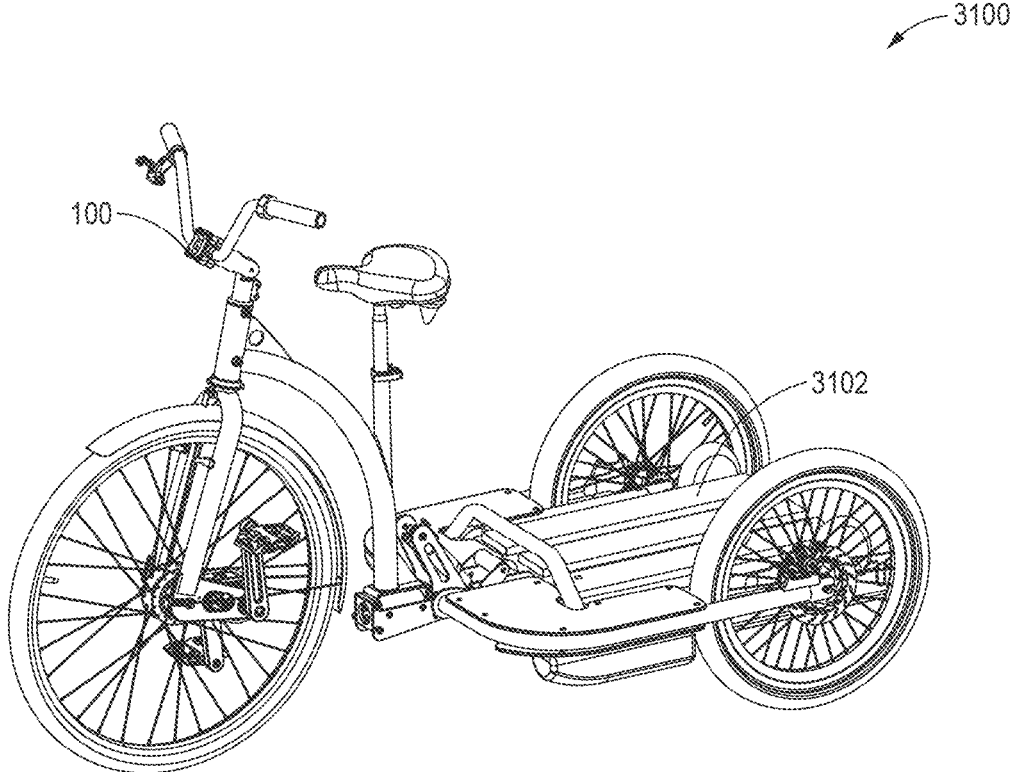
FIG. 31A is a view of a flatbed attachment mounted on an e-trike.

FIG. 31A is a view 3100 of a flatbed attachment 3102 (also referred to as a "cargo rack") mounted on e-trike 100. The flatbed attachment 3102 may allow the e-trike 100 to transport cargo, with the flatbed attachment 3102 acting as a pallet. The flatbed attachment 3102 may have a similar base structure as the cargo box 202 (including, for example, the base frame, attachment points, etc., that enable the flatbed attachment 3102 to be mounted on the rear frame of the e-trike 100, and wheeled casters for transport when demounted from the e-trike 100).

Figure 31B:
FIG. 31B is a view of a flatbed attachment demounted from an e-trike.
Figure 31B:
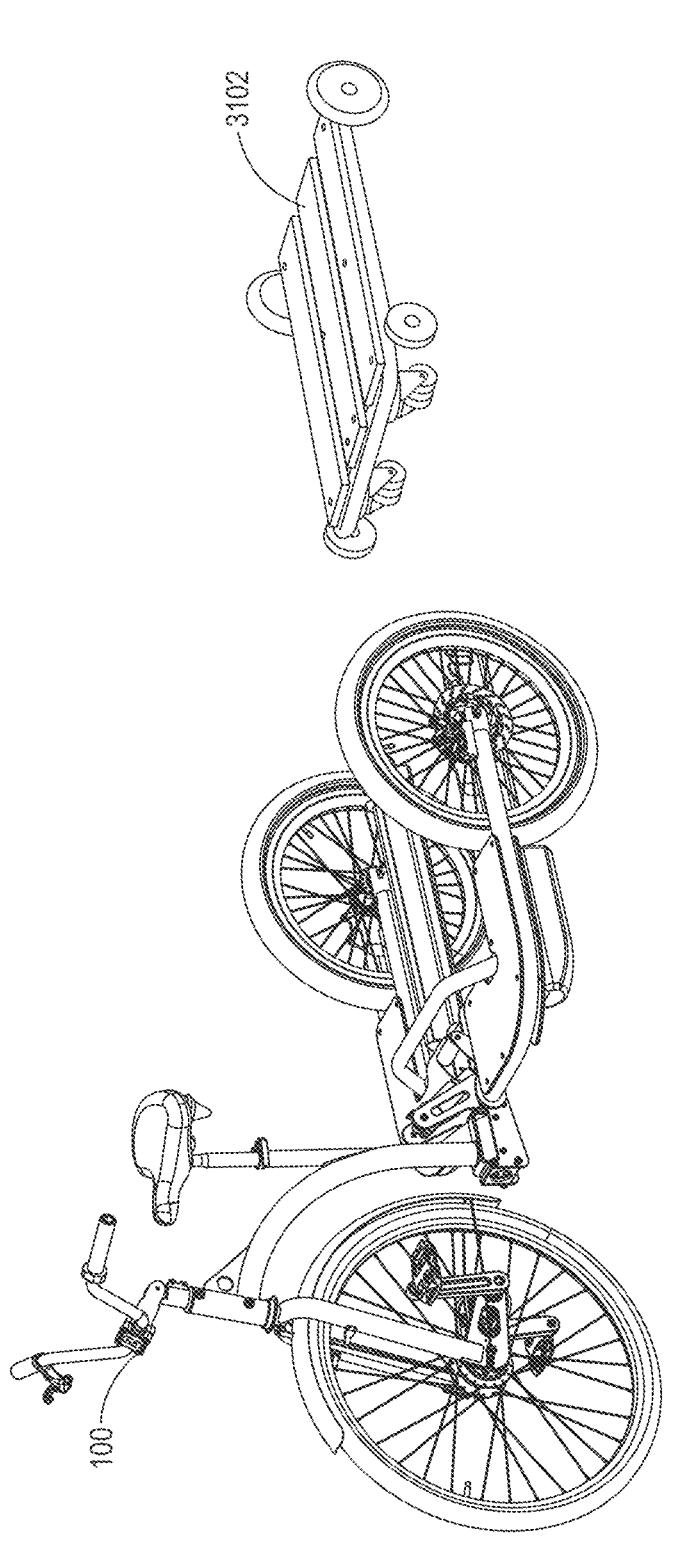

FIG. 31B is a view 3101 of flatbed attachment 3102 demounted from e-trike 100. View 3100 shows the flatbed attachment resting on casters when demounted from the e-trike. The casters allow the flatbed attachment to be easily transported (e.g., wheeled or rolled).

Figure 32:
FIG. 32 is a view of an elastomeric torsional element.

FIG. 32 is a view of elastomeric torsional element 3200. As depicted, elastomeric torsional element 3200 includes central core 3204, surrounded by four elastic (e.g., rubber) restraints such as elastic restraints 3202. Central core 3204 may be made of metal, and configured to rotate about a rotational axis that may be substantially parallel to a longitudinal axis associated with e-trike 100. A rotation of central core 3204 may be opposed by restorative elastic forces generated by each of the elastic restraints, including elastic restraint 3202. Central core 3204 may be rigidly affixed to the front assembly (e.g., at least the front wheel, wheel arch and handlebars) of e-trike 100. Elastomeric torsional element 3200 may be a component of elastomeric torsional element 1602 or 2506.

Figure 33:
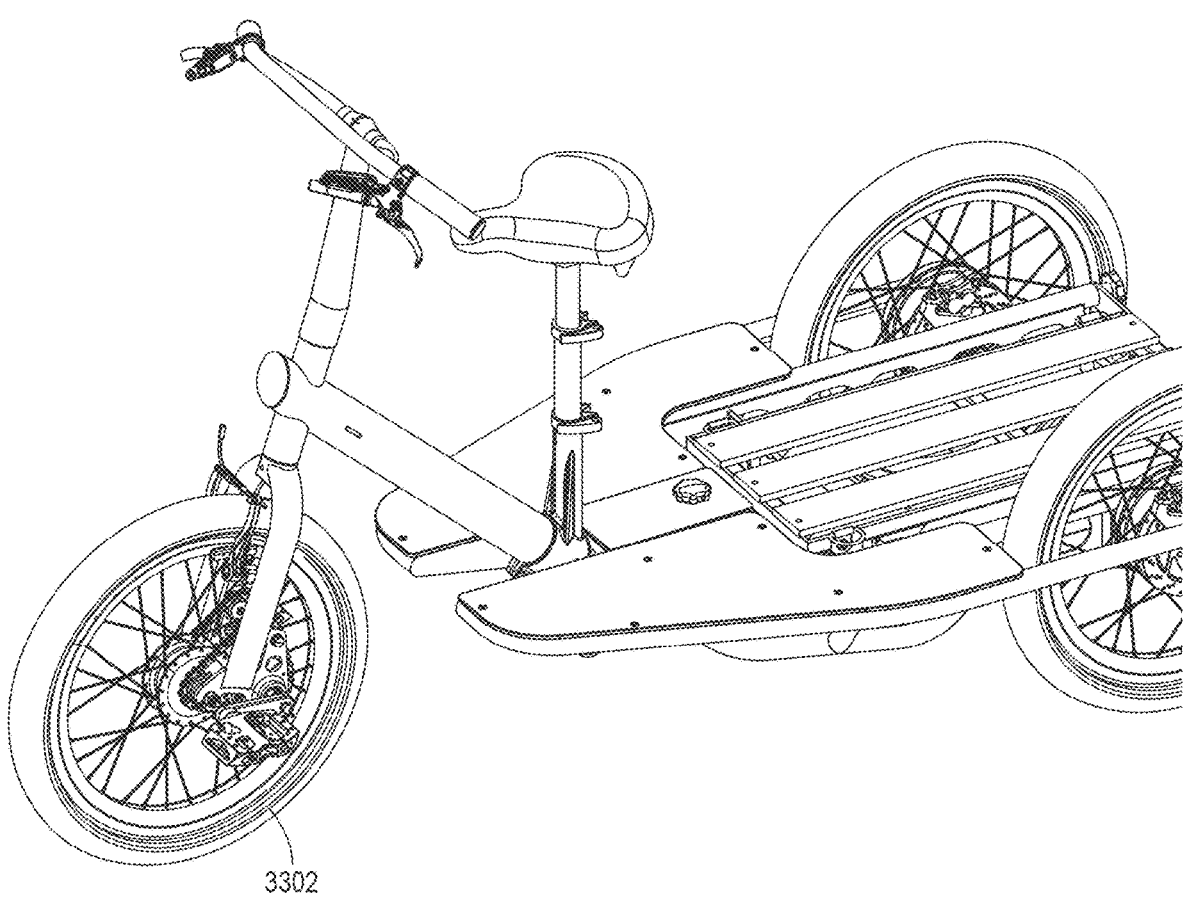
FIG. 33 is a view of an e-trike.

FIG. 33 is a view of e-trike 3300. E-trike 3300 may be similar to e-trike 100, the only differences being:

A smaller front wheel 3302 on e-trike 3300 as compared to e-trike 100. In one aspect, all three wheels on e-trike 3300 are 20″ in diameter. The smaller front wheel size helps reduce packaging and storage size, whilst the sprocket sizes are chosen to maintain the turns: velocity ratio. An embodiment of e-trike 3300 includes a folding handlebar stem to further reduce packing volume.

An anti-vibration shock absorber (described subsequently) used in place of spring coil-over shock absorber 2904.

Figure 34:
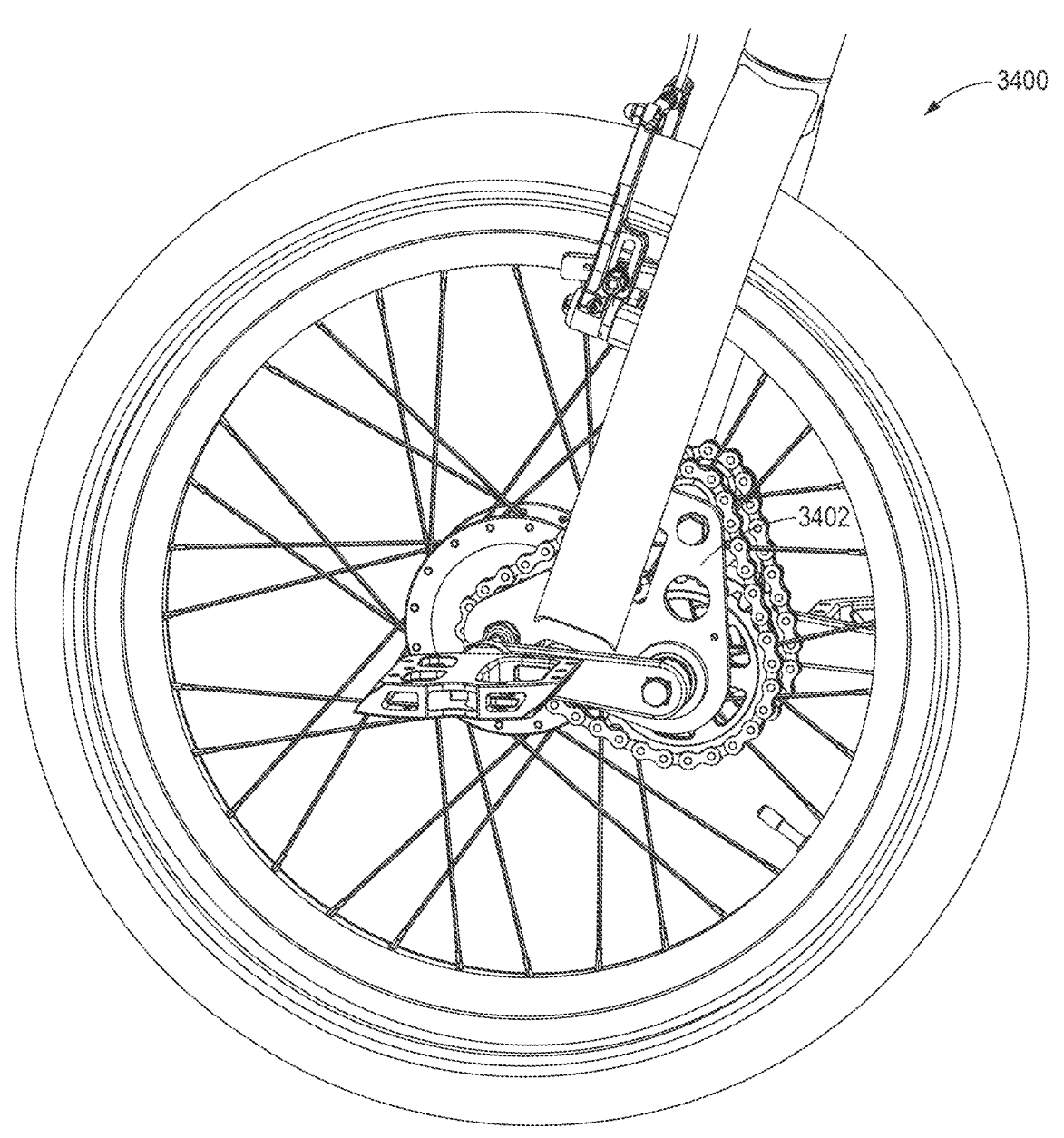
FIG. 34 is a view of a front wheel of an e-trike.

FIG. 34 is a view 3400 of front wheel 3302 of e-trike 3300. View 3400 also depicts pedal assembly 3402 that is similar to pedal assembly 1500.

Figure 35:
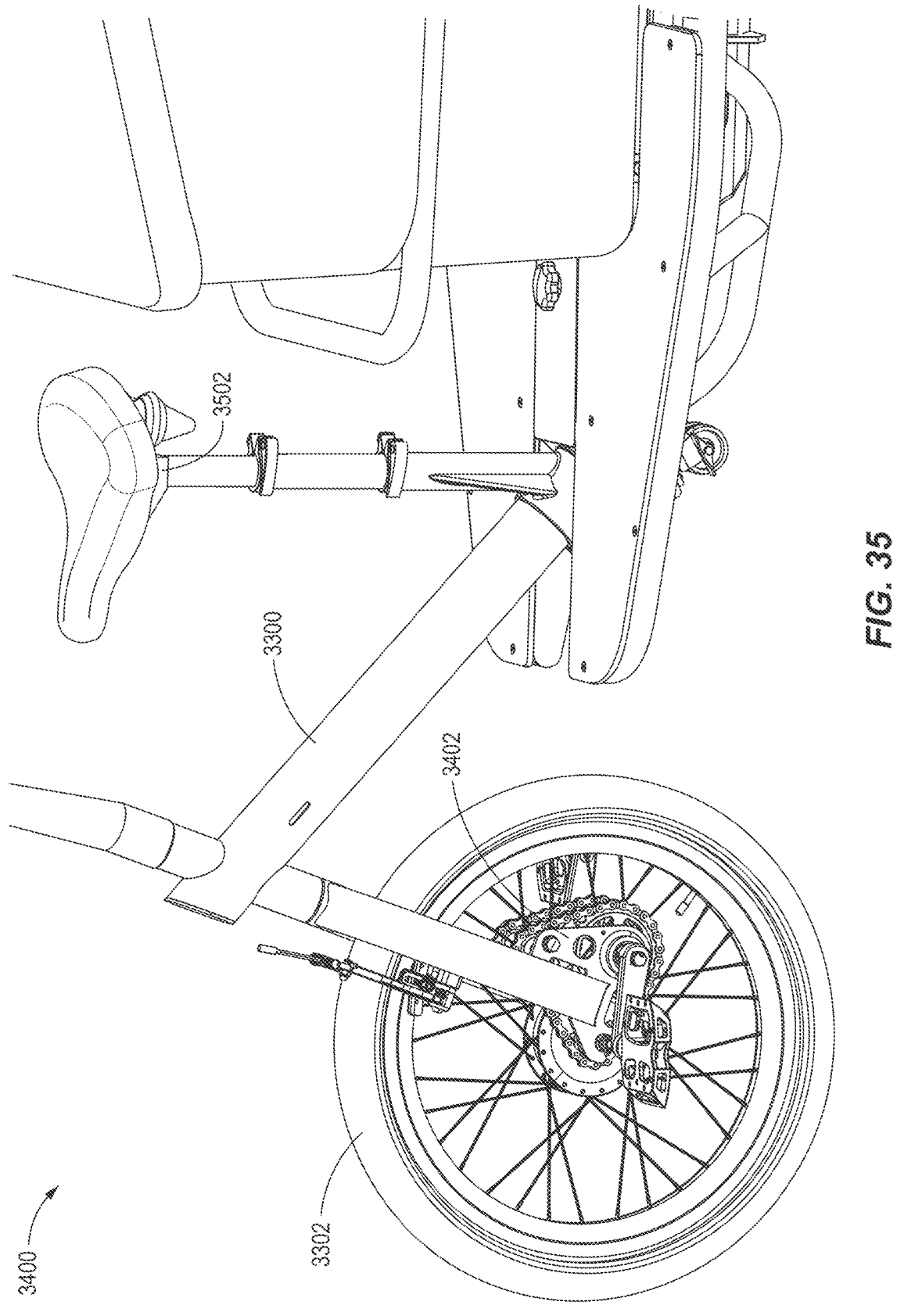
FIG. 35 is a view of a front portion of an e-trike.

FIG. 35 is a view 3500 of a front portion of e-trike 3300. View 3500 depicts front wheel 3302, pedal assembly 3402, and saddle 3502.

Figure 36:
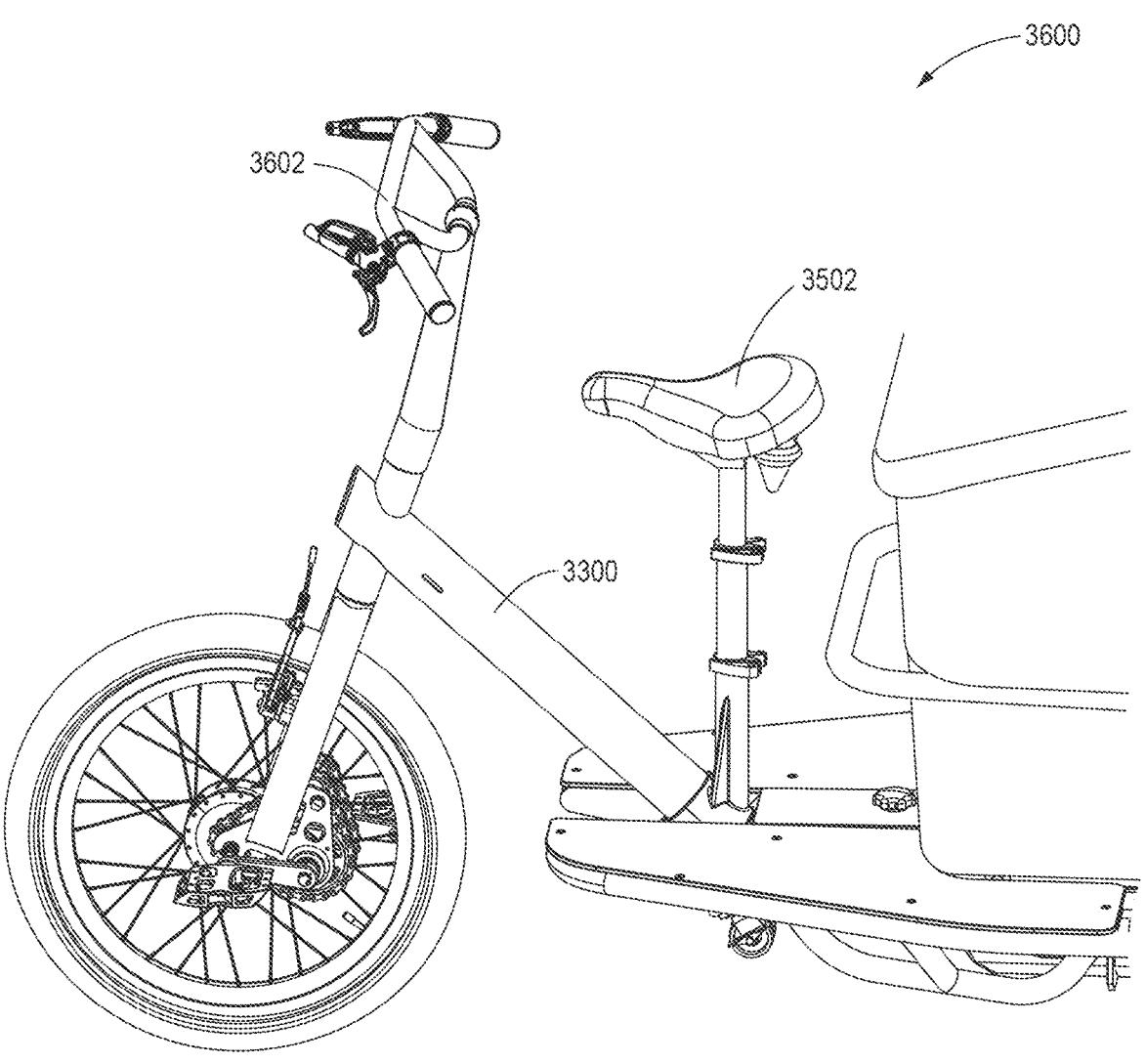
FIG. 36 is a view of an e-trike depicting a handlebar and a saddle.

FIG. 36 is a view 3600 of an e-trike 3300 depicting handlebar 3602 and saddle 3502.

Figure 37:
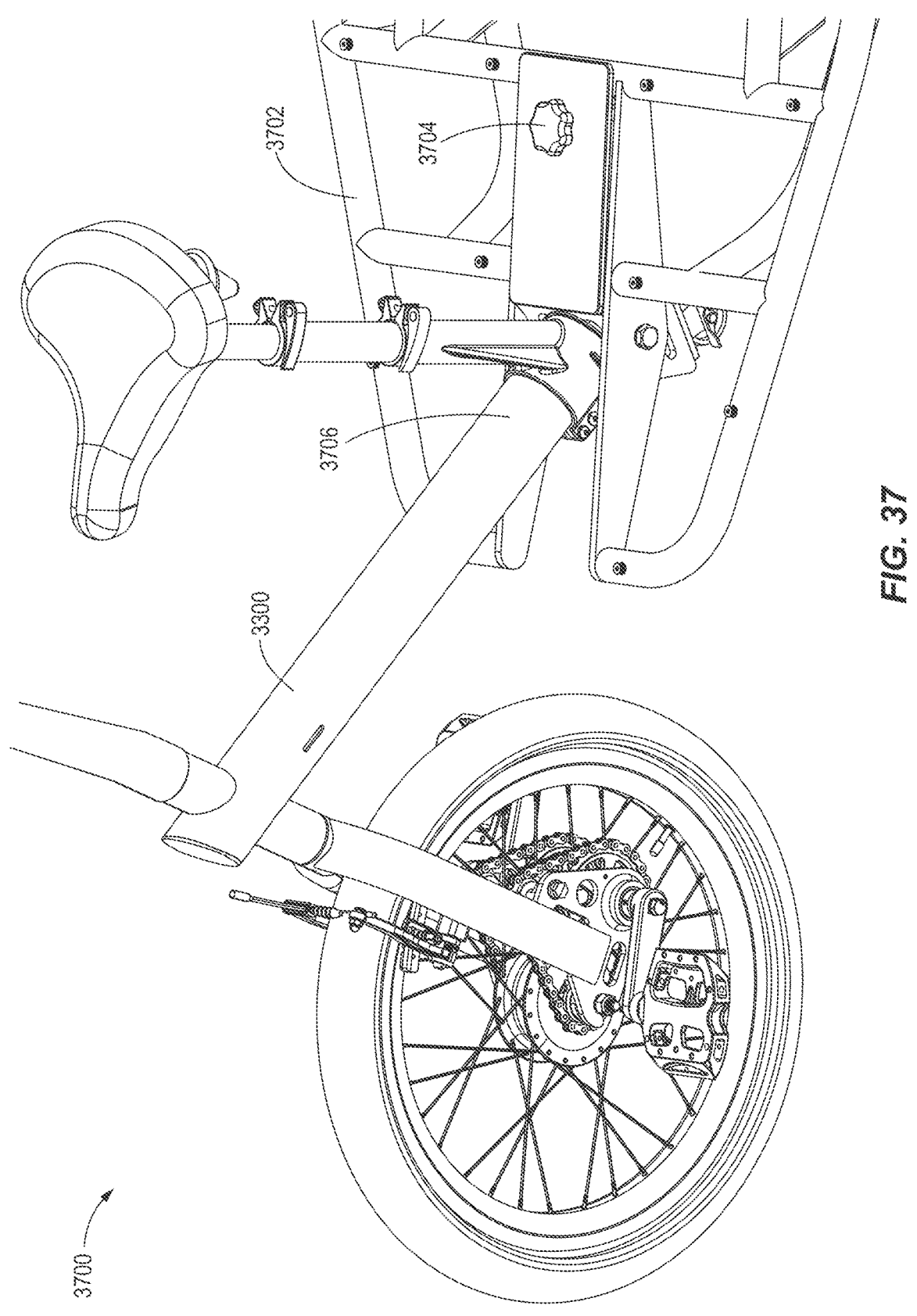
FIG. 37 is a view depicting a connection between a front assembly and a rear assembly of an e-trike.

FIG. 37 is a view 3700 depicting a connection between front assembly 3706 (including front wheel 3302) and rear assembly 3702 of e-trike 3300. View 3700 also depicts locking knob 3704 that, when tightened by a user, rigidly locks the front assembly 3706 of e-trike 3300 to the corresponding rear assembly 3702 when e-trike 3300 is unfolded. Prior to folding e-trike 3300, a user has to loosen locking knob 3704.

Figure 38:
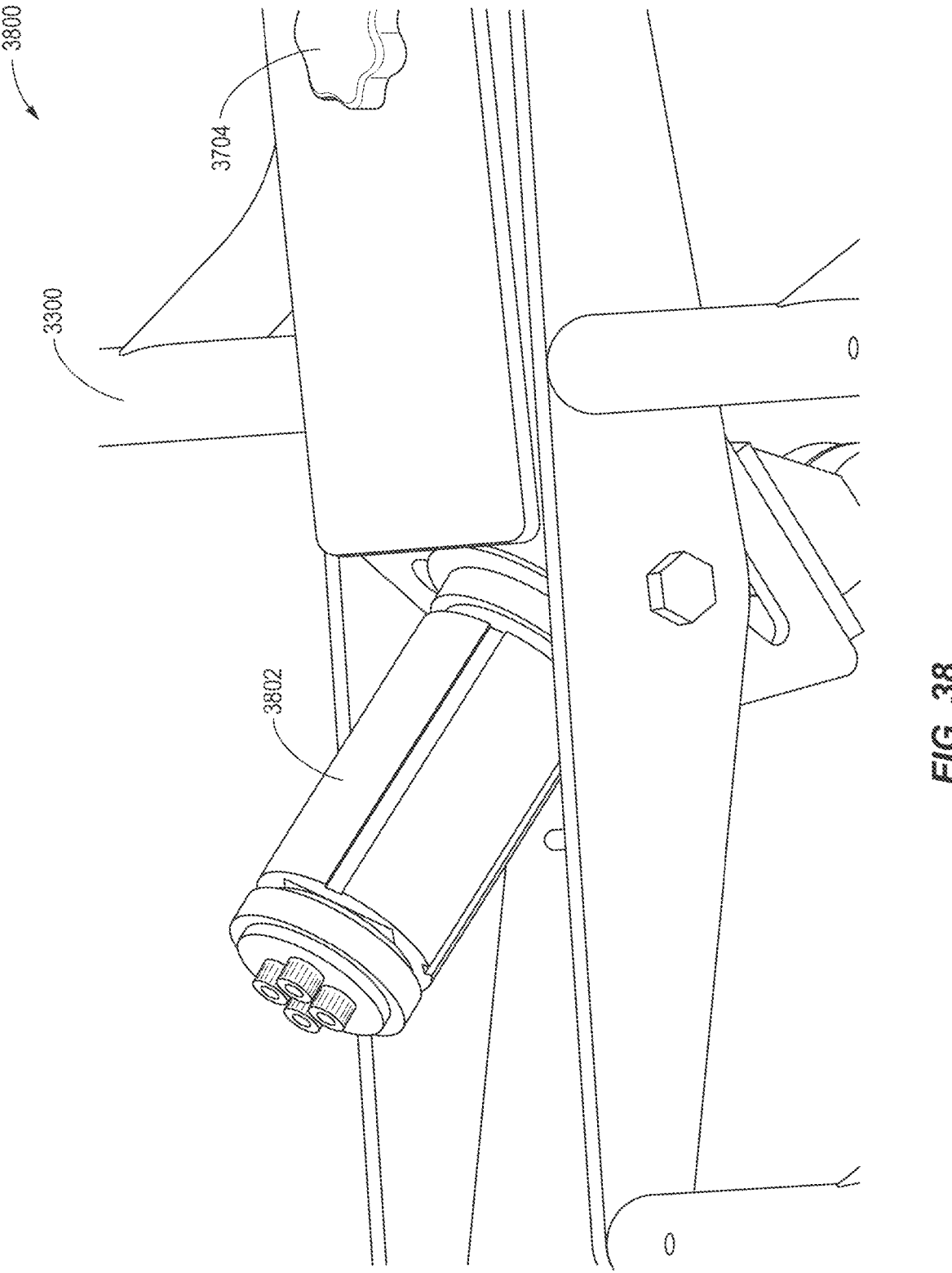
FIG. 38 is a close-up view of an e-trike depicting an elastomeric torsional element.

FIG. 38 is a close-up view 3800 of e-trike 3300 depicting elastomeric torsional element 3802. Elastomeric torsional element 3802 may be similar to elastomeric torsional element 1602. The elastomeric torsional element 3802 allows the handlebar 3602, front wheel 3302, and pedal assembly 3402 (in general, front assembly 3706) to tilt relative to the rear frame (in general, rear assembly 3702), against elastic/spring tension exerted by the elastomeric torsional element 3802, about a longitudinal axis associated with the e-trike 3300. In another embodiment, the handlebar 3602, the front wheel 3302, the pedal assembly 3402, and the saddle 3502 are allowed to tilt, against elastic/spring tension exerted by the elastomeric torsional element 3802, about a longitudinal axis associated with the e-trike 3300. FIG. 38 also depicts locking knob 3704. View 3800 is a sectional view that does not depict the connection portion of the front assembly to the rear assembly of e-trike 3300.

Figure 39:
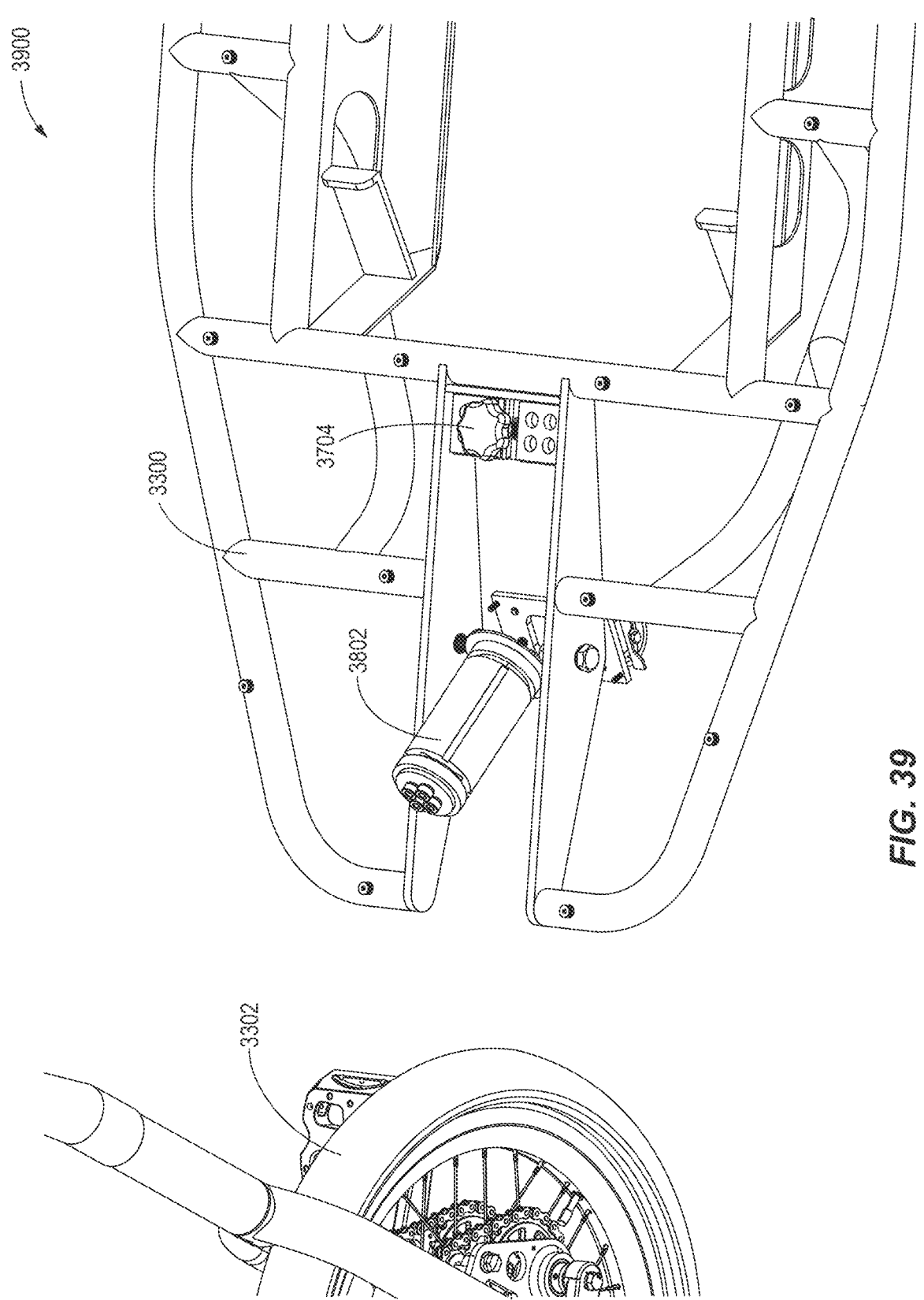
FIG. 39 is a view of a portion of an e-trike.

FIG. 39 is a view 3900 of a portion of e-trike 3300, depicting front wheel 3302, elastomeric torsional element 3802, and locking knob 3704. View 3900 is a sectional view that does not depict the connection portion of the front assembly to the rear assembly of e-trike 3300.

Figure 40:
FIG. 40 is a view depicting a folded e-trike.
Figure 40:
Figure 40:
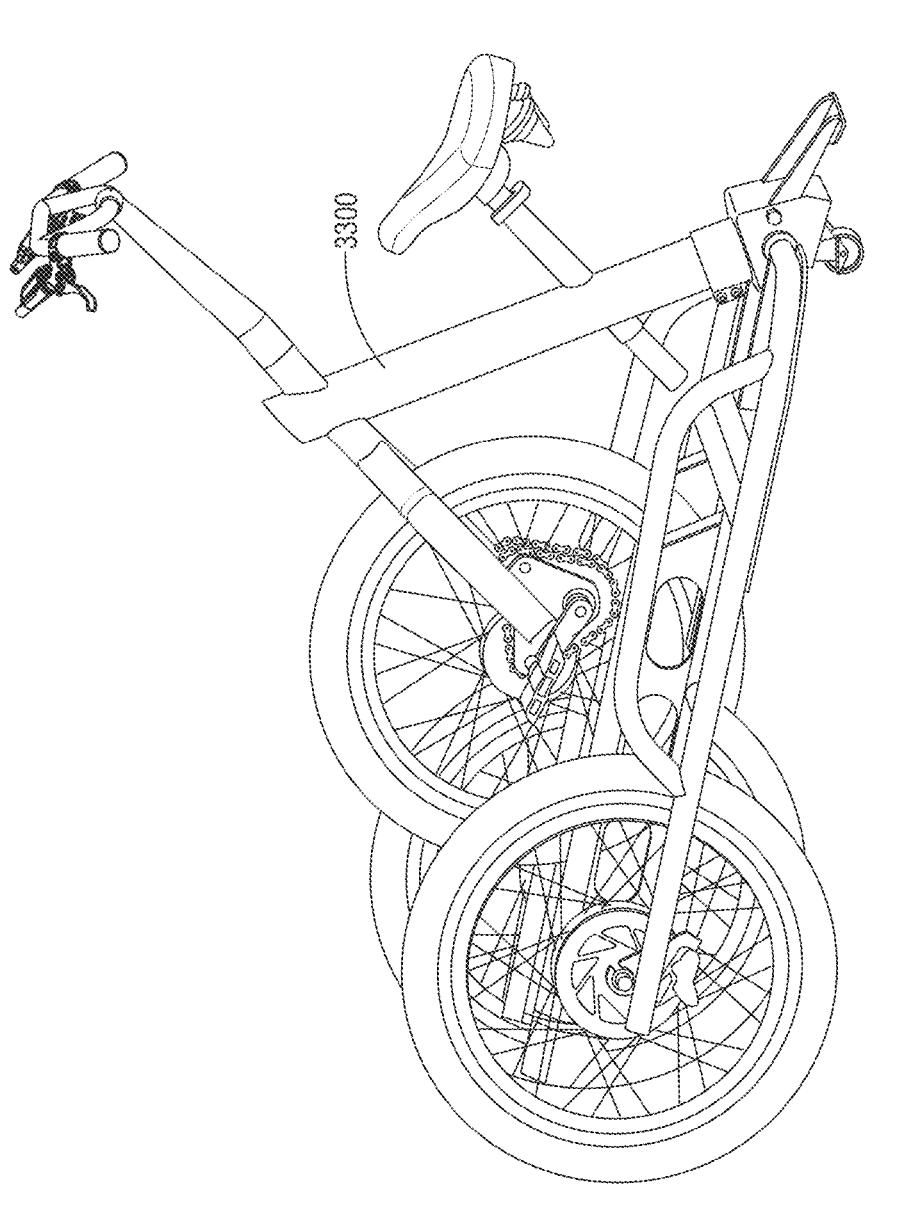

FIG. 40 is a view 4000 depicting folded e-trike 3300. In an aspect, e-trike 3300 is configured to fold in a manner similar to e-trike 100, for compact transportation and storage. Also, e-trike 3300 may be designed such that all the accessories for e-trike 100 are compatible with e-trike 3300.

Figure 41:
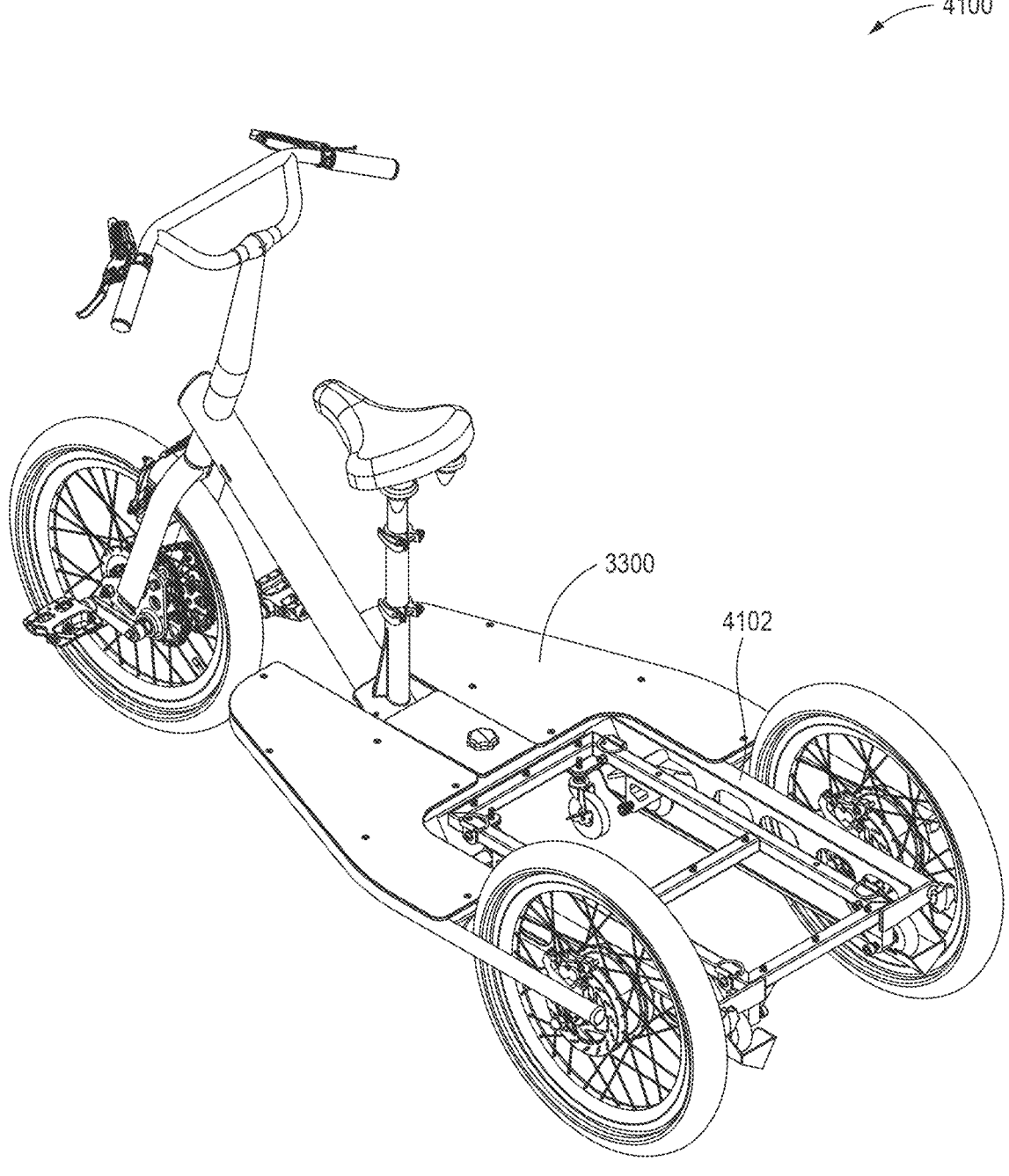
FIG. 41 is a view of an e-trike depicting an accessory mounting chassis

FIG. 41 is a view 4100 of e-trike 3300 depicting accessory mounting chassis 4102. Accessory mounting chassis 4102 may be used as a base for accessories such as cargo box 202, rickshaw attachment 3002, and flatbed attachment 3102. Accessory mounting chassis 4102 may include one or more wheels and casters that:

Enable an accessory to be wheeled around like a shopping cart when demounted from e-trike 3300, and Enable the accessory to be smoothly rolled onto or off of e-trike 3300 when respectively mounting or demounting the accessory on or off of e-trike 3300.

Figure 42:
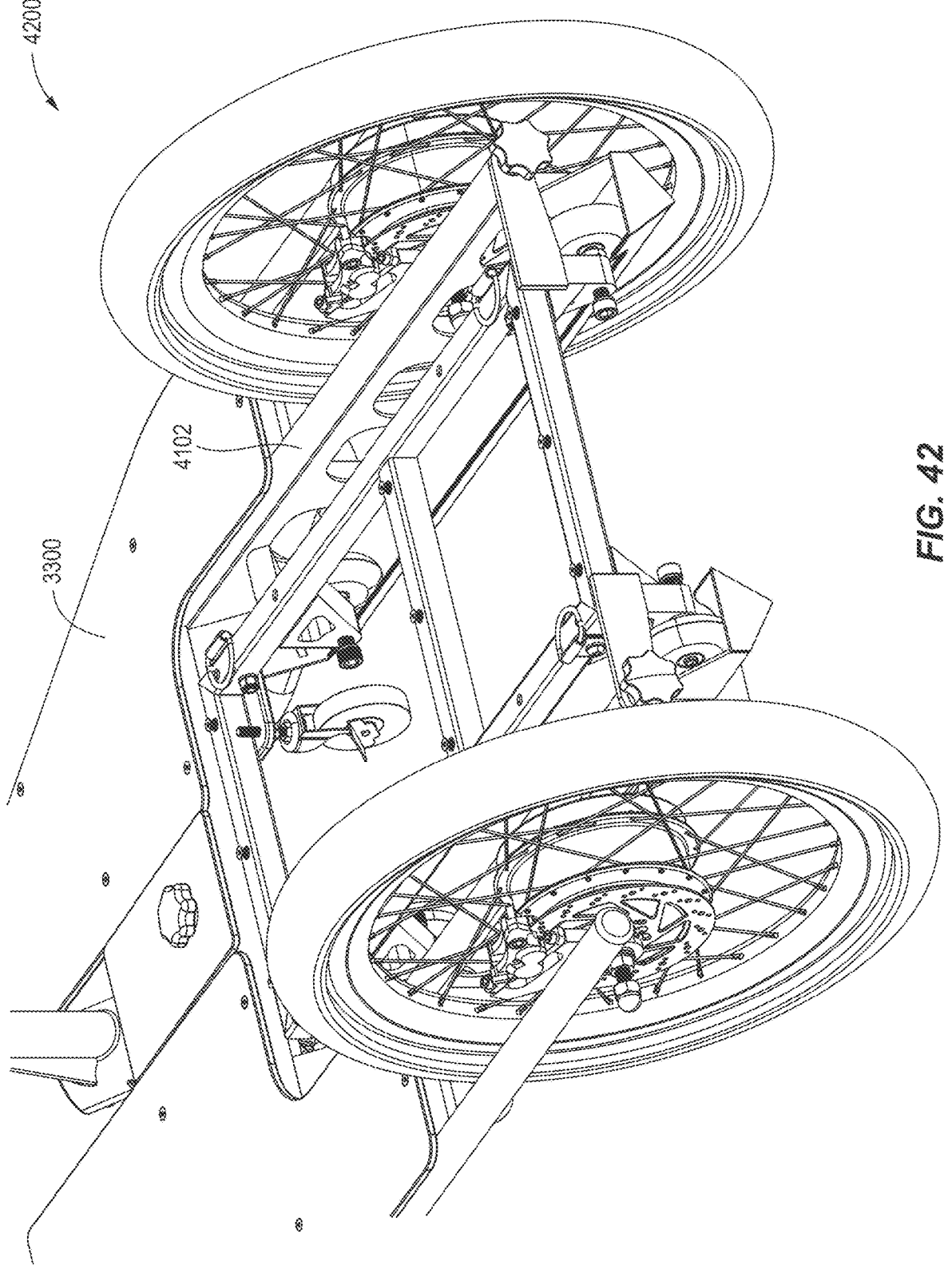
FIG. 42 is a close-up view of an e-trike depicting an accessory mounting chassis.

FIG. 42 is a close-up view 4200 of e-trike 3300 depicting accessory mounting chassis 4102.

Figure 43:
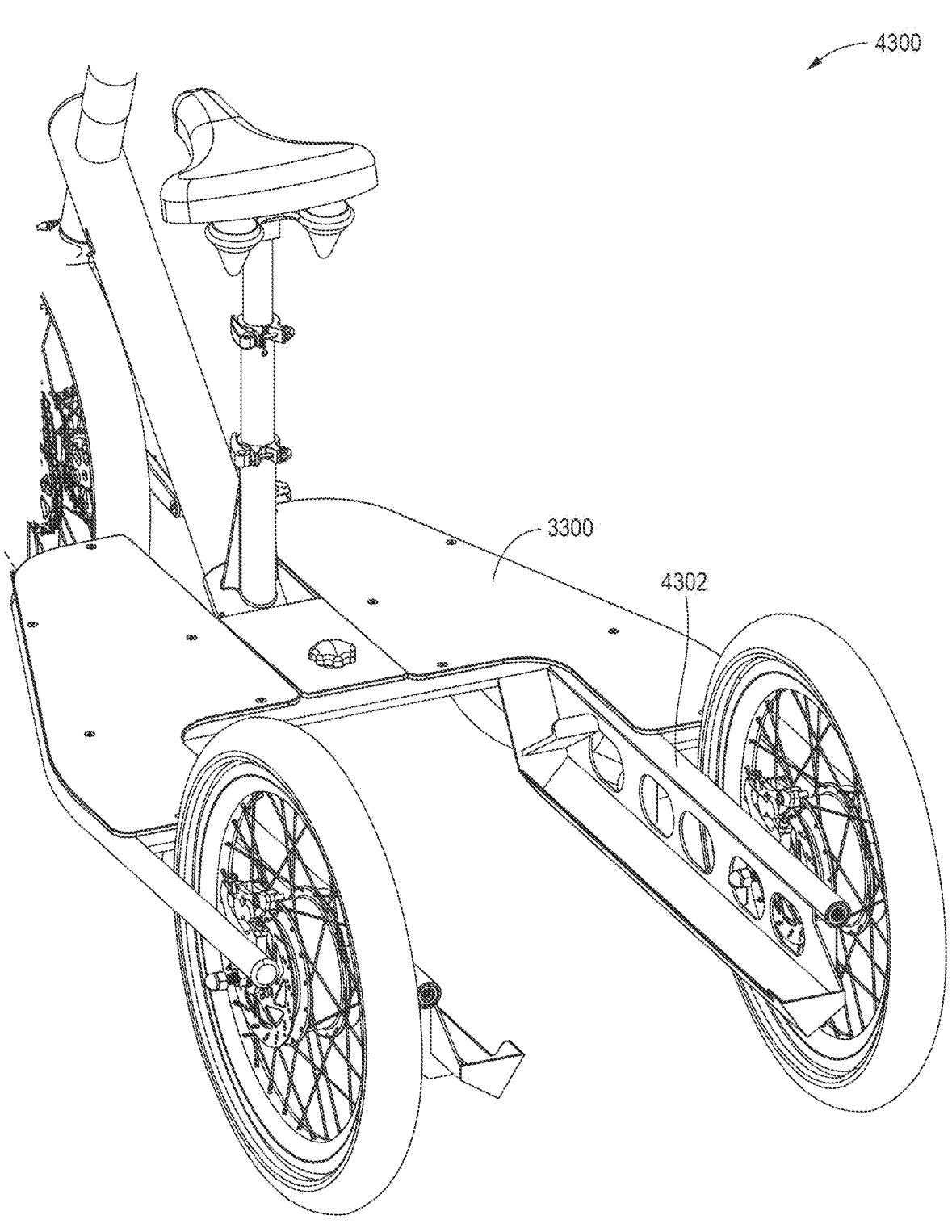
FIG. 43 is a rear view of an e-trike depicting a rear-mounting rail.

FIG. 43 is a rear view 4300 of e-trike 3300 depicting rear-mounting rail 4302. E-trike 3300 may include a second rear-mounting rail that is only partially visible in view 4300. In an aspect, rear-mounting rail 4302 and the second rear-mounting rail are used as guide rails and form a supporting frame on e-trike 3300, on which accessory chassis 4102 is rolled on and rigidly connected when mounting the respective accessory. Rear-mounting rail 4302 and the second rear-mounting rail may also be used as guide rails when rolling the respective accessory off of e-trike 3300 while demounting the accessory. Rear-mounting rail 4302 and the second rear-mounting rail are thus used for supporting an accessory when mounted on e-trike 3300, and to guide a motion of the accessory when mounting or demounting the accessory on or off e-trike 3300.

Figure 44:
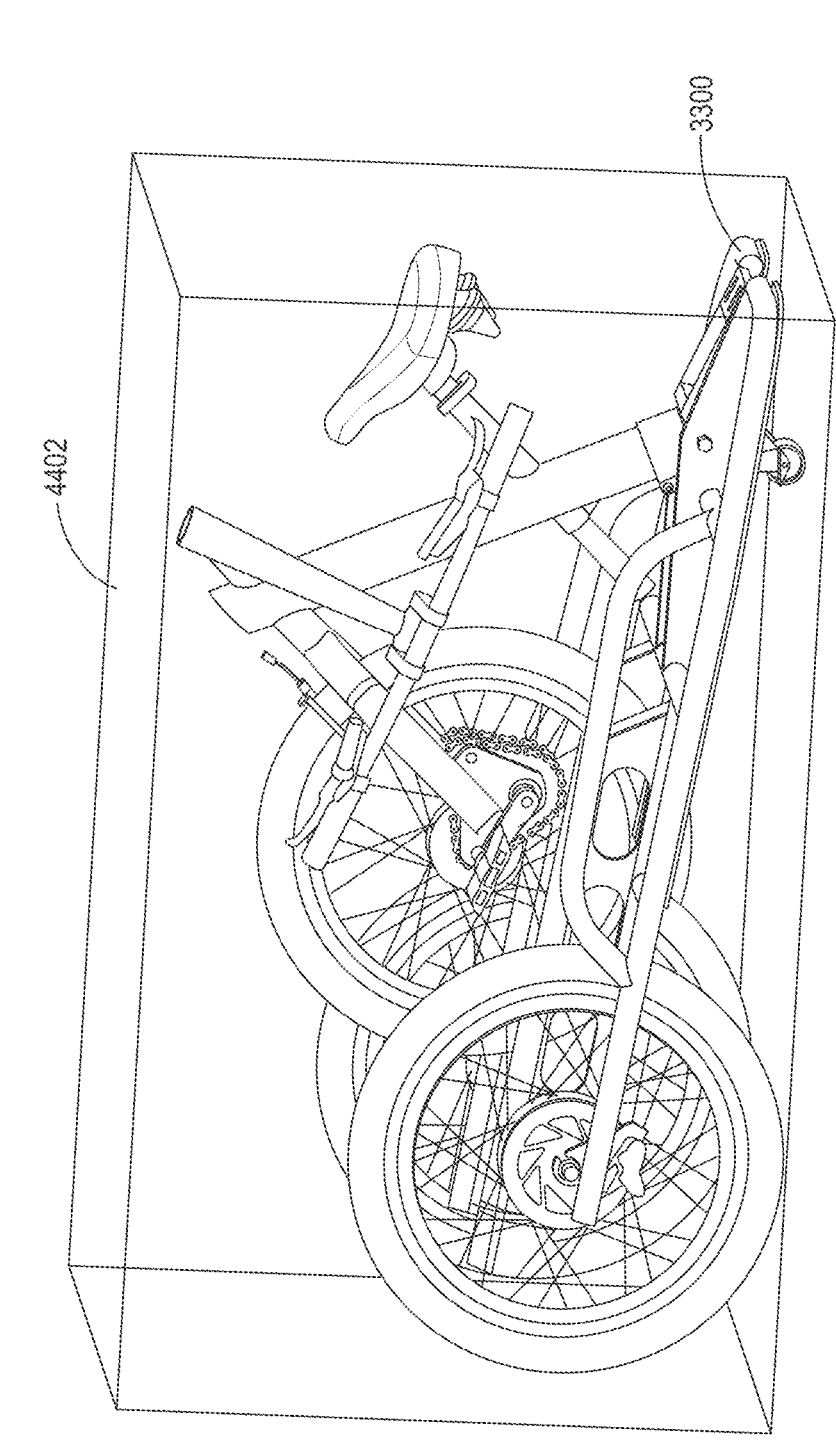
FIG. 44 is a view depicting a folded e-trike in a shipping box.

FIG. 44 is a view 4400 depicting folded e-trike 3300 in a shipping box 4402. In one aspect, the dimensions of the shipping box depicted in view 4400 may be 1.4 meters long x 0.9 meters wide×0.8 meters tall (55"×35"×32"). This shipping box size is smaller than the shipping box for e-trike 100. In this sense, e-trike 3300 has an advantage of being more compact in folded size as compared to e-trike 100.

Figure 45:
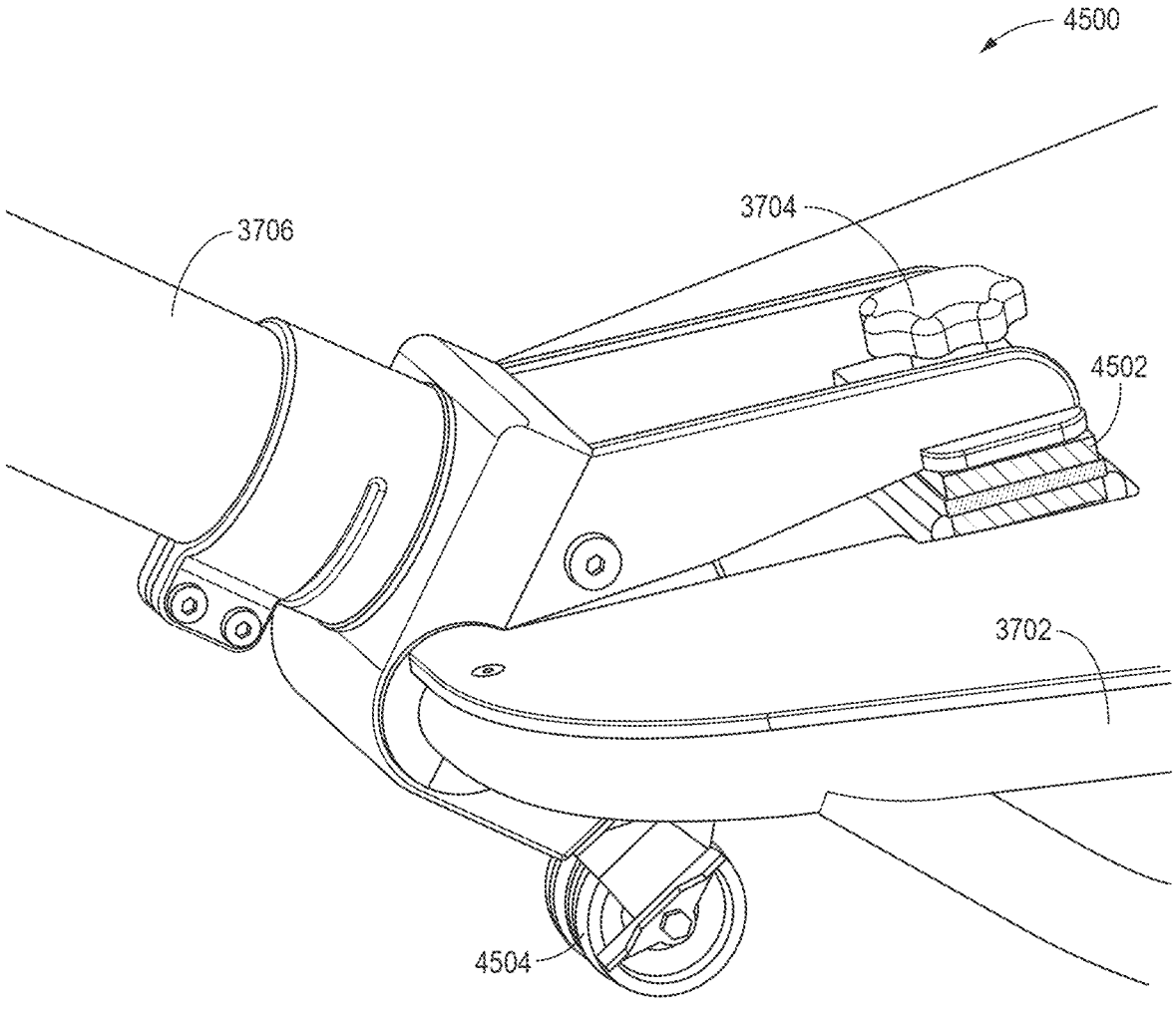
FIG. 45 is a view depicting a connection between a front assembly and a rear assembly of an e-trike.

FIG. 45 is a view 4500 depicting a connection between front assembly 3706 and rear assembly 3702 of e-trike 3300. In an aspect, the connection between front assembly 3706 and rear assembly 3702 is enabled via a mechanical connection that includes anti-vibration shock absorber 4502. This mechanical connection can be locked or unlocked via locking knob 3704. Anti-vibration shock absorber 4502 is configured to as a shock absorber that absorbs shock and vibrations due to road impacts, thereby improving ride quality for a rider. In an aspect, anti-vibration shock absorber 4502 is comprised of an elastic material such as rubber. Anti-vibration shock absorber 4502 may perform functions similar to spring coil-over shock absorber 2904. View 4500 also depicts caster 4504 for moving e-trike 3300 when folded.

Figure 46:
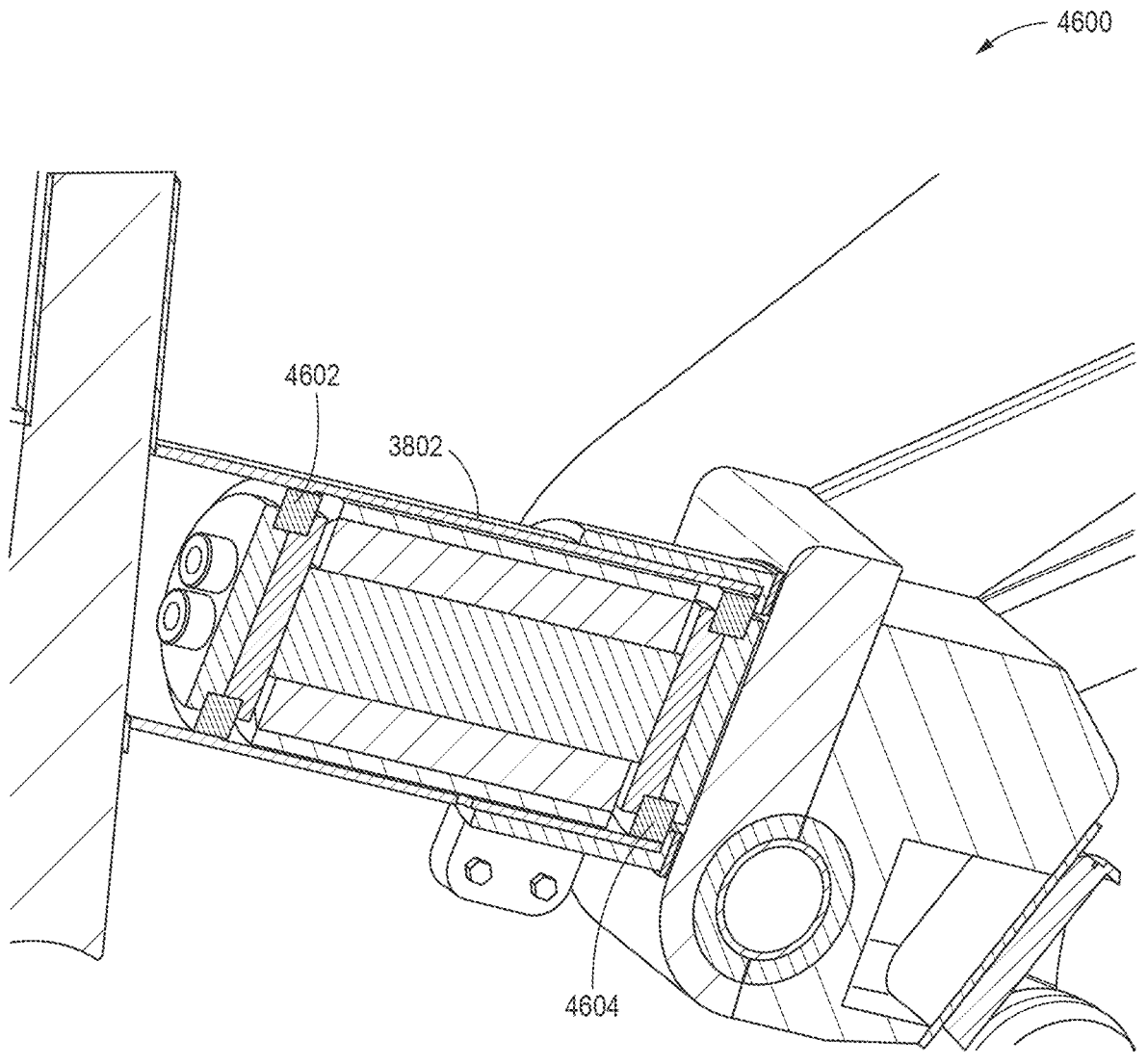
FIG. 46 is a view depicting an elastomeric torsional element.

FIG. 46 is a view 4600 depicting elastomeric torsional element 3802. View 4600 is a cross-sectional view of elastomeric torsional element 3802. In an aspect, elastomeric torsional element 3802 includes Teflon bearings 4602 and 4604. Each of Teflon bearings 4602 and 4604 is configured to allow the front assembly 3706 of e-trike 3300 to rotate about elastomeric torsional element 3802 to facilitate the tilting of handlebar 3602, front wheel 3302, and pedal assembly 3402 relative to rear assembly 3702.

Features of e-trike 3300 are summarized in the following table.

TABLE 2

| Features of folding e-trike 3300 | |
| --- | --- |
| Features | Benefit |
| Tilting "Delta" Trike | Low C-of-G, Safer cornering, |
| Folding, ultra compact, high capacity | easier transportation |
| Unloaded weight circa 16 Kg (35 lbs.) | Ultra-smooth ride |
| Adjustable "mid-suspension" Standard bicycle ride height | Safer to "see and be seen" |
| Ultralight-compact design circa 50 lbs ++ | Easier parking/transportation |
| In use length-220 cm (86") | Natural ride dynamic |
| Width-76 cm (30") | Ease of access/storage |
| Folded Length-100 cm (40") | Upright, goes in double door elevators |
| Lightweight Aluminum 6061-T6 frame | Total weight 30 Kg (65 lbs) excluding battery/accessories. |
| Coil-over shock, mid-suspension | Smooth ride, adjustable to suit rider. |
| Low Step-Thru, free-standing design | Easy mount/dismount, no kickstand, safer Load/Unload |
| Ultra compact geared motor 36 V 250 W (35 nM torque) 20 Ah Battery | Class 1, low noise, high torque, long range. |

TABLE 2-continued

| Features of folding e-trike 3300 | |
| --- | --- |
| Features | Benefit |
| Front & Rear disc brakes | Single lever stopping power |
| Minimalistic design | Stylish, easier/lower maintenance |
| Large demountable/Interchangeable | Facilitates folding/ |
| "Box-Cart" High capacity 300 liters | transportation/storage. |
| (75 US gallons) | Ideal for:-deliveries, shopping, |
| | transportation |
| 100 Kg (220 Lbs) | (excluding accessories) |
| Ships fully assembled | Saves cost and "Ready to Go" |
| Bluetooth motor control | Stylish, fewer cables, easier |
| | cleaning & maintenance |
| Great Quality | Reliable and long lasting |
| All wheel drive | |

| Optional Accessories | |
| --- | --- |
| Seat Boards | Converts from seat/foot well, |
| | to storage compartment. |
| LED Head, Side and Tails lights | Improved safety-"See and be Seen" |
| Tonneau and/or Canopy cover | Keeps contents dry |
| Aerodynamic windshield/fairing | Reduced wind resistance |
| | and driving rain to face. |
| All-Wheel drive. Front wheel | Combined Torque 70 nM., |
| pedals, | extended range |
| dual motor/battery to each rear | |
| wheel | |
| Front wheel lock | Convenient/Improved security |
| Box Cart | |
| Flat Bed | Two totes |
| Rickshaw | Two children, up to 100 Kg total |
| Maneuverability of a BMX | |

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A transportation device comprising:
a rear assembly including:
  a rear frame;
  a first rear wheel and a second rear wheel mounted to the rear frame;
  a first electric motor and a second electric motor mechanically connected to the first rear wheel and the second rear wheel respectively, wherein the first electric motor and the second electric motor are configured to provide electrical assistance to a user of the transportation device; and
an electrical power source comprising a battery, configured to power the first electric motor and the second electric motor; and
a front assembly comprising:
  a saddle configured to support the user;
  a front wheel connected to the saddle via a wheel hub and a fork; and
  an elastomeric torsional element connecting the front assembly and the rear assembly, wherein the elastomeric torsional element is configured to permit a range of motion of the front assembly relative to the rear assembly, about a longitudinal axis referenced to the transportation device, and wherein the range of motion is constrained by a combination of one or more mechanical stops at the end of the range of motion, and an elastic force exerted by the elastomeric torsional element against the range of motion when the front assembly is moved away from a neutral position.

2. The transportation device of claim 1, further comprising a mechanical lock that overrides the elastomeric torsion element, to prevent any motion of the front assembly relative to the rear assembly.

3. The transportation device of claim 1, wherein the front assembly further includes a pedal assembly configured to transfer mechanical inputs from the user to the front wheel, to propel the transportation device, and wherein the pedal assembly is offset to a rearward position referenced to the wheel hub.

4. The transportation device of claim 3, wherein the offset reduces a yawing motion of the transportation device when the transportation device is being pedaled by the user.

5. The transportation device of claim 3, wherein the mechanical inputs are transmitted from the user to the front wheel via a pair of pedals included in the pedal assembly, and via a chain assembly connecting the pedals to the front wheel.

6. The transportation device of claim 5, wherein a turn ratio associated with the chain assembly is 1.4:1, which is further associated with a pedaling cadence of approximately 1 second by the user, corresponding to a speed of approximately 15 mph associated with the transportation device.

7. The transportation device of claim 1, wherein the transportation device is foldable about an axis at a point of connection between the front assembly and the rear assembly.

8. The transportation device of claim 7, wherein a self-latching or a manually-actuated lock locks the transportation device in an unfolded state.

9. The transportation device of claim 1, further comprising a cadence sensor configured to sense a pedaling cadence associated with user inputs.

10. The transportation device of claim 9, wherein the cadence sensor is mechanically connected to a pedal assembly included in the front assembly, the pedal assembly being configured to transfer mechanical inputs from the user to the front wheel, to propel the transportation device.

11. The transportation device of claim 10, wherein if the cadence sensor detects that the user has stopped pedaling, power inputs to the first electric motor and the second electric motor from the electrical power source are correspondingly terminated.

12. The transportation device of claim 11, wherein one or more commands to terminate power inputs to the first electric motor and the second electric motor are transmitted by a wireless communication link.

13. The transportation device of claim 12, wherein the communication link is a Bluetooth communication link.

14. A transportation device comprising:
a rear assembly including:
  a rear frame;
  a first rear wheel and a second rear wheel mounted to the rear frame;
  a first electric motor and a second electric motor mechanically connected to the first rear wheel and the second rear wheel respectively, wherein the first electric motor and the second electric motor are configured to provide electrical assistance to a user of the transportation device; and an electrical power source comprising a battery, configured to power the first electric motor and the second electric motor; and a front assembly mechanically connected to the rear assembly, the front assembly comprising:

a saddle configured to support the user;

a front wheel connected to the saddle via a wheel hub and a fork; and a pedal assembly configured to transfer mechanical inputs from the user to the front wheel, to propel the transportation device, wherein the pedal assembly is offset to a rearward position referenced to the wheel hub.

15. The transportation device of claim 14, wherein the offset reduces a yawing motion of the transportation device when the transportation device is being pedaled by the user.

16. The transportation device of claim 14, wherein the mechanical inputs are transmitted from the user to the front wheel via a pair of pedals included in the pedal assembly, and via a chain assembly connecting the pedals to the front wheel.

17. The transportation device of claim 16, wherein a turn ratio associated with the chain assembly is 1.4:1, which is further associated with a pedaling cadence of approximately 1 second by the user, corresponding to a speed of approximately 15 mph associated with the transportation device.

18. The transportation device of claim 14, wherein the front assembly further includes an elastomeric torsional element connecting the front assembly and the rear assembly, wherein the elastomeric torsional element is configured to permit a range of motion of the front assembly relative to the rear assembly, about a longitudinal axis referenced to the transportation device, and wherein the range of motion is constrained by a combination of one or more mechanical stops at the end of the range of motion, and elastic force exerted by the elastomeric torsional element against the range of motion when the front assembly is moved away from a neutral position.

19. The transportation device of claim 18, further comprising a mechanical lock that overrides the elastomeric torsion element, to prevent any motion of the front assembly relative to the rear assembly.

20. The transportation device of claim 14, further comprising a cadence sensor configured to sense a pedaling cadence associated with user inputs.

21. The transportation device of claim 20, wherein the cadence sensor is mechanically connected to the pedal assembly.

22. The transportation device of claim 21, wherein if the cadence sensor detects that the user has stopped pedaling, power inputs to the first electric motor and the second electric motor from the electrical power source are correspondingly terminated.

23. The transportation device of claim 22, wherein one or more commands to terminate power inputs to the first electric motor and the second electric motor are transmitted by a wireless communication link.

24. The transportation device of claim 23, wherein the communication link is a Bluetooth communication link.

* * * * *